(12) United States Patent
Uyama et al.

(10) Patent No.: US 7,004,637 B1
(45) Date of Patent: Feb. 28, 2006

(54) WHEEL-SUPPORT ROLLING BEARING UNIT

(75) Inventors: Hideyuki Uyama, Fujisawa (JP); Yuuji Miyamoto, Fujisawa (JP); Shigeru Okita, Fujisawa (JP)

(73) Assignee: NSK Ltd., Tokyo (JP)

( * ) Notice: Subject to any disclaimer, the term of this patent is extended or adjusted under 35 U.S.C. 154(b) by 31 days.

(21) Appl. No.: 11/035,766

(22) Filed: Jan. 14, 2005

Related U.S. Application Data

(63) Continuation of application No. PCT/JP03/08977, filed on Jul. 15, 2003.

(30) Foreign Application Priority Data

| Jul. 15, 2002 | (JP) | ............................. 2002-205632 |
| Aug. 27, 2002 | (JP) | ............................. 2002-246103 |
| Aug. 29, 2002 | (JP) | ............................. 2002-251216 |
| Sep. 10, 2002 | (JP) | ............................. 2002-263944 |
| Sep. 30, 2002 | (JP) | ............................. 2002-284888 |
| Nov. 20, 2002 | (JP) | ............................. 2002-336628 |
| Jan. 8, 2003 | (JP) | ............................. 2003-002006 |
| Jan. 22, 2003 | (JP) | ............................. 2003-013632 |
| Jan. 28, 2003 | (JP) | ............................. 2003-019142 |
| Jun. 12, 2003 | (JP) | ............................. 2003-167239 |

(51) Int. Cl.
*F16C 13/00* (2006.01)
*F16C 43/00* (2006.01)

(52) U.S. Cl. .................. 384/544; 384/625; 384/913; 29/898.06

(58) Field of Classification Search ............... 384/544, 384/589, 913, 569, 492, 625; 29/898.06
See application file for complete search history.

(56) References Cited

U.S. PATENT DOCUMENTS

| 6,165,289 A * | 12/2000 | Matsumoto et al. ........ 384/492 |
| 6,197,128 B1 * | 3/2001 | Maeda ....................... 384/625 |
| 6,524,011 B1 * | 2/2003 | Miyazaki et al. ........... 384/544 |
| 6,715,926 B1 * | 4/2004 | Tajima et al. ............... 384/544 |
| 6,719,854 B1 * | 4/2004 | Komori et al. ............. 384/625 |
| 6,761,486 B1 * | 7/2004 | Miyazaki et al. ........... 384/544 |

* cited by examiner

*Primary Examiner*—Thomas R. Hannon
(74) *Attorney, Agent, or Firm*—Katten Muchin Rosenman LLP

(57) ABSTRACT

In a wheel-support rolling bearing unit, in order to made a flange 6 thinner and thus lighten the bearing unit without impairing fatigue strength, machinability, and workability after forging, the composition of the alloy steel constituting the flange attached member (hub ring 2), the surface hardness of the root portion 14 on the axial outside surface side of the flange 6, and the surface roughness, are stipulated to thereby improve the durability ratio (fatigue limit strength/tensile strength) of the flange 6. In one aspect, the member is made from an alloy steel containing C: 0.5 to 0.65 weight %, Mn: 0.3 to 1.5 weight %, Si: 0.1 to 1.0 weight %, Cr: 0.01 to 0.5 weight %, S: 0.35 weight % or less, and any one type or more selected from 0.01 to 0.2 weight % of V, 0.01 to 0.15 weight % of Nb, and 0.01 to 0.15 weight % of Ti, with the rest being Fe and inevitable impurities, and the oxygen contents is 15 ppm or less. Moreover, the surface hardness of the inner raceway 7a formed with the hardened layer, is between Hv 650 and 780, and the surface hardness of a portion not formed with the hardened layer is between Hv 230 and 300.

30 Claims, 13 Drawing Sheets

Absolute maximum
length (ferite length)

WHEEL-SUPPORT ROLLING BEARING UNIT

CROSS-REFERENCE TO RELATED APPLICATION

This application is a continuation of an International Application No. PCT/JP03/08977 which was filed on Jul. 15, 2003 and claims priority from Japanese Patent Applications 2002-205632 filed on Jul. 15, 2002, 2002-246103 filed on Aug. 27, 2002, 2002-251216 filed on Aug. 29, 2002, 2002-263944 filed on Sep. 10, 2002, 2002-284888 filed on Sep. 30, 2002, 2002-336628 filed on Nov. 20, 2002, 2003-002006 filed on Jan. 8, 2003, 2003-013632 filed on Jan. 22, 2003, 2003-019142 filed on Jan. 28, 2003 and 2002-167239 filed on Jun. 12, 2003, all of which are herein incorporated by reference.

TECHNICAL FIELD

The present invention relates to an improvement of a rolling bearing unit for rotatably supporting an automobile wheel with respect to a suspension device. Particularly, it relates to an improvement of a rolling bearing unit which has a flange for fastening the wheel or a part of the suspension device to the peripheral surface, and comprises an inner member (or inner ring) or an outer member (or outer ring) wherein a hardened layer is formed on at least a raceway (inner raceway or outer raceway) by induction hardening.

BACKGROUND ART

A wheel-support rolling bearing unit for rotatably supporting an automobile wheel with respect to the suspension device comprises; an inner member (for example, rotating ring, hub ring) having an inner raceway on an outer peripheral surface, an outer member (for example, stationary ring) having an outer raceway on an inner peripheral surface, and a plurality of rolling elements rotatably provided between the inner raceway and the outer raceway. Moreover, many wheel-support rolling bearing units having complex shapes and provided with a flange for fastening the wheel or a part of the suspension device to the peripheral surface of the inner member or outer member, have been conventionally used. Furthermore, holes for passing studs or bolts for fastening the wheel or a part of the suspension device, are formed in a plurality of places around the circumferential direction of the flange.

On the other hand, when the rolling bearing is in use, high surface pressure is repeatedly loaded from the respective rolling elements to the outer raceway and the inner raceway. Accordingly, in order to ensure the rolling fatigue life of the rolling bearing, it is necessary to increase the surface hardness and the wear resistance of the outer raceway and the inner raceway. Considering such a situation, conventionally, for the standard rolling bearing, a material made of high carbon chrome steel such as SUJ2, which is quenched and tempered to harden the whole surface, has been used.

However, of the inner member and the outer member constituting the wheel-support rolling bearing unit, a member provided with a flange has a complex shape compared to the inner member and the outer member constituting the standard rolling bearing. Accordingly, considering to ensure the hot forging property, the cutting property, and the drilling property, the member provided with the flange which is made from a medium carbon steel such as S53C wherein a hardened layer is formed by induction hardening on the inner raceway or the outer raceway and on the periphery of the raceway portions, has been used in many cases.

For example, a wheel-support rolling bearing unit 1 as shown in FIGS. 1 and 2, for rotatably support an automobile wheel with respect to a suspension device, has been widely used.

The wheel-support rolling bearing unit 1 shown in FIG. 1 comprises a hub ring 2 and an inner ring 3 constituting the rotating ring (inner member), an outer ring 4 being the stationary ring (outer member), and a plurality of rolling elements 5. A flange 6 for supporting the wheel is formed at the outside end portion of the outer peripheral surface of the hub ring 2 (outside in the widthwise direction means the side towards the widthwise outside when assembled in the vehicle; the left side in FIGS. 1 and 2, while conversely, the side towards the widthwise center is the inside in the widthwise direction; the right side in FIGS. 1 and 2). Moreover a first inner raceway 7a is formed on the outer peripheral surface of a middle portion of this hub ring 2. Similarly, a step portion 8 having a reduced outer diameter is formed at the inside end portion thereof. Furthermore, the inner ring 3 having a second inner raceway 7b formed on the outer peripheral surface is fitted onto the step portion 8, thereby constituting the rotating ring. Moreover, the inner end face of this inner ring 3 is pressed by a crimped portion 9 which is formed by swaging radially outwards a cylindrical portion formed at the inside end portion of the hub ring 2, so that the inner ring 3 is fixed in place on the hub ring 2. A flange 11 for a suspension device is provided on the outer ring 4. Double row outer raceways 10a and 10b are formed on the inner peripheral surface of the outer ring 4. A plurality of rolling elements 5 are rotatably provided respectively between the outer raceways 10a and 10b and the inner raceways 7a and 7b.

Next, in the wheel-support rolling bearing unit 1 shown in FIG. 2, a hub ring 2 being the rotating ring with a flange 6 for supporting the wheel formed on the outer peripheral surface, is arranged around a pair of inner rings 3 being the stationary rings which are fitted onto a supporting shaft (not shown) and are not rotatable. A plurality of rolling elements 5 are provided respectively between the outer raceways 10a and 10b which are formed on the inner peripheral surface of this hub ring 2, and the inner raceways 7a and 7b which are formed on the outer peripheral surface of the respective inner rings 3.

In either of the examples shown in FIGS. 1 and 2, balls are used as the rolling elements 5. However in some cases, taper rollers may be used as the rolling elements in the case of a rolling bearing unit for an automobile which is of increased weight.

In order to assemble the abovementioned wheel-support rolling bearing unit 1 to an automobile, if the structure is such as in FIG. 1, the attaching portion 11 in the shape of an outward flange formed on the outer peripheral surface of the outer ring 4, is screw fastened to a component of the suspension device such as the knuckle, so that the outer ring 4 being the stationary ring, is supported on the suspension device. If the structure is such as in FIG. 2, the pair of the inner rings 3 are fixed onto the supporting shaft so that the respective inner rings 3 being the stationary ring, are supported on the suspension device. In any case, the wheel is fixed to the flange 6 which is formed on the outer peripheral surface of the hub ring 2 (inner member in FIG. 1 and outer member in FIG. 2). As a result, the wheel can be rotatably supported with respect to the suspension device.

The hub ring 2 constituting the wheel-support rolling bearing unit 1 as described above is made from a medium carbon steel such as a carbon steel for machine structural use such as S53C, considering to ensure the hot forging property and the cutting property. During production, firstly a bar-shaped material cut into a predetermined length is heated to the austenite range at around 1100 to 1200° C. by high frequency induction heating. Then it is formed into a predetermined shape by hot forging, and cooling is performed. During this process, a complex structure of pro-eutectoid ferrite and pearlite can be obtained by pearlite transformation which occurs during the time since the pro-eutectoid ferrite is precipitated from the austenite grain boundary until it is cooled to room temperature. Heat treatment such as quenching and tempering is not applied to most parts of such a structure, it being used as is.

On the other hand, if the structure is such as shown in FIG. 1, a hardened layer is formed by induction hardening in the region from the root portion on the inside surface side in the axial direction of the flange 6 and the first inner raceway 7a to the step portion 8 as shown by hatching in FIG. 1, in order to ensure the rolling fatigue life and to prevent fretting at the fitting portion.

In the case of such a structure, a portion of the members having the flange 6, which is not subjected to induction hardening, is used in the condition where only the hot forging is applied (hardening treatment is not applied). In the description hereunder, non-thermal refined portion denotes a portion which is not subjected to induction hardening and is used in the condition where only hot forging has been applied.

On the other hand, recently, in order to increase the fuel efficiency and the running performance of automobiles, the wheel-support rolling bearing unit 1 has been required to be lightened, and it has also been considered to thin the wall of the flange 6 for supporting the wheel. However, if the wall of the flange 6 is thinned, since the strength of the root portion of this flange 6 is weakened, sufficient consideration is required so as to ensure the strength when thinning the wall.

Particularly at the root portion on the outside surface side of the flange 6, bending stress is concentrated due to the moment load applied to the wheel-support rolling bearing unit 1 between the suspension device and the wheel, at the time of turning travel and the like. Accordingly, if no countermeasures are taken, damage such as cracks are possibly produced based on the metal fatigue. On the other hand, as described above, the root portion on the inside surface side of the flange 6 is very strong since a hardened layer is formed thereon by induction hardening, so that the fatigue strength is higher than that of the root portion on the outside surface side, and damage such as cracks are less likely to occur.

Moreover, since a torsional stress is applied to the flange 6 accompanied with the rotation of the wheel, if this flange is the non-thermal refined portion, damage such as cracks is easily produced also in this flange 6. Therefore, in order to thin the wall of this flange 6, it is necessary to increase the rotating bending fatigue strength and the torsional fatigue strength of the non-thermal refined portion in this flange and the root portion of this flange.

On the other hand, in Japanese Unexamined Patent Publication No. 2002-87008, a structure is described where the strength of the root portion on the outside surface side of the flange is increased by forming a surface hardened layer also on the root portion on the outside surface side of the flange by induction hardening, similarly to the root portion on the inside surface side of the flange.

Moreover, in Japanese Unexamined Patent Publication No. 2001-200314, it is described that, with the object of ensuring workability of the member which is rotating together with the wheel at the time of usage (rotating member), and increasing the rolling fatigue life of the raceway having the hardened layer, this rotating member is made from an alloy steel wherein the C content is more than S53C and less than SUJ2, and alloy components such as Si, Cr and the like are added.

However, in the bearing unit for a wheel described in Japanese Unexamined Patent Publication No. 2002-80778, the cost is increased due to an increase in the induction hardened portion at the outside root portion 14, and there is concern of a decrease in the shock-proof due to quenching and hardening the inside root portion 12 and the outside root portion 14 of the flange 6 for attaching a wheel.

Moreover, in the conventional structure described in Japanese Unexamined Patent Publication No. 2001-200314, there is no consideration given to increasing the rotating bending fatigue strength or the torsional fatigue strength of the non-thermal refined portion.

Therefore, in order to proceed to thin the wall of the flange 6 for attaching a wheel without quenching and hardening the outside root portion 14 of the flange 6, it is necessary to increase the endurance ratio (fatigue limit strength/tensile strength), considering the fatigue strength and the cutting property after forging.

Moreover, recently, in the wheel-support flanged bearing unit, with an object of suppressing vibration during running and partial wear of a brake, highly accurate working of the brake rotor fastening surface of the flange 6 has been required. Since the flange 6 is worked by turning and drilling, a good cutting property and drilling property of the material has been further strongly required. However, in the flanged bearing unit described in the abovementioned Japanese Unexamined Patent Publication No. 2002-200314, problems with the cutting property and the drilling property of material have not been solved. If the cutting property and the drilling property are poor, the productivity and the tool life are decreased, being a factor for increasing the cost.

Furthermore, as a method of increasing the cutting property and the drilling property of the material, it is effective to decrease the C amount contained in the steel. However, if the C amount is decreased, there is a problem of decreasing the rolling fatigue life of the induction hardened raceway 13.

In addition, since the rotating ring (wheel) side rotates while supporting the load, repetitive rotating bending stress is generated in the root portion of the flange 6. Since the root portion of the flange 6 includes the non-thermal refined portion which is not subjected to induction hardening, fatigue strength of the non-thermal refined portion is also required.

The present invention takes the above problems into consideration with an object of providing a flanged bearing unit which increases the fatigue strength of the flange without increasing the induction hardened portion, so as to enable lightening of the flange by thinning the wall, and a method of manufacturing the bearing unit.

Moreover, as described above, the hub ring 2 constituting the wheel-support rolling bearing unit 1 is made from a medium carbon steel such as S53C, in consideration of ensuring the hot forging property and the cutting property. During production, the bar-shaped material cut into the predetermined length is heated by high frequency induction. Then, hot forging is applied in the austenite range at around 1100 to 1200° C. so as to form the product. Most parts are used without having quenching and tempering applied. However, in the region from the inside root portion 12 of the flange 6 through the inner raceway surface 7a to the small diameter step portion 8, an induction hardened layer 13 (shown by hatching in FIG. 1) is formed with the object of ensuring rolling fatigue life and preventing fretting of the inner ring fitting portion. The portions which are not subjected to induction hardening are used in the condition of heat treatment where only the hot forging has been applied (non-thermal refined portion).

At this time, firstly, due to the cooling after hot forging, a ferrite structure is produced and the rest becomes a pearlite structure. In this manner, since the two phases have different transformation temperatures, then due to the effect of the cooling rate in the vicinity of the transformation point and the size of the austenite grains which are grown at the time of heating (these may also be called prior austenite grains due to the relation of ferrite-pearlite), the transformation behavior is changed and a structure having a different final ferrite-pearlite fraction can be obtained.

At the time of assembling the wheel-support rolling bearing unit 1, after fitting the inner ring 3 onto the small diameter step portion 8 of the hub ring 2, as shown in FIG. 1, there is a step for flaring the cylindrical portion 9 of the hub ring 2 radially outwards in order to fix the inner ring 3 and the hub ring 2. In this step, cold working with a high processing rate is performed at a high rate of strain, wherein a load oriented radially outwards is applied to the cylindrical portion 9 while rotating the whole wheel-support rolling bearing unit 1.

However, when such swaging is performed, there has been a problem of cracking in the radial direction on the surface. Therefore, in Japanese Unexamined Patent Publication No. 2002-139060, a technique for suppressing the cracks by rounding the corner of the end surface of the cylindrical portion, is proposed. In Japanese Unexamined Patent Publication No. Hei 12-087978, a technique for increasing slip-off resistance by improving the curved shape of the final surface crimped from the cylindrical portion is proposed.

However, the abovementioned problems can not be solved in some cases if the deformation load and the deformation velocity when swaging is increased. Here, an object of the present invention is to solve the above problems and to provide a wheel-support rolling bearing unit wherein cracks are unlikely to occur at the time of swaging.

DISCLOSURE OF THE INVENTION

Similarly to the conventionally known wheel-support rolling bearing unit described above, a wheel-support rolling bearing unit of the present invention comprises; an inner member having an inner raceway on an outer peripheral surface, an outer member having an outer raceway on an inner peripheral surface, a plurality of rolling elements rotatably provided between the inner raceway and the outer raceway, and a flange provided on the peripheral surface of at least one member of the inner member and the outer member, for fastening a part of a suspension device or a wheel. Moreover, in a portion being a part of at least one member (rotating member) of the inner member and the outer member and including the inner raceway or the outer raceway, a hardened layer is formed by induction hardening.

Particularly, in a first aspect of the wheel-support rolling bearing unit of the present invention, alloy components are optimized in an alloy steel constituting at least one member provided with the flange, of the inner member and the outer member.

That is, at least one member of the inner member and the outer member is made from an alloy steel containing 0.5 to 0.65 weight % of C, 0.3 to 1.5 weight % of Mn, 0.1 to 1.0 weight % of Si, and 0.01 to 0.5 weight % of Cr, and the S content is kept to 0.035 weight % or less, and further including any one type or more selected from 0.01 to 0.2 weight % of V, 0.01 to 0.15 weight % of Nb, and 0.01 to 0.15 weight % of Ti, with the rest being Fe and inevitable impurities, and the oxygen contents of the alloy steel is 15 ppm or less.

Moreover, for at least one member of the inner member and the outer member, the surface hardness of the inner raceway or the outer raceway formed with the hardened layer, is between Hv 650 and 780. For at least one member of the inner member and the outer member, the surface hardness of a portion not formed with the hardened layer is between Hv 230 and 300.

Furthermore, in the case where in the alloy steel constituting the at least one member of the inner member and the outer member, the C content is $x_1$ weight %, the V content is $x_2$ weight %, the Nb content is $x_3$ weight %, and the Ti content is $x_4$ weight %, the contents of C, V, Nb, and Ti are controlled so as to satisfy $0.30 \leq \{x_1 - 1.5(x_2 + x_3 + x_4)\} \leq 0.55$.

In the case of the wheel-support rolling bearing unit of the present invention constructed as described above, at least one member provided with the flange of the inner member and the outer member can be made in the following steps. Firstly, hot forging is applied to an alloy steel constituting the one member so as to form the material into a rough shape, to which cutting such as turning for trimming the size and the shape of surface, and drilling for drilling holes which pass the stud and the bolt in the flange, are applied. Next, after forming the hardened layer by applying induction hardening to a predetermined portion of this material, grinding is applied to a portion being a part of this hardened layer which will become the raceway, so as to finish this raceway to make one member. Moreover, a portion which is not subjected to induction hardening in this one member remains in the condition of the metal structure after hot forging.

On the other hand, the rotating bending stress and the torsional stress based on the force received by the wheel from the ground while the wheel is rotating, are applied to the flange, particularly a flange for fastening the wheel, and the periphery of this flange. The metal structure after hot forging of the one member made from a medium carbon steel becomes a ferrite/pearlite structure where the pro-eutectoid ferrite is precipitated in a net shape along the prior austenite grain boundary. Since the ferrite structure is less strong compared to the pearlite structure, then a metal structure having the pro-eutectoid ferrite coarsely precipitated may possibly have a lower fatigue strength. The present inventors have obtained findings showing that it is effective to the finely and dispersingly precipitate the pro-eutectoid ferrite which is precipitated in a net shape, in order to increase the fatigue strength of the portion being the ferrite/pearlite structure of the one member.

In the present invention, V, Nb, and Ti, one type or more of which are contained in the alloy steel constituting the one member, have an effect of producing fine carbide or carbonitride in this alloy steel and suppressing coarsening of the austenite grains, which occurs when the steel material is heated at the time of hot forging. Since the pro-eutectoid ferrite in the ferrite/pearlite structure is precipitated along the prior austenite grain boundaries, if the austenite grains become small, the grain boundary area is increased and the precipitation site (precipitation place) of the pro-eutectoid ferrite is increased. Moreover, fine carbide or carbonitride of V, Nb, or Ti have an effect of being the precipitation site for the pro-eutectoid ferrite at the time of cooling after hot forging. Therefore, in the case of the wheel-support rolling bearing unit of the present invention wherein the one type or more selected from V, Nb, and Ti is added to the alloy steel constituting the one member, the precipitation sites for the pro-eutectoid ferrite are remarkably increased, so that a metal structure having ferrite finely dispersed can be obtained, thus improving the fatigue strength of the non-thermal refined portion in the flange or on the periphery of the flange.

Furthermore, according to the present invention, the rolling fatigue life of the inner raceway or the outer raceway having the hardened layer formed by induction hardening can be increased. That is, the induction hardened metal structure mainly becomes a martensite structure. However one type or more selected from V, Nb, or Ti is added to the alloy steel used in the present invention. Accordingly, fine carbide or carbonitride can be dispersed in the martensite structure. Therefore, the wear resistance and the hardness of the inner raceway or the outer raceway can be increased so that the rolling fatigue life of the inner raceway or the outer raceway can be improved.

Next is a detailed description of the reason for adding the respective alloy components to the alloy steel constituting one member, the reason for controlling the content of the respective alloy components, and the reason for controlling the surface hardness of this one member.

Among the respective alloy components, C is added to ensure the hardness after hot forging and the hardness after quenching and tempering. If the C content in this alloy steel is less than 0.5 weight %, the hardness at the time of quenching is insufficient so that the rolling fatigue of the inner raceway or the outer raceway is decreased. Moreover, the hardness after hot forging is insufficient so that the fatigue strength of the non-thermal refined portion is also decreased. Conversely, if the C content exceeds 0.65 weight %, the hardness after hot forging becomes excessive so that the cutting properties and the drilling properties are decreased. Therefore, in the present invention, the C content in the alloy steel is controlled to between 0.5 weight % and 0.65 weight %.

Moreover, Mn is added to increase the quenching property of the alloy steel. If the Mn content in this alloy steel is less than 0.3 weight %, the hardened layer formed by induction hardening becomes thin so that the rolling fatigue of the inner raceway or the outer raceway is decreased. Conversely, if the Mn content exceeds 1.5 weight %, workability of the alloy steel is decreased. Therefore, in the present invention, the Mn content in this alloy steel is controlled to between 0.3 and 1.5 weight %. It is preferably between 0.5 and 1.0 weight % considering, the productivity at the time of quenching, the cutting property, and the drilling property.

Si is added to increase the quenching property of the alloy steel, strengthen the martensite structure, and increase the rolling fatigue life. Moreover, by adding Si, Si is dissolved in the solid-solution of ferrite of the non-thermal refined portion to increase the strength of the ferrite structure so that the fatigue strength of the non-thermal refined portion can be increased. If the Si content in the alloy steel is less than 0.1 weight %, this effect can not be sufficiently demonstrated. Conversely, if the Si content exceeds 1.0 weight %, the hot forging property of the alloy steel is decreased. Furthermore, since decarbonization becomes large after forging, the fatigue strength is decreased in the surface portion on which cutting is not performed after hot forging, but which is used in the as forged condition. Therefore, in the present invention, the Si content in the alloy steel is controlled to between 0.1 and 1.0 weight %.

Similarly to Si, Cr is also added to increase the quenching property of the alloy steel, strengthen the martensite structure, and increase the rolling fatigue life. If the Cr content in the alloy steel is less than 0.01 weight %, the hardened layer formed by induction hardening becomes thin and the strength of the martensite structure is decreased so that the rolling fatigue life is decreased. Conversely, if the Cr content exceeds 0.5 weight %, the hot forging property and the cutting property of the alloy steel are decreased. Therefore, in the present invention, the Cr content in the alloy steel is controlled to between 0.01 and 0.5 weight %.

If S is added to the alloy steel, it forms non-metallic inclusions such as MnS in this alloy steel. If MnS is present in the induction hardened inner raceway or outer raceway, the MnS becomes the starting point for flaking of the raceway surface, causing a decrease in the rolling fatigue life. Moreover, conventionally, a separate hub ring and inner ring are combined, and the end of this hub ring is expanded by swaging so as to make a firmly combined hub ring and inner ring, which have been widely used as the inner member constituting the wheel-support rolling bearing unit. If MnS is in the non-thermal refined portion at the end portion of the hub ring in such an inner member, the MnS may possibly become the starting point for cracks in the crimped portion. From such two reasons, no S is preferably added, or if it is added, the S content is preferably as small as possible. If the S content exceeds 0.035 weight %, the rolling fatigue life may be decreased and cracks may be produced in the crimped portion. Therefore, in the present invention, no S is added to the alloy steel, or if it is added, the content is suppressed to 0.035 weight % or less. Moreover, the S content in the alloy steel is preferably suppressed to 0.020 weight % or less considering to stably ensure the rolling fatigue life, and to effectively prevent cracks in the crimped portion.

Furthermore, if the oxygen contents in the alloy steel is increased, since non-metallic inclusions such as $Al_2O_3$ which become the starting point for flaking of the raceway surface are formed in the induction hardened inner raceway or outer raceway, the rolling fatigue life is decreased. Accordingly, in order to increase the rolling fatigue life, the oxygen contents in the alloy steel is preferably decreased. If the oxygen contents exceeds 15 ppm, the rolling fatigue life may be decreased. Therefore, in the present invention, the oxygen contents in the alloy steel is controlled to 15 ppm or less.

V, Nb, and Ti are important components which increase the bending fatigue strength of the non-thermal refined portion, and the rolling fatigue life of the inner raceway or the outer raceway having the hardened layer formed by induction hardening in the wheel-support rolling bearing unit of the present invention. V among them forms carbide or carbonitride in the alloy steel and suppresses the growth of austenite grains at the time of hot forging to decrease the size of the prior austenite grains. The prior austenite grain boundary becomes the precipitation site for pro-eutectoid ferrite which is precipitated in the austenite grain boundary at the time of cooling after hot forging. Accordingly, if the prior austenite grains become small and the area of the prior austenite grain boundary is increased, the precipitation site for pro-eutectoid ferrite is increased so that the ferrite is finely dispersed. Moreover, since V carbide or carbonitride itself also becomes a precipitation site for pro-eutectoid ferrite, pro-eutectoid ferrite is precipitated from the finely dispersed carbide and carbonitride, giving a structure where the ferrite is finely dispersed. Particularly, regarding V carbide or carbonitride in the prior austenite grain boundary, pro-eutectoid ferrite is precipitated from the respective carbide particles or carbonitride particles. Accordingly, if V is added to the alloy steel, the ferrite precipitated in net shape in the prior austenite grain boundaries can be fragmented, and the extension of fatigue cracks in the ferrite structure can be prevented, and the fatigue strength of the non-thermal refined portion having the ferrite/pearlite structure can be increased. Moreover, since V carbide or carbonitride has an extremely high hardness, if it is finely dispersed in the martensite structure of the induction hardened inner raceway or outer raceway, the wear resistance can be increased and the rolling fatigue life can be increased. If the V content in the alloy steel is less than 0.01 weight %, the above effect will not be demonstrated. Conversely, if the V content exceeds 0.2 weight %, the hot forging property, the cutting property, and the grindability are decreased. Therefore, in the present invention, if V is added to the alloy steel, the V content is controlled to between 0.01 weight % and 0.2 weight %.

Similarly to V, Nb and Ti are also important components which form carbide or carbonitride in the alloy steel and suppress the growth of prior austenite grains. Accordingly, if Nb and Ti are added to the alloy steel, the area of the prior austenite grain boundary can be increased and the precipitation site for pro-eutectoid ferrite can be increased. Therefore, the pro-eutectoid ferrite can be minutely dispersed in the non-thermal refined portion having the ferrite/pearlite structure, and the fatigue strength can be increased. Particularly, Nb and Ti have a significant effect of suppressing the growth of prior austenite grains. If the Nb or Ti content in the alloy steel is less than 0.01 weight %, the above effect will not be demonstrated. Conversely, if the Nb or Ti content exceeds 0.15 weight %, the hot forging property, the cutting property, and the grindability are decreased. Therefore, in the present invention, if Nb or Ti is added to the alloy steel, the Nb or Ti content is controlled to between 0.01 weight % and 0.15 weight %.

Moreover, since the inner raceway or the outer raceway receives a high surface pressure from the respective rolling elements during use, high hardness which can withstand the high surface pressure is required in order to ensure the rolling fatigue life. Therefore if the surface hardness of the inner raceway or the outer raceway is less than Hv 650, the hardness is insufficient so that the rolling fatigue life is decreased. Conversely, if the surface hardness exceeds Hv 780, the toughness is decreased so that the shock-proof is decreased. Therefore, in the present invention, the surface hardness of the inner raceway or the outer raceway having the hardened layer formed by induction hardening, is controlled to between Hv 650 and Hv 780.

Moreover, in the non-thermal refined portion in the flange and on the periphery of this flange, it is necessary to ensure the fatigue strength. As described above, in the present invention, since the content of the alloy components in the alloy steel constituting the one member is controlled, ferrite in the metal structure can be finely precipitated to increase the fatigue strength of the non-thermal refined portion. Furthermore, in the present invention, since the surface hardness of this non-thermal refined portion in the one member is controlled to between Hv 230 and Hv 300, the fatigue strength of this non-thermal refined portion can be further increased. Therefore if this surface hardness is less than Hv 230, the fatigue strength of this non-thermal refined portion is decreased. Conversely, if this surface hardness exceeds Hv 300, the cutting property and the drilling property of this non-thermal refined portion are decreased. In the present invention, the hardness of the non-thermal refined portion which does not have the hardened layer formed by induction hardening in the one member, is controlled to between Hv 230 and Hv 300, so that the surface hardness of this non-thermal refined portion after hot forging can be ensured, and the fatigue strength of this non-thermal refined portion can be ensured without decreasing the cutting property and drilling property of this non-thermal refined portion. Moreover, the surface hardness of this non-thermal refined portion is preferably controlled to between Hv 250 and Hv 280 considering the more stable increase in the fatigue strength of the non-thermal refined portion, and the productivity at the time of cutting and at the time of drilling.

Furthermore, $\{x_1-1.5(x_2+x_3+x_4)\}$ is a value which affects the precipitated amount of ferrite. If this $\{x_1-1.5(x_2+x_3+x_4)\}$ value exceeds 0.55, that is if the C content is too much and the V, Nb and Ti content is too little in the alloy steel, the pearlite is increased and the precipitation site for ferrite is insufficient, so that the precipitated amount of ferrite is decreased. As a result, the cutting property of the alloy steel is considerably decreased. Conversely, if the $\{x_1-1.5(x_2+x_3+x_4)\}$ value is less than 0.30, that is if the C content is toolittle and at least any one of the V, Nb and Ti content is too much in the alloy steel, it is difficult for the pearlite to be produced and the precipitation sites for the ferrite are increased so that the precipitated amount of the ferrite is increased too much. As a result, the hardness of the alloy steel is decreased so that the fatigue strength of one member is decreased. Moreover, if at least any one of the V, Nb and Ti content is too much, the carbide or the carbonitride of these components is also increased too much so that the cutting property is decreased. Therefore, in the present invention, $\{x_1-0.5(x_2+x_3+x_4)\}$ is preferably controlled to between 0.30 and 0.55. According to the preferred structure controlled in this manner, the fatigue strength can be further increased while maintaining the cutting property of the one member in an excellent condition.

The present invention makes it possible to thin the wall of the flange and to lighten the wheel-support rolling bearing unit by increasing the fatigue strength of the root portion without increasing the induction hardened portion, that is, without quenching the root portion on the axial outside surface side of the flange.

In another aspect of the wheel-support rolling bearing unit of the present invention, at least a portion of the rotating ring that is provided with the flange is made from a carbon steel containing 0.5 to 0.8 weight % of C. In this rotating ring, at least the hardness of the surface of the root portion on the axial outside surface side of the flange is between 24 and 35 by Rockwell hardness C scale (150 kg load, diamond pyramid), that is between 260 and 345 by Vickers hardness.

Moreover, in the rotating ring, at least the surface roughness of the root portion on the axial outside surface side of the flange is between 0.1 and 1.01 μm by arithmetic average roughness Ra.

Furthermore, in the rotating ring, at least the surface roughness of the root portion on the axial outside surface side of the flange is 10 μm or less by maximum height Ry (more preferably between 1 and 61 μm Ry).

According to the wheel-support rolling bearing unit of the present invention constructed as described above, the fatigue strength of the root portion on the axial outside surface side of the flange formed on the outer peripheral surface of the rotating ring can be increased without quenching and hardening the root portion. Hereunder is a description of the detailed reason.

While the rotating ring is rotating together with the wheel at the time of running, a radial load is applied to the wheel-support rolling bearing unit provided between the wheel in contact with the road surface and the suspension device supported by the vehicle body. Moreover, a rotating bending stress is generated in the root portion of the flange by this radial load and the rotation moment.

The rotating ring having the flange provided on the outer peripheral surface is made from a medium carbon steel such as S53C by applying hot forging. The reason for using the medium carbon steel is in consideration of the hot forging property and the cutting property. The inventors of the present invention made the rotating ring from such medium carbon steel by hot forging, and then examined in detail the hardness of the root portion on the axial outside surface side of the flange, which showed about 18 to 23 by Rockwell hardness C scale (HRC). The fatigue strength with respect to the rotating bending stress tends to be increased (stronger) as the hardness in the vicinity of the material surface is higher (harder). Therefore, the surface in the vicinity of the root portion on the axial outside surface side of the flange is preferably harder.

In the present invention, the surface hardness of this root portion is HRC 24 (Hv 260) or more, so that the fatigue strength with respect to the rotating bending stress is sufficiently high, and the wall of the flange can be easily thinned. Conversely speaking, if the surface hardness of this root portion is less than HRC 24, the fatigue strength is low so that it is difficult to thin the wall of the flange sufficiently.

On the other hand, since the wheel-support rolling bearing unit receives the impact load applied from the wheel at the time of travelling on a bad road, shock-proof (toughness) is also required for the root portion of the flange. The shock-proof tends to conflict with the fatigue strength and is decreased as the material hardness is higher. The root portion on the inside surface side of the flange is close to the inner raceway 7a and is a portion pressingly in contact with the tip edge of the seal lip of the seal ring 12. Accordingly, in order to ensure the hardness of this inner raceway 7a and prevent wear of the root portion, it is necessary to form a hardened layer by induction hardening. Therefore, it is unavoidable that the hardness of the root portion of the flange is increased on the inside surface side.

If by following this, the hardness on the outside surface side of the root portion of the flange becomes too high, the hardness on both the interior and exterior opposite sides of the root portion of the flange becomes higher so that the shock-proof of the root portion may possibly be decreased excessively. Moreover, the cutting property on the outside surface side of the root portion of the flange is also decreased. In the present invention, the surface hardness of the root portion on the axial outside surface side of the flange is suppressed to HRC 35 (Hv 345) or less, while increasing the fatigue strength of the root portion, in consideration of suppressing the decrease in shock-proof and ensuring the cutting property.

In short, in the present invention, the surface hardness of the root portion on the axial outside surface side of the flange is between HRC 24 and 35, so that while ensuring the shock-proof and the cutting property, the fatigue strength of the root portion is increased. In order to obtain such an operation and effect in a higher order, the surface hardness of the root portion on the axial outside surface side of the flange is preferably between HRC 26 and 33.

Next is a description of the reason for increasing the fatigue strength with respect to the rotating bending stress in the present invention. The inventors of the present invention observed cracks based on fatigue produced in the flange root portion due to the rotating bending stress, resulting in the findings that the cracks were due to surface starting points. Such crack generation due to the surface starting points can be suppressed by improving the surface roughness and relieving the localized stress concentration generated in the minute irregularities on the surface. As a result, the fatigue strength in this portion is increased.

In the present invention, the surface roughness of the root portion on the axial outside surface side of the flange is suppressed to 1.0 $\mu$m or less by arithmetic average roughness Ra, or 10 $\mu$m or less by maximum height Ry, so as to smoothen the surface of this portion so that the localized stress concentration can be relieved. Moreover, crack generation based on the stress concentration can be suppressed and the fatigue strength of the root portion can be increased. From the aspect of increasing the fatigue strength of this portion, the surface roughness of the root portion is preferably as low as possible. However, even if the surface roughness of this portion is less than 0.1 $\mu$m by arithmetic average roughness Ra, or less than 1.0 $\mu$m by maximum height Ry, the fatigue strength is hardly increased further (the effect becomes saturated). In any case, the cost required for surface treatment in order to improve the surface roughness of the portion is needlessly increased. That is, in order to make this surface roughness less than 0.1 $\mu$m Ra and less than 1.0 $\mu$m Ry, it is necessary to polish or cut the root portion, while more than two types of grindstones or cutting tool having different roughness are serially changed during use, causing a needless increase in work cost. Accordingly, the surface roughness of the root portion is preferably 0.1 $\mu$m or more by arithmetic average roughness Ra and 1.0 $\mu$m or more by maximum height Ry, from the aspect of keeping the work cost down.

Moreover, when the above wheel-support rolling bearing unit is made, for the rotating ring, a carbon steel containing 0.5 to 0.8 weight % of C is used for at least the metal material constituting the portion (hub ring 2) provided with the flange.

If the C amount contained in the carbon steel is less than 0.5 weight %, the hardness after induction hardening is insufficient and the precipitation of carbide is decreased. Therefore the rolling fatigue life of the raceway surface portion (inner raceway 7a in the structure of FIG. 1, outer raceways 10a and 10b in the structure of FIG. 2) becomes insufficient. Moreover, the hardness of the root portion on the axial outside surface side of the flange is difficult to ensure stably. That is, it is difficult for the hardness of the root portion to be between 24 and 35 by Rockwell hardness C scale, that is between 260 and 345 by Vickers hardness. From the above reason, the C amount contained in the carbon steel is 0.5 weight % or more. The C content in the carbon steel is preferably 0.55 weight % or more, considering sufficiently ensuring the rolling fatigue life of the raceway surface portion and further stably ensuring the hardness of the root portion. That is, the C contained in the carbon steel is an alloy element which greatly affects the hardness after hot forging. If the content is 0.55 weight % or more, the hardness of the portion having the flange provided on the rotating ring after working by hot forging can be increased and the hardness of the root portion can be stably made within the above range.

On the other hand, if the C content in the carbon steel exceeds 0.8 weight %, the workability including the hot forging property and the cutting property at least of the portion having the flange provided on the rotating ring is decreased and the productivity is decreased, causing an increase in the cost. From these reasons, the C content contained in the carbon steel constituting the portion having the flange provided in the rotating ring is between 0.5 weight % (preferably 0.55 weight %) and 0.8 weight %.

Moreover, in another aspect of the present invention, in order to provide a flanged bearing unit in which the fatigue strength of the flange is increased without increasing the induction hardened portion, so as to enable lightening of the flange by thinning the wall, and a method of manufacturing this bearing unit, in the flanged bearing unit comprising: an inner member having a raceway surface on an outside surface; an outer member having a raceway surface facing the raceway surface of the inner member on an inside surface and arranged on the outside of the inner member; rolling elements rotatably arranged between the raceway surfaces; and a flange provided at least on one of the inner member and the outer member, at least the member provided with the flange is made from a carbon steel having a carbon content between 0.45 weight % and 0.65 weight %, and an area ratio of pro-eutectoid ferrite of at least the flange is between 3 and 15%.

The S content of the carbon steel is preferably between 0.003 weight % and 0.020 weight %. The relation between the S content and the area ratio of the pro-eutectoid ferrite structure is preferably 10≦(S content (weight %)×1000+area ratio of pro-eutectoid ferrite structure (%)) ≦30.

Moreover, the area ratio of the pro-eutectoid ferrite structure with respect to the S content preferably satisfies the relation of 1≦(S content (weight %)×1000)/area ratio of pro-eutectoid ferrite structure (%)≦2.

The area ratio of the pro-eutectoid ferrite per unit area (10 mm$^2$) of the root portion on the outside in the thickness direction of the flange is preferably between 3 and 15%. Preferably, the maximum length of the pro-eutectoid ferrite is 2001 $\mu$m or less, and the number of pro-eutectoid ferrites having a length of 180 $\mu$m or more is five or less.

The member provided with the flange preferably has a V (Vanadium) content of 0.05 to 0.3 weight %.

The present invention is made based on the findings that it is effective to evenly refine the metal structure after hot forging in order to increase the rotating bending fatigue strength of the non-thermal refined portion which is not subjected to induction hardening, and the object can be achieved by optimizing the hot forging method. In a method of manufacturing a flanged bearing unit wherein a plurality of rolling elements are arranged between an inner member and an outer member having a flange for attaching at least one member of the inner member and the outer member on a fixed side or a rotation side, and having a hardened layer made by induction hardening at least in the vicinity of a raceway portion, at least the member provided with the flange is formed by hot forging using an alloy steel containing C, 0.45 to 0.65 weight %, Mn: 0.3 to 1.5 weight %, Si: 0.1 to 1.0 weight %, Cr: 0.01 to 0.5 weight %, S≦0.025 weight %, O≦ 15 ppm, and the rest being Fe and inevitable impurities, and the material heating temperature at the time of the hot forging is between 900 and 1050° C., and the temperature at the time of finishing forge stamping is 800° C. or more.

The average cooling rate from the temperature at the time of finishing the forge stamping until reaching 600° C. is preferably between 0.5 and 5° C./sec.

Moreover, in a method of manufacturing a flanged bearing unit wherein a plurality of rolling elements are arranged between an inner member and an outer member having a flange for attaching at least one member of the inner member and the outer member on a fixed side or a rotation side, and having a hardened layer made by induction hardening at least in the vicinity of a raceway portion, at least the member provided with the flange is formed by hot forging using an alloy steel containing C, 0.45 to 0.65 weight %, Mn: 0.3 to 1.5 weight %, Si: 0.1 to 1.0 weight %, Cr: 0.01 to 0.5 weight %, S≦0.025 weight %, O≦15 ppm, and the rest being Fe and inevitable impurities, and the material heating temperature at the time of the hot forging is between 900 and 1050° C., and the average cooling rate from the temperature at the time of finishing forge stamping until reaching 600° C. is between 0.5 and 5° C./sec.

In the manufacturing method, an alloy steel containing at least one type of V: 0.01 to 0.2 weight %, Nb: 0.01 to 0.15 weight % and Ti: 0.01 to 0.15 weight % is preferably used.

The flanged bearing unit made by the manufacturing method, has a plurality of rolling elements arranged between an inner member and an outer member, and a flange for attaching at least one member of the inner member and the outer member on a fixed side or a rotation side, and has a hardened layer made by induction hardening at least in the vicinity of the raceway portion, and the metal structure of the root portion of the flange contains a ferrite/pearlite structure, and a prior austenite grain size number of the ferrite/pearlite structure is 4 or more.

Such an invention is made based on the findings that, by optimizing the alloy elements, that is decreasing the C contained in the steel and adding Si and V in a predetermined proportion, the rolling fatigue life of the induction hardened raceway is maintained, and the cutting property and the drilling property are increased so as to enable accurate working without decreasing the productivity, and furthermore the fatigue strength of the non induction hardened non-thermal refined portion can be increased. In a wheel-support flanged bearing unit having a plurality of rolling elements arranged between an inner member and an outer member, and a flange for attaching at least one member of the inner member and the outer member on a vehicle body side or a wheel side, and having a hardened layer made by induction hardening at least in the vicinity of the raceway portion, at least the member provided with the flange is formed from an alloy steel containing C, 0.45 to 0.50 weight %, Si: 0.3 to 1.5 weight %, V: 0.03 to 0.3 weight %, Mn≦1.5 weight %, Cr≦1.0 weight %, S≦0.035 weight %, O≦15 ppm, and the rest being Fe and inevitable impurities, and the C+0.2Si+0.5V value satisfies between 0.55 and 0.75, and the raceway portion surface hardness of the hardened layer made by the induction hardening is between Hv 630 and Hv 750, and the hardness of the portion which is not subjected to hardening treatment by the induction hardening is between Hv 220 and Hv 300.

The pro-eutectoid ferrite area ratio in the non-thermal refined portion of at least the root portion of the flange attached to the wheel side is preferably between 5% and 15%.

Moreover, in the wheel-support rolling bearing unit using the flanged bearing unit, the inner member is used as a hub ring, and a wheel attaching flange serving as the flange is arranged on one end portion of the hub ring, and an inner ring is fitted onto a small diameter step portion formed on an other end portion of the hub ring so that raceway surfaces are respectively formed on the outer peripheral surface of the inner ring and on the outer peripheral surface of an axial middle portion of the hub ring to make a double row inner raceway surface. Moreover, the outer member is used as an outer ring, and a double row outer raceway surface corresponding to the double row inner raceway surface is formed on an inner peripheral surface of the outer ring. A suspension device attaching flange is formed on an end portion on a side away from the wheel attaching flange of the outer ring. A plurality of the rolling elements are rotatably arranged between the double row inner raceway surface and the double row outer raceway surface.

Moreover, in the wheel-support rolling bearing unit according to another aspect of the present invention, a member (raceway) being at least one member of the inner member and the outer member and comprising a flange on the outer peripheral surface, is made from steel containing 0.45 to 0.60 weight % of C. Furthermore, this has a hardened layer formed by induction hardening on the raceway portion provided on the peripheral surface, and the hardness of a portion at a depth of 0.1 mm from the surface of this hardened layer is Hv 670 or more. Moreover, a prior austenite grain size of the metal structure of this hardened layer is 8 or more in grain size number according to JIS G 0551.

In the wheel-support rolling bearing unit of the present invention constructed as described above, since the properties of the member comprising the flange on the outer peripheral surface is made appropriate, the decrease in the durability of this member based on the tensile stress caused by the bending stress applied from this flange to this member is suppressed.

That is, as described above, at the time of using the wheel-support rolling bearing, in addition to the shearing stress caused by the compressive stress from the respective rolling elements, the tensile stress based on the bending stress from the flange is applied to the raceway surface of the member comprising the flange. Accordingly, in order to ensure the life of the member comprising the flange constituting the wheel-support rolling bearing unit, a countermeasure is required with respect to the shearing stress and the tensile stress.

In the wheel-support rolling bearing unit of the present invention having the structure as described above, the hardened layer is formed by induction hardening on the raceway portion, and the hardness of the portion at the depth of 0.1 mm from the surface of this hardened layer is Hv 670 or more. Therefore, it is possible to suppress a decrease in the durability of the raceway portion based on the shearing stress. That is, by sufficiently hardening the portion (Hv 670 or more), the elastic deformation of the raceway portion based on the compressive stress applied from respective rolling elements can be kept low, and the shearing stress applied to this raceway portion can be kept low. If the hardness of the portion at the depth of 0.1 mm is less than Hv 670, the shearing stress can not be sufficiently decreased and sufficient durability can not always be obtained. The reason for stipulating the hardness of the portion at the depth of 0.1 mm from the surface as the hardness of the hardened layer is that the shearing stress affecting the metal material constituting the bearing ring based on the compressive stress becomes stronger in the portion slightly inside of the surface.

In order to make the hardness of the portion at the depth of 0.1 mm from the surface Hv 670 or more, the member comprising the flange is made from a steel containing 0.45 to 0.60 weight % of C. If the C content in the steel is less than 0.45 weight %, then even if induction hardening is applied to the raceway portion of the member, the hardness of this raceway portion can not be sufficiently increased (Hv 670 or more) so that it is not possible to suppress the decrease in the durability based on the shearing stress. On the other hand, if the C content in the steel exceeds 0.60 weight %, the hot forging property and the cutting property of the member comprising the flange are decreased. When making the member comprising the flange, the working amount at the time of hot forging is large, and there are lot of parts worked by cutting. Therefore, if the hot forging property and the cutting property are decreased, the manufacturing cost of the wheel-support rolling bearing unit is increased, being undesirable. Accordingly, in the wheel-support rolling bearing unit of the present invention, the C content in the steel constituting the member comprising the flange is between 0.45 and 0.60 weight %. Of the members assembled into the wheel-support rolling bearing unit, the C content in the steel constituting the member not comprising the flange may exceed 0.60 weight %. For example, the member not comprising the flange may be made from a high-carbon chrome bearing steel such as SUJ2.

Moreover, in the wheel-support rolling bearing unit of the present invention, since the prior austenite grain size of the hardened layer of the raceway portion of the member comprising the flange is 8 or more in grain size number according to JIS G 0551, it is possible to suppress the decrease in the durability based on the tensile stress caused by the bending stress applied from the flange.

Generally, the raceway portion becomes a martensite structure by applying the heat treatment being induction hardening and tempering, and when a tensile stress acts on the metal material, a stress concentration is generated at the prior austenite grain boundary. If the stress concentration of the tensile stress is generated in addition to the shearing stress repetitively applied from the respective rolling elements in the raceway portion, fatigue cracks are easily generated as the rolling fatigue is developed, and the rolling fatigue life of the raceway portion is decreased.

On the other hand, in the wheel-support rolling bearing unit of the present invention, the prior austenite grain size of the hardened layer of the raceway portion is 8 or more in grain size number according to JIS G 0551, being fragmented. Accordingly, the stress concentration generated in the grain boundary of these prior austenite grains is released, and the fatigue cracks are unlikely to be generated as the rolling fatigue is developed, so that the rolling fatigue life of the raceway portion can be increased. If the size of the prior austenite grains is large and the grain size number according to JIS G 0551 is less than 8, the effect of releasing the stress concentration on the grain boundary of these prior austenite grains is low so that the effect of suppressing the decrease in the rolling fatigue life of the raceway portion can not be sufficiently obtained.

In order to decrease the size of the prior austenite grains, one or more of the following methods from (1) to (3) may be employed.

(1) Adjust the retention temperature under heating in the hot forging within a predetermined temperature range.

(2) Decrease the retention temperature under heating or shorten the retention time under heating at the time of induction hardening.

(3) Add an alloy element which refines the grain.

Among these, method (1) is to decrease the size of the prior austenite grains by suppressing the growth of the austenite grains.

That is, the member comprising the flange assembled into the wheel-support rolling bearing unit of the present invention is formed by hot forging. Then, cutting is applied and induction hardening is applied to the necessary portions including the raceway portion. If the size of the prior austenite grains after hot forging is large when such work is applied, the size of the prior austenite grains after induction hardening is also easily increased. Therefore, in order to keep the size of the prior austenite grains after induction hardening small, it is effective to keep the size of the prior austenite grains after hot forging small.

If the metal material (steel) is heated for hot forging, the metal structure becomes the austenite structure. In this case, as the heating temperature of hot forging is increased, the atomic diffusion is activated and the grains are easily grown so that the size of the prior austenite grains is increased. Specifically, if the heating temperature at the time of forging exceeds 1100° C., the prior austenite grains become coarse and the effect of increasing the rolling fatigue life of the raceway portion is decreased. On the other hand, if the heating temperature at the time of forging is less than 900° C., the metal material is not sufficiently softened, and the deformation resistance of this metal material is increased, thus decreasing the life of the press working machine and the mold. Considering the above, when executing the present invention, the heating temperature of the metal material at the time of hot forging is preferably between 900 to 1100° C.

Moreover, the method (2) is to suppress the increase in the size of the prior austenite grains at the time of induction hardening. That is, when heat retention is performed at the time of this induction hardening, the metal structure becomes the austenite structure. In this case, as the heating temperature is increased, the atomic diffusion is activated and the grains are easily grown so that the size of the prior austenite grains is increased. Moreover, as the heating time becomes longer, the growth of the grains is developed, so that the size of the prior austenite grains is also increased. Therefore, in order to decrease the size of the prior austenite grains, it is effective to decrease the retention temperature under heating and shorten the retention time under heating at the time of induction hardening for hardening the raceway portion.

Furthermore, the method (3) is to suppress the growth of the grains of the prior austenite at the time of hot forging and at the time of induction hardening, and to keep the size of the prior austenite grains from becoming large. Accordingly, one or more types selected from V, Ti and Nb are added to the metal material constituting the member comprising the flange.

Of these, V forms carbide or carbonitride in the steel and suppresses the growth of the prior austenite grains at the time of hot forging and at the time of induction hardening, and decreases the size of the prior austenite grains, and releases the stress concentration generated in the grain boundary, thus contributing to an increase in the rolling fatigue life of the raceway portion. Moreover, since V carbide or carbonitride has an extremely high hardness, if it is finely dispersed in the martensite structure of the induction hardened raceway, there is the effect of increasing the wear resistance and increasing the rolling fatigue life. However, if the V content is less than 0.01 weight %, the above effect will not be sufficiently obtained. On the other hand, if the V content exceeds 0.2 weight %, the hot forging property, the cutting property, and the grindability are decreased. Therefore, if V is contained in the metal material, the content is preferably between 0.01 weight % and 0.2 weight %.

Similarly to V, Nb also forms carbide or carbonitride in steel and suppresses the growth of the prior austenite grains, and decreases the size of the prior austenite grains, and releases the stress concentration generated in the grain boundary, thus contributing to an increase in the rolling fatigue life of the raceway portion. However, if the Nb content is less than 0.01 weight %, the above effect will not be sufficiently obtained. On the other hand, if the Nb content exceeds 0.15 weight %, the hot forging property, the cutting property, and the grindability are decreased. Therefore, if Nb is contained in the metal material, the content is preferably between 0.01 weight % and 0.15 weight %.

Similarly to V and Nb, Ti also forms carbide or carbonitride in steel and suppresses the growth of the prior austenite grains, and releases the stress concentration generated in the grain boundary, thus contributing to an increase in the rolling fatigue life of the raceway portion. However, if the Ti content is less than 0.01 weight %, the above effect will not be sufficiently obtained. On the other hand, if the Ti content exceeds 0.15 weight %, the hot forging property, the cutting property, and the grindability are decreased. Therefore, if Ti is contained in the metal material, the content is preferably between 0.01 weight % and 0.15 weight %.

Moreover, when performing the present invention, the elements shown below may be suitably contained in the steel constituting the member comprising the flange.

Firstly, Mn is preferably contained to increase the quenching property of steel. If the content is less than 0.3 weight %, the thickness of the hardened layer formed on the raceway portion along with induction hardening can not be sufficiently ensured (hardened layer becomes shallow) so that the rolling fatigue life of this raceway portion can not be sufficiently ensured. On the other hand, if the content exceeds 1.5 weight %, the workability of the member is decreased. Accordingly, the Mn amount contained in the steel is preferably between 0.3 weight % and 1.5 weight %.

Moreover, Si not only increases the quenching property, strengthens the martensite, and increases the rolling fatigue life of the raceway portion, but also it is dissolved in the solid-solution of ferrite of the non-thermal refined portion to increase the strength of the ferrite structure so that the fatigue strength of the non-thermal refined portion is increased. Therefore, it is preferably contained. However, if the content is less than 0.1 weight %, the effect will not be sufficiently obtained. On the other hand, if the content exceeds 1.0 weight %, not only the hot forging property is decreased but also decarbonization becomes large after forging, so that the fatigue strength is decreased in the surface portion on which cutting is not performed after hot forging, but which is used in the as forged condition. Accordingly, the Si amount contained in the steel is preferably between 0.1 weight % and 1.0 weight %.

Furthermore, Cr increases the quenching property, strengthens the martensite structure after quenching, and increases the rolling fatigue life of the raceway portion. Therefore this is preferably contained. However, if the content is less than 0.01 weight %, the thickness of the hardened layer formed on the raceway portion along with induction hardening can not be sufficiently ensured (hardened layer becomes thin) and the strength of the martensite structure is decreased so that the rolling fatigue life of this raceway portion can not be sufficiently ensured. On the other hand, if the content exceeds 0.5 weight %, the hot forging property and the cutting property are decreased. Accordingly, the Cr amount contained in the steel is preferably between 0.01 weight % and 0.5 weight %.

S forms non-metallic inclusions such as MnS in steel. MnS existing in the induction hardened raceway portion becomes the starting point for flaking due to rolling fatigue, and thus decreases the rolling fatigue life of this raceway portion. Therefore, the S content in the steel is preferably as small as possible (as close to 0 as possible). If the S content in the steel exceeds 0.035 weight %, the decrease in the rolling fatigue life of the raceway portion may become considerable. Accordingly, the S content in the steel is preferably 0.035 weight % or less. The S content is preferably 0.020 weight % or less considering stably ensuring the rolling fatigue life and preventing cracks in the crimped portion 9.

Moreover, O is an element which greatly affects the rolling fatigue of the induction hardened raceway portion.

That is, O forms non-metallic inclusion such as $Al_2O_3$ in steel, and becomes the starting point for flaking due to rolling fatigue, thus decreasing the rolling fatigue life of the raceway portion. Therefore, in order to ensure the rolling fatigue life of this raceway portion, the O content is preferably as small as possible (as close to O as possible). If the O content exceeds 15 ppm, the rolling fatigue life may be decreased. Therefore the 0 content is preferably 15 ppm or less.

Moreover, in the wheel-support rolling bearing unit according to another aspect of the present invention, the rotating ring constituting the rolling bearing unit is made from carbon steel containing 0.45 to 0.65 weight % of C (carbon). In this rotating ring, at least the root portion on the axial outside surface side of the flange is made from a pro-eutectoid ferrite wherein the prior austenite grain size is 4 or more and the area ratio is between 3 and 15%.

The prior austenite grain size is stipulated in JIS G 0551, where, if $2^{3+n}$ of grains are in the 1 $mm^2$ area, the grain size of the portion is n. Therefore, the state where the prior austenite grain size is 4 or more means the state where $2^7$ (=128) or more grains of prior austenite are in the 1 $mm^2$ area.

In order to obtain the rotating ring as described above, preferably this rotating ring is one where an intermediate material formed into a predetermined shape by applying hot forging or cutting to a material made from carbon steel, is subjected to heat treatment (normalizing) involving heating to a temperature of 750 to 1000° C. at least once, and then cooling at the speed of the critical cooling rate or less, and is then subjected to finishing.

According to the wheel-support rolling bearing unit of the present invention constructed as described above, the fatigue strength of the root portion on the axial outside surface side of the flange formed on the outer peripheral surface of the rotating ring can be increased without quenching and hardening the root portion. Hereunder is a description of the reason.

While the rotating ring is rotating together with the wheel at the time of running, a radial load is applied to the wheel-support rolling bearing unit provided between the wheel in contact with the road surface and the suspension device supported by the vehicle body. Moreover, a rotating bending stress is generated in the root portion of the flange by this radial load and the rotation moment. If the non-thermal refined steel has the combined structure of pro-eutectoid ferrite and pearlite of the medium carbon steel, fatigue cracks are generated by the stress concentration generated in the pro-eutectoid ferrite on the surface of the root portion of the flange based on such rotating bending stress, which develops mainly in the pro-eutectoid ferrite grains and at the pro-eutectoid ferrite/pearlite boundary.

With respect to the fatigue cracks generated in the root portion of the flange in such a mechanism, in the case of the wheel-support rolling bearing unit of the present invention, this root portion is made from the pro-eutectoid ferrite wherein the prior austenite grain size according to JIS G 0551 is 4 or more and the area ratio is between 3 and 15%, so that the fatigue strength of the root portion can be increased. That is, by controlling the microstructure of this root portion, the fatigue strength of this root portion can be increased by the mechanism below.

If the prior austenite grains are refined (the size is decreased), there is an effect of suppressing the stress concentration on the grain boundary or an effect of increasing the nucleation sites at the time of austenite/ferrite transformation so as to finely precipitate the pro-eutectoid ferrite grain. Moreover, if the pro-eutectoid ferrite is finely fragmented, the minimum unit for crack generation becomes smaller so that the fatigue failure can be effectively suppressed. Specifically, if the prior austenite grain size according to JIS G 0551 is 4 or more, the above effect can be sufficiently obtained.

In the wheel-support rolling bearing unit of the present invention, as described above the rotating ring having the flange formed on the outer peripheral surface is made by forging a bar-shaped material made from a medium carbon steel such as S53C and cut into a predetermined length, to make this into a predetermined shape, and then cooling. As a method of refining (decreasing the size of the grains) the prior austenite grains of the rotating ring made in this manner after forging, the following methods from (1) to (3) can be employed.

(1) Suppress the temperature at the time of forging.

The austenite grains are more easily grown (the size of the grains is easily increased) the higher the temperature when atomic diffusion is activated, and the grain is refined (the size of the grains is decreased) as the degree of forging is increased. On the other hand, in order to decrease the deformation resistance at the time of forging and more easily work complex shapes, conventionally, there is a tendency to increase the temperature at the time of forging when forging complex shapes. On the other hand, in order to refine the prior austenite grains to obtain the wheel-support rolling bearing unit of the present invention, the temperature at the time of forging the rotating ring is kept low.

(2) Add appropriate elements to the alloy (carbon steel).

If carbide is finely dispersed in the steel, then due to the pinning effect thereof, the growth of grains can be effectively suppressed, thus obtaining a similar effect to the decrease in the forging temperature as in (1) mentioned above. Accordingly, the element added to the alloy is preferably Nb as described later.

(3) Apply predetermined heat treatment (normalizing) after forging.

Similarly to (1) above, if the temperature at the time of forging is kept low, the prior austenite grains after forging can be refined. However the deformation resistance at the time of forging is increased. Therefore, if the shape of the rotating ring is complex, forging for obtaining the intermediate material close to the finished product is preferably performed at a comparatively high temperature. However, in this case, if it is left as is, the size of the prior austenite grains after forging is increased. Therefore, if forging is performed at a high temperature and the intermediate material is obtained, this intermediate material is subjected to heat treatment involving heating to a temperature of 750 to 1000° C. and then cooling at the speed of the critical cooling rate or less. By such heat treatment, the austenite grains in the intermediate material can be refined.

That is, by once cooling the intermediate material obtained by hot forging, the structure in this intermediate material becomes the combined structure of pro-eutectoid ferrite and pearlite. Then, by applying the heat treatment to this intermediate material, the microstructure in this intermediate material becomes the combined structure of pro-eutectoid ferrite and pearlite which is totally even and fine. In some cases, cutting may be applied instead of hot forging in order to obtain the intermediate material. However in this case, it is also effective to apply the heat treatment. In short, if the abovementioned heat treatment is applied to the intermediate material which is subjected to hot forging or cutting, the microstructure can be controlled.

Moreover, the temperature of reheating in the heat treatment is 750 to 1000° C. due to the following reason. Firstly, if it is less than 750° C., it is not possible to completely change into austenite. Therefore the microstructure can not be made even. On the other hand, if it exceeds 1000° C., austenite grains are grown while the material is being held in the austenite range so that sufficient pro-eutectoid ferrite can not be obtained and the combined structure of pro-eutectoid ferrite and pearlite which is totally even and fine as mentioned above can not be obtained. In order to make the cutting property at the time of finishing satisfactory, the area ratio of the pro-eutectoid ferrite is preferably increased (for example, 10% or more) as described later. In order to make this area ratio 10% or more, the temperature of the heat treatment is preferably controlled in a range of 750 to 900° C.

Moreover, such heat treatment is also effective for making the grain size of the intermediate material even. That is, even if the heating temperature at the time of hot forging is even throughout the whole material, the working amount greatly differs depending on the portion of this material. Accordingly, it is unavoidable that the variation in the grain size of the intermediate material obtained by subjecting the material to hot forging, is increased to a certain degree in the condition where heat treatment is not applied. For example, overall there is a large amount of working in the flange portion constituting the rotating ring, however the working amount of portions away from the flange portion is comparatively small. Accordingly, in the microstructure in the intermediate material, it is difficult to make the size of the austenite and the distribution of the pro-eutectoid ferrite even. In this way, in the condition where the size of the austenite grains and the distribution of the pro-eutectoid ferrite are uneven, there is a variation in the hardness, and cracks are easily generated from the weakest portion in the structure so that the fatigue strength is decreased.

On the other hand, if the abovementioned heat treatment is applied, the microstructure undergoes transformation into austenite once by the reheating, and becomes a comparatively even grain size distribution. Moreover, by cooling at the critical cooling rate or less, a combined structure of pro-eutectoid ferrite/pearlite which is fine and even, can be obtained after cooling. As a result, the variation in the hardness can be suppressed to a minimum and the fatigue strength can be increased. Moreover, in this manner, making the combined structure of the pro-eutectoid ferrite/pearlite even, not only increases the cutting property and the fatigue strength, but also there is the effect from the aspect of increasing the induction hardening property on the raceway surface and on the inside surface side of the flange root portion.

Next, the area ratio (3 to 15%) of the pro-eutectoid ferrite constituting the root portion of the flange is controlled from the aspect of ensuring both the cutting property and the fatigue strength. Since the pro-eutectoid ferrite existing on the grain boundary of the austenite becomes the starting point for crack generation, the area ratio is preferably as low as possible from the aspect of increasing the fatigue strength. On the other hand, a certain degree of pro-eutectoid ferrite is also required if considering the easiness of cutting (cutting property) for finishing the surface size and the shape after forging. If considering the above, it is necessary to control the area ratio within a range of 3 and 15% from the aspect of ensuring both the cutting property and the fatigue strength. If the pro-eutectoid ferrite area ratio is less than 3%, the cutting property is decreased. If it exceeds 15%, the fatigue strength of the root portion can not be sufficiently ensured. The area ratio of the pro-eutectoid ferrite is increased as the size of the austenite grains after forging is smaller and the cooling rate is lower. It is preferable to make the temperature of the heat treatment (normalizing) 750 to 900° C. and to make the area ratio 10% or more (and 15% or less) from the aspect of making the cutting property satisfactory.

Moreover, as described above, the rotating ring constituting the wheel-support rolling bearing unit of the present invention is made from a carbon steel containing 0.45 to 0.65 weight % (preferably 0.50 to 0.65 weight %) of C and preferably containing 0.02 to 0.30 weight % of Nb. The reason for adding these respective elements and controlling the contents in such range is as follows.

Firstly, C is added to ensure the hardness of the root portion of the flange and the raceway surface formed on the peripheral surface of the rotating ring, and to ensure the rolling fatigue life of this raceway surface and the fatigue strength of the root portion. If the C content is less than 0.5 weight %, then even if heat treatment such as induction hardening is applied to the raceway surface and the root portion, the hardness of the portion is not sufficiently increased. As a result, the rolling fatigue life of the raceway surface portion which is repeatedly in rolling contact with the rolling elements, is shortened. Moreover, it is difficult to ensure the fatigue strength of the root portion with respect to the rotating bending stress.

However, even if the C content is less than 0.5 weight %, as long as it is 0.45 weight % or more, the durability required for practical use can be ensured depending on the specification of the wheel-support rolling bearing unit. For example, regarding the rolling fatigue life of the raceway surface portion, such cases may be considered where the radius of curvature of the section shape of this raceway surface is decreased (made close to the radius of curvature of the rolling contact surface of balls), or tapered rollers are used as the rolling elements. In such cases, the surface pressure acting on the rolling contact portion is comparatively decreased so that the rolling fatigue life can be ensured even if the C content is between 0.45 and 0.50%. Moreover, regarding the fatigue strength of the root portion, in the case where the load applied to this root portion is limited in a comparatively small wheel-support rolling bearing unit, the required fatigue strength can be ensured even if the C content is between 0.45 and 0.50%. On the other hand, even if C is added to exceed 0.65 weight %, it is not only impossible to further improve the rolling fatigue life and the fatigue strength, but also problems such as a decrease in the area ratio of the pro-eutectoid ferrite and a decrease in the cutting property arise. From such reasons, the C content is controlled to between 0.45 and 0.65% (preferably between 0.50 and 0.65 weight %).

Next, Nb has the function of precipitating as carbide in steel, thus suppressing the growth of prior austenite grains, and refining the prior austenite grains. That is, it is added to increase the fatigue strength of the root portion of the flange by refining the prior austenite grains.

If the Nb content is less than 0.02 weight %, as described above, the prior austenite grains can not be sufficiently refined. On the other hand, if Nb is added to exceed 0.3 weight %, not only is it difficult to obtain further refining, but also this causes an increase in cost, and a decrease in the cutting property after forging. Therefore, if Nb is added, the content is controlled to between 0.02 and 0.3%.

As described above, according to the wheel-support rolling bearing unit of the present invention, by only controlling the microstructure in the root portion on the axial outside surface side of the flange formed on the outer peripheral surface of the rotating ring, the fatigue strength of this root portion can be increased. In this case, the fatigue strength can be increased while suppressing an increase in cost, compared to the case where the standard material is used, without requiring a change to the design specification such as a change in the shape and the size of the rotating ring.

Moreover, a wheel-support rolling bearing unit according to another aspect of the present invention comprises; an inner ring, an outer ring, a plurality of rolling elements rotatably provided between the inner ring and the outer ring, and a hub ring made from steel having the inner ring integrally fixed by swaging, wherein the steel contains manganese and 0.45 to 0.65 mass % of carbon, and manganese segregation degree determined by the following equation is 0.6 or less if the manganese content [Mn0] is 0.5 mass % or more, and is (2.8–2×[Mn0])/3 or less if the manganese content [Mn0] is less than 0.5 mass %.

Manganese segregation degree=([Mn]−[Mn0])/[Mn0]

Here, [Mn] is the maximum manganese concentration of the steel; the unit is mass %.

In such a construction, even if swaging is performed so as to integrally fix the inner ring to the hub ring, cracks are unlikely to occur. Hereunder is a description of the reason for this.

Swaging is performed on the non-thermal refined portion so as to integrally fix the inner ring and the hub ring. However, the present inventors have earnestly studied the factors of crack generation in the radial direction in the crimped portion in the conventional technique described above. As a result, firstly it was found that the elongation and reduction value of the material is greatly related to the quality of the swaging property, and abovementioned cracks are generated if the elongation and reduction value is deteriorated due to structural factors.

As described in p 78 "Tekko Zairyo (Ferrous Material)" published by The Japan Institute of Metals, the ferrite-pearlite structure is changed by the segregation of phosphorus (P) or manganese (Mn), and a striped structure of ferrite-pearlite appears particularly in parallel with the cogging direction. Moreover, such uneven banded structure differs greatly in elongation and reduction value depending on the tensile direction.

In the cylindrical portion of the hub ring being the crimped portion, the material flow and the banded structure are developed in the longitudinal direction by hot forging. Moreover, when the cylindrical portion is expanded by swaging, it is flared in both directions of the perpendicular direction and the circumferential direction so that a force in the longitudinal direction acts with respect to the banded structure. Consequently the material property differs for the portions connected by the pearlite structure and the portions connected by the ferrite structure, even elongation property of the material can not be obtained, and deformability is extremely and locally decreased, so that cracks are easily generated on the crimped portion surface.

Furthermore, since MnS in steel is a soft inclusion, it has the effect of increasing the cutting property. On the other hand, cracks are easily generated from MnS as the starting point if a tensile stress acts in the perpendicular direction. Moreover, the precipitated amount of MnS is normally determined by the S concentration. However, since the distribution greatly differs depending on the forge ratio and the Mn segregation state, the problems of cracking due to swaging can not be solved by merely controlling the S concentration. The conclusion was thus reached that it is important to control the Mn segregation which determines the size and the distribution of the precipitated MnS.

Similarly to the austenite grain boundary, the boundary face of MnS and austenite becomes the nucleation site of pro-eutectoid ferrite at the time of cooling after forging. As a result, a structure having MnS in the ferrite is easily formed. In such a structure, voids are formed in the boundary face at the time of cold deformation so that the elongation and reduction value is greatly deteriorated. Accordingly, it is necessary to decrease the boundary faces of ferrite and MnS as much as possible in order to increase the swaging property.

The precipitation behavior of ferrite on MnS is related to the cooling rate after forging. The amount of pro-eutectoid ferrite grown from MnS as the nucleus, tends to be increased if the cooling rate is low. On the other hand, if the cooling rate is high, there is a tendency for growth of ferrite from MnS as the starting point, and for the formation of an uneven structure generated by Mn segregation to be suppressed. That is, preferably the cooling rate is increased within a range so as not to deteriorate the cutting property, or to suppress coarse MnS precipitation of itself.

Next is a detailed description of the manganese segregation degree (Mn segregation degree) mentioned above.

The segregation of alloy elements greatly depends on the cooling rate when solidifying after forging. If average thermal diffusivity treatment (soaking) is performed at a high temperature after hot working similarly to with high-carbon chrome bearing steel, the banded segregation is decreased.

On the other hand, in the medium carbon steel wherein the Cr content is comparatively low, since massive eutectic carbides are not formed, soaking is not performed. Therefore the concentration segregation of alloy elements is remarkable.

Particularly, the transformation point is decreased in the portion where Mn is concentrated so that the pro-eutectoid ferrite is not grown so much and the pearlite amount is increased as a whole. The transformation point is not decreased at the periphery thereof so that there is a region where ferrite is preferentially grown. Such segregation is in a band shape extended in the cogging direction, along which the band shaped ferrite-pearlite structure is formed.

When the Mn content is 0.5 mass % or more, then if Mn segregation degree defined by the abovementioned equation exceeds 0.6, a band shaped uneven structure generated in the crimped portion remarkably appears. Furthermore, in the portion where Mn is concentrated, an increase in the MnS amount is invited, so that consequently the elongation and reduction value is worsened and cracks at the time of swaging are easily generated. In order to prevent such problems, the Mn segregation degree when the Mn content is 0.5 mass % or more is preferably 0.4 or less. This is so that the development of the banded structure is further suppressed and the elongation and reduction value is improved.

On the other hand, when the Mn content is less than 0.5 mass %, then even if the Mn segregation degree is large, a difference in the transformation point is unlikely to occur, and the banded structure is not formed if the Mn segregation degree is $(2.8-2\times[Mn0])/3$ or less. The maximum manganese concentration in the present invention denotes the Mn concentration in the portion where Mn is most concentrated in a steel having Mn segregated.

As described above, the elongation and reduction value of the material can be increased by decreasing the Mn segregation of the material as much as possible by: (1) avoiding the formation of the ferrite-pearlite banded structure, and (2) decreasing the MnS precipitated amount and avoiding the uneven structure grown therefrom as the nucleus. In this way, a wheel-support rolling bearing unit may be obtained which is superior in the swaging property wherein cracks are unlikely to be generated even if subjected to large cold deformation by swaging.

It is required that the aforementioned carbon content in the steel is between 0.45 and 0.65 mass %. If it is less than 0.45 mass %, there is a problem in that sufficient hardness is not imparted to the rolling portion. If it exceeds 0.65 mass %, there is a problem in that the cutting property of the steel is considerably decreased.

BEST MODE FOR CARRYING OUT THE INVENTION

Hereunder is a description of a plurality of aspects according to the present invention. The numbers of the example and of the experimental example are affixed to each of the respective aspects, but are not serially numbered throughout.

Figure 1:
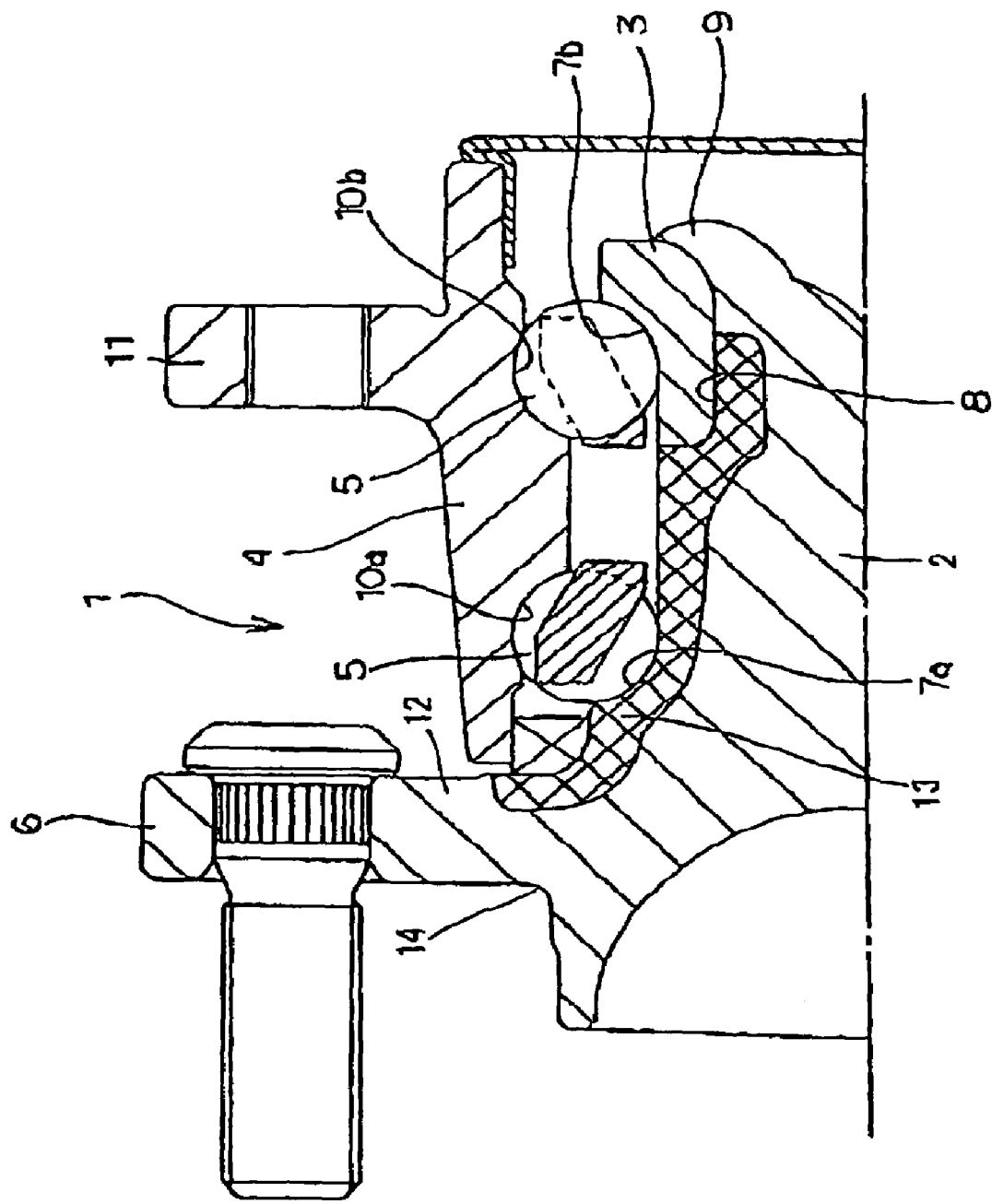
FIG. 1 is a semi cross-sectional view showing an example of a wheel-support rolling bearing unit being an object of the present invention.

FIG. 1 shows an example of a wheel-support rolling bearing unit being an object of the present invention. The wheel-support rolling bearing unit of the present example comprises a hub ring 2, an inner ring 3, an outer ring 4, and a plurality of rolling elements 5. A flange 6 for supporting a wheel is formed at the outside end portion (outside in the axial direction means the side towards the widthwise outside when assembled in the vehicle; the left side in FIG. 1, while conversely, the side towards the widthwise center is the inside in the axial direction; the right side in FIG. 1) of the outer peripheral surface of the hub ring 2. Moreover, a first inner raceway 7a is formed on the outer peripheral surface of a middle portion of the hub ring 2. Similarly, a step portion 8 having a reduced outer diameter is formed at the inside end portion thereof. The inner ring 3 having a second inner raceway 7b formed on the outer peripheral surface is fitted onto the step portion 8. A crimped portion 9 is formed by swaging radially outwards a portion of a cylindrical portion which is protruded beyond the inside end face of the inner ring 3. The inside end face of the inner ring 3 is pressed by the crimped portion 9. An attaching portion 11 for fastening to a knuckle (not shown), which constitutes a suspension device, is provided on the outer peripheral surface of the outer ring 4. A first outer raceway 10a facing the first inner raceway 7a, and a second outer raceway 10b facing the second inner raceway 7b are respectively formed on the inner peripheral surface of the outer ring 4. A plurality of rolling elements 5 are rotatably provided respectively between the first and second inner raceways 7a and 7b and the first and second outer raceways 10a and 10b. In the case of the present example, the hub ring 2 and the inner ring 3 correspond to the inner member and the outer ring 4 corresponds to the outer member. By applying induction hardening to a portion of the hub ring 2 shown by hatching in FIG. 1, which spans from the root portion of the inside surface of the flange 6 to the middle portion of the step portion 8 including the first inner raceway 7a, a hardened layer is formed in the portion thereof.

Particularly, in one aspect of the wheel-support rolling bearing unit of the present invention, the hub ring 2 is made from an alloy steel containing 0.5 to 0.65 weight % of C, 0.3 to 1.5 weight % of Mn, 0.1 to 1.0 weight % of Si, and 0.01 to 0.5 weight % of Cr wherein the S content is kept to 0.035 weight % or less, and further including any one type or more selected from 0.01 to 0.2 weight % of V, 0.01 to 0.15 weight % of Nb, and 0.01 to 0.15 weight % of Ti, and the rest being Fe and inevitable impurities. Moreover the oxygen contents of the alloy steel is 15 ppm or less. The surface hardness of the first inner raceway 7a of the hub ring 2 formed with the hardened layer is Hv 650 to 780, and the surface hardness of the non-thermal refined portion except for the hardened layer is Hv 230 to 300.

Furthermore, in the case of the present example, assuming that the C content is $x_1$ weight %, the V content is $x_2$ weight %, the Nb content is $x_3$ weight %, and the Ti content is $x_4$ weight % in the alloy steel constituting the hub ring 2, the contents of C, V, Nb, and Ti are controlled so as to satisfy $0.30 \leq \{x_1 - 1.5(x_2 + x_3 + x_4)\} \leq 0.55$.

According to the wheel-support rolling bearing unit of the present invention constructed as described above, the rolling fatigue life of the first inner raceway 7a of the hub ring 2 can be increased, and the fatigue strength of the flange 6 and the non-thermal refined portion on the periphery of flange 6 can be increased. Furthermore, in the case of the present example, the value of $\{x_1 - 1.5(x_2 + x_3 + x_4)\}$ is between 0.30 and 0.55. Therefore the fatigue strength of the hub ring 2 can be further increased while maintaining the cutting property of the hub ring 2 in an excellent condition.

Next is a description of experiments performed by the present inventors in order to verify the effects of the present invention. In the experiments, ten types of samples (examples 1 to 10) which belong to the present invention, having similar structures to the structure shown in FIG. 1, and six types of samples (comparative examples 1 to 6), outside of the scope of the present invention, were used. Moreover, the hub ring 2 was made from a steel having the alloy components shown in Table 1 below, and induction hardening was applied to a portion corresponding to the hatching including the first inner raceway 7a in FIG. 1 so as to form the hardened layer. The numerical values shown in the respective alloy component columns in Table 1 represent the contents in the alloy steel by weight %. The numerical values shown in the "oxygen contents" columns represent the oxygen contents in the alloy steel by ppm. Moreover, in Table 1, the surface hardness (Hv) of the first inner raceway 7a (raceway portion) of the hub ring 2, formed with the hardened layer, and the surface hardness (Hv) of the non-thermal refined portion not formed with the hardened layer, are shown together.

TABLE 1-1

| | C | Mn | Si | Cr | S | V | Nb | Ti |
|---|---|---|---|---|---|---|---|---|
| Example | | | | | | | | |
| 1 | 0.50 | 0.71 | 1.00 | 0.18 | 0.014 | 0.05 | | |
| 2 | 0.55 | 1.00 | 0.11 | 0.19 | 0.020 | 0.015 | | |
| 3 | 0.53 | 0.70 | 0.28 | 0.50 | 0.015 | | 0.05 | |
| 4 | 0.55 | 0.71 | 0.20 | 0.48 | 0.011 | | | 0.05 |
| 5 | 0.58 | 0.68 | 0.29 | 0.01 | 0.020 | | 0.01 | |
| 6 | 0.60 | 0.71 | 0.10 | 0.05 | 0.015 | 0.01 | 0.15 | |
| 7 | 0.61 | 0.67 | 0.48 | 0.18 | 0.013 | 0.04 | | |
| 8 | 0.65 | 0.30 | 0.10 | 0.17 | 0.015 | 0.2 | | |
| 9 | 0.50 | 0.67 | 0.21 | 0.20 | 0.035 | 0.05 | | 0.15 |
| 10 | 0.65 | 0.68 | 0.28 | 0.18 | 0.014 | | 0.05 | |
| Comparative Example | | | | | | | | |
| 1 | 0.53 | 0.71 | 0.28 | 0.18 | 0.014 | | | |
| 2 | 0.45 | 0.68 | 0.47 | 0.50 | 0.015 | | 0.05 | |
| 3 | 0.55 | 0.30 | 0.20 | 0.18 | 0.014 | 0.31 | | |
| 4 | 0.55 | 0.31 | 0.18 | 0.17 | 0.014 | | | 0.2 |
| 5 | 0.61 | 0.68 | 0.18 | 0.20 | 0.015 | | 0.2 | |
| 6 | 0.71 | 0.71 | 0.20 | 0.18 | 0.015 | | | 0.1 |

TABLE 1-2

| | Oxigen Contents | $X_1 - 1.5(X_2 + X_3 + X_4)$ | Non-thermal refined portion hardness | Raceway portion hardness | Test life | Cutting Property |
|---|---|---|---|---|---|---|
| Example | | | | | | |
| 1 | 15 | 0.43 | 230 | 668 | 2.3 | ○ |
| 2 | 9 | 0.33 | 261 | 712 | 2.8 | ○ |
| 3 | 9 | 0.46 | 250 | 698 | 2.6 | ○ |
| 4 | 12 | 0.48 | 263 | 705 | 3.1 | ○ |
| 5 | 10 | 0.42 | 274 | 723 | 3.4 | ○ |

TABLE 1-2-continued

| | Oxigen Contents | $X_1-1.5$ $(X_2 + X_3 + X_4)$ | Non-thermal refined portion hardness | Raceway portion hardness | Test life | Cutting Property |
|---|---|---|---|---|---|---|
| 6 | 9 | 0.36 | 272 | 745 | 3.1 | ○ |
| 7 | 9 | 0.55 | 268 | 751 | 3.3 | ○ |
| 8 | 11 | 0.35 | 280 | 765 | 2.5 | ○ |
| 9 | 9 | 0.20 | 248 | 650 | 1.7 | ○ |
| 10 | 9 | 0.58 | 300 | 780 | 2.7 | □ |
| Comparative Example | | | | | | |
| 1 | 12 | 0.53 | 231 | 694 | 1.0 | ○ |
| 2 | 9 | 0.38 | 224 | 643 | 0.6 | ○ |
| 3 | 9 | 0.09 | 267 | 708 | 2.9 | x |
| 4 | 12 | 0.25 | 271 | 718 | 2.7 | x |
| 5 | 13 | 0.31 | 284 | 741 | 3.2 | x |
| 6 | 10 | 0.56 | 308 | 775 | 3.4 | x |

Moreover, the outer ring 4 was made from S53C and induction hardening was applied to the periphery of the first and the second outer raceways 10a and 10b so as to form the surface hardened layer on the periphery. Moreover, the inner ring 3 and the respective rolling elements 5 were made from SUJ2 and wholly hardened from the surface to the core by a standard quenching treatment (through hardening).

Furthermore, in the produced wheel-support rolling bearing unit 1, the pitch diameter of the respective rolling elements 5 was 49 mm and the number of the rolling elements 5 in the respective rows was twelve. Using such a wheel-support rolling bearing unit 1, a rotation test was performed under the following conditions.

Radial load: 7600N
Axial load: 6800N
Rotational speed: 100 min$^{-1}$

The experiment was terminated at the time when flaking occurred on the first inner raceway 7a, or cracks were recognized on the periphery of the flange 6, and the time point was regarded as the test life. The experimental results obtained from such rotation test are shown in the "test life" and "cutting property" columns in the above Table 1. The numerical values in the "test life" columns shown in Table 1 represent the proportion with respect to the comparative example 1, assuming that the test life of the comparative example 1 is 1.0. Moreover, if the time required for the cutting was less than 1.5 times that of the comparative example 1, the cutting property was regarded as "excellent" and a O was put in the "cutting property" column. Similarly, if it was between 1.5 times and 2 times, the cutting property was regarded as "good" and a Δ was put in the "cutting property" column. If it was between more than 2 times, the cutting property was regarded as "poor" and a X was put in the "cutting property" columns.

As is apparent from the experimental results shown in Table 1, in the case of examples 1 to 10 which belong to the present invention, the fatigue strength of the non-thermal refined portion of the hub ring 2 and the rolling fatigue life of the first inner raceway 7a formed with the hardened layer were superior. Hence an excellent test life could be obtained.

Particularly, the cases of examples 1 to 8 satisfy $0.30 \leq \{x_1-1.5(x_2+x_3+x_4)\} \leq 0.55$. Accordingly, in the case of the respective examples 1 to 8, the fatigue strength of the hub ring 2 could be further increased, and the test life could be extended while maintaining the cutting property of the hub ring 2 in an excellent condition.

On the other hand, in the case of the comparative example 1, none of V, Nb, and Ti was added to the alloy steel constituting the hub ring 2. Moreover, in the case of the comparative example 2, the C content in the alloy steel was low, and furthermore the surface hardness was low both in the first inner raceway 7a and the non-thermal refined portion. Accordingly, in the case of the comparative examples 1 and 2, the fatigue strength of the non-thermal refined portion, or the rolling fatigue life of the first inner raceway 7a was inferior and the test life was shortened. In the case of the comparative examples 3, 4, and 6, any one of the contents of C, V, Nb, and Ti was excessive so that the cutting property became poor. In the case of the comparative example 5, the Nb content in the alloy steel constituting the hub ring 2 was more than 0.15 weight % which is the upper limit of the present invention. Hence the cutting property became poor.

The respective rolling elements used in the present invention are preferably made from a high-carbon chrome bearing steel such as SUJ2, or from carbonitrided high-carbon chrome bearing steel, from the aspect of increasing the rolling fatigue life of the wheel-support rolling bearing unit. Moreover, in the structure shown in FIG. 1 described above, balls are used as the respective rolling elements. However, rollers or the like may be used as the respective rolling elements in the present invention.

Moreover, in a case where, as the inner member constituting the wheel support rolling bearing unit of the present invention, a hub ring having the one-side inner raceway of a pair of inner raceways and a flange provided on the outer peripheral surface, and an inner ring having the other-side inner raceway of the pair of inner raceways provided on the outer peripheral surface and being merely cylindrical (not forming a flange) are combined and used, the inner ring is preferably made from a high-carbon chrome bearing steel such as SUJ2, from the aspect of further increasing the rolling fatigue.

In the structure shown in FIG. 1 described above, the hub ring 2 is made from an alloy steel having a predetermined composition, the hardened layer is formed by induction hardening in the portion including the first inner raceway 7a on the outer peripheral surface of the hub ring 2, and the material constituting the outer ring 4 is not specifically controlled. However, the present invention is not limited to such a structure. For example, the present invention also includes a structure wherein the outer ring 4 is made from alloy steel having a predetermined composition together with the hub ring 2 and the hardened layer is formed by induction hardening in the portion including the respective first and second outer raceways 10a and 10b on the inner peripheral surface of the outer ring 4, and a structure wherein the hub ring 2 is made from a simple bearing steel, the outer ring 4 is made from alloy steel having a predetermined composition, and the hardened layer is formed on the inner peripheral surface of the outer ring 4.

Since the present invention is constructed and operated as described above, the fatigue strength of the flange and the non-thermal refined portion on the periphery of the flange can be increased while ensuring the rolling fatigue life of the respective raceways. As a result, it becomes possible to thin the wall of the flange, and lightening of the wheel-support rolling bearing unit can thus be realized.

Moreover, in another aspect of the present invention, the fatigue strength of the root portion on the outside surface side of the flange which is formed on the outer peripheral surface of the hub is increased without quenching the root portion. Since the structures shown in the drawings are similar to the conventional structures shown in FIGS. 1 and 2 described above for example, overlapping description is omitted.

In the case of the wheel-support rolling bearing unit 1 shown in FIG. 1, the fatigue strength of the root portion on the inside surface side of the flange 6 which is formed on the outer peripheral surface of the hub ring 2 is ensured based on quenching as described above.

Figure 2:
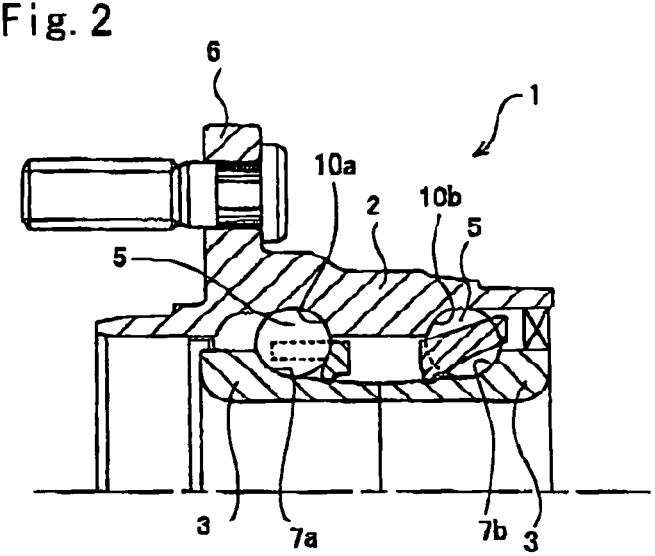
FIG. 2 is a semi cross-sectional view showing another example of a wheel-support rolling bearing unit being an object of the present invention.

On the other hand, in the case of the wheel-support rolling bearing unit 1 shown in FIG. 2, the fatigue strength of the root portion on the inside surface side of the flange 6 which is formed on the outer peripheral surface of the hub ring 2 is ensured by separate quenching. The distance from the root portion on the inside surface side of the flange 6 to the inner peripheral surface of the hub ring 2 is longer than the distance from the root portion on the outside surface side thereof to the inner peripheral surface. Therefore the decrease in the toughness (shock-proof) accompanied with the quenching effect is unlikely to become a problem.

In the present invention, the method of making the hardness of the root portion on the axial outside surface side of the respective flanges 6 within a range of 24 and 35 by Rockwell hardness C scale, that is a range of 260 and 345 by Vickers hardness, is not specifically limited. However, the method described next is preferably used solely or in an appropriate combination.

First, basically, the flange 6 is cooled after the hub ring 2 provided on the outer peripheral surface is made by hot forging. In many cases, the cooling after hot forging is performed by cooling involving leaving in the air. However, the cooling rate is preferably increased using a cooling fan or the like.

Since the hub ring 2 immediately after hot forging has a high temperature, the metal structure of the carbon steel constituting the hub ring 2 becomes austenite. However, it transforms into a ferrite and pearlite in the cooling process. The transformation is completed at about 650° C. However, if the cooling rate is low at this time, the ferrite becomes coarse thus decreasing the hardness of the hub ring 2. Therefore, in order to keep the ferrite from being coarse to ensure the hardness, the cooling rate of the hub ring 2 after hot forging is preferably high, and fan cooling is performed until about 650° C. at which temperature the transformation is completed. In this case, in order to increase the cooling rate until the temperature of the core of the hub ring 2 becomes 650° C. or less, fan cooling is preferably continued until the surface temperature becomes 600° C. or less.

Moreover, as the carbon steel constituting the hub ring 2, a steel containing 0.03 to 0.3 weight % of V is preferably used, from the aspect of ensuring the strength of the hub ring 2. V has the property to strengthen the ferrite which is precipitated in layers in the pro-eutectoid ferrite and pearlite. Therefore, the strength of the hub ring 2 can be further increased by adding a suitable amount thereof. However, if the V addition is less than 0.03 weight %, the effect to strengthen the ferrite is small. On the other hand, if the V addition is more than 0.3 weight %, workability such as the hot forging property and cutting property are decreased. Therefore, if V is added to the carbon steel forming the hub ring 2, the addition is preferably controlled in a range between 0.03 and 0.3 weight %.

Moreover, the method of making the surface roughness of the aforementioned root portion on the axial outside surface side of the flange 6 within a predetermined range (0.1 to 1.0 μm by arithmetic average roughness Ra, 1.0 to 10 μm by maximum height Ry) is not specifically limited. However, the method described next is preferably used solely or in an appropriate combination.

In the case of a common wheel-support rolling bearing unit, the root portion is left worked into a predetermined shape by applying cutting after hot forging. The surface roughness in this condition is much greater than the above range. Here, the surface roughness of the root portion is made 0.5 μm Ra or less by applying grinding to the root portion after cutting the root portion. Moreover, the surface roughness of the root portion can be made 0.5 μm Ra or less by applying burnishing after cutting. Particularly if burnishing is applied, then the vicinity of the surface of the worked portion including the root portion is work hardened, increasing the fatigue strength of the worked portion.

Moreover, the maximum height Ry value can be changed according to the lathe working conditions such as the peripheral speed, feed speed, and cut depth of the worked portion. In order to decrease the maximum height Ry, the feed speed value and the cut depth value are kept as little as possible within a range for which productivity is considered. Specifically, the feed speed is preferably 0.3 mm/rev or less and the cut depth is preferably 1 mm or less at the time of final lathe turning. Moreover, the peripheral speed value is preferably increased a certain amount, from the aspect of preventing the occurrence of a built-up edge. Specifically, it is preferably 100 m/min or more.

If the maximum height Ry value exceeds 10 μm, there may be not only a case where the stress concentration produced at the deepest portion of the irregularities as described above is increased, thus decreasing the fatigue strength with respect to the rotating bending, but also a case where plucking is generated on the worked surface and the shape of the irregularities becomes sharp, thus considerably increasing the stress concentration. Furthermore, there may be a case where a built-up edge occurs at the tip of the blade of the lathe and the heat generation is increased, causing a thermally affected layer on the surface, so that the fatigue strength is decreased.

From such reasons, the value of the aforementioned surface roughness of the root portion on the axial outside surface side is 10 μm or less for the maximum height Ry. In order to increase the fatigue strength of the root portion, the value of the maximum height Ry is preferably 6 μm or less. However, if the surface roughness of the root portion is made 1 μm or less for the maximum height Ry, the effect of increasing the fatigue strength is substantially saturated and the fatigue strength will not be increased any more, while the time required for working is considerably extended, thus decreasing productivity. Therefore, the surface roughness value of the root portion is preferably 1 μm Ry or more.

Moreover, in the above case, the rotating ring comprising the flange is preferably formed of a steel containing 0.45 to 1.1 weight % of C. If the C is less than 0.45 weight %, not only the ferrite fraction in the metal structure after hot forging is considerably increased, but also plucking is easily produced by the lathe turning process, caused by the decrease in the hardness, so that the value of the maximum height Ry of the surface roughness is easily increased. Furthermore, the fatigue strength is also decreased due to the decrease in the hardness. On the other hand, if the C content exceeds 1.1 weight %, the cementite in the metal structure is increased so that the workability is considerably decreased. Therefore, the C content in the steel constituting the rotating ring is 0.45 to 1.1 weight %, and more preferably 0.45 to 0.65 weight %. By controlling the C content in this range, the hardness after hot forging, and the metal structure become ideal, so that excellent workability can be obtained, which does not require the annealing process after hot forging.

Furthermore, since the outer raceway and the inner raceway support a high surface pressure stress from the respective rolling elements, high hardness which can support the high surface pressure stress is required in order to increase the rolling fatigue life. If the surface hardness of the outer raceway and the inner raceway is less than Hv 660, the hardness is insufficient so that the rolling fatigue life is decreased. On the other hand, if the surface hardness of the respective raceways exceeds Hv 760, the toughness is decreased. Therefore, the surface hardness of the outer raceway and the inner raceway is preferably between Hv 660 and Hv 760. In order to increase the rolling fatigue life, the surface hardness of the outer raceway and the inner raceway is preferably Hv 700 or more.

In the case of executing the present invention, the materials of the inner ring 3 (FIG. 1) which together with the hub ring 2 constitutes the rotating ring, and the inner ring 3 (FIG. 2) being the stationary ring are not specifically limited. However, in order to sufficiently ensure the rolling fatigue life of the inner raceway 7b (7a and 7b in FIG. 2) formed on the peripheral surface of these respective inner rings 3, a carbon steel containing about 0.9 to 1.1 weight % of C is preferably used. Examples of the carbon steel usable in this case may include a high-carbon chrome bearing steel such as SUJ2. Moreover, in a case where the present invention is executed with the structure described in FIG. 1, a carbon steel containing about 0.45 to 0.8 weight % of C is preferably used as the metal material constituting the outer ring 4, which is the stationary ring. The reason for this is that workability such as hot forging properties, cutting properties is required for the outer ring 4 similarly to the case of the hub ring 2. Moreover, in the case where balls are used as the rolling elements 5, balls made from a high-carbon chrome bearing steel such as SUJ2 or balls made from a high-carbon chrome bearing steel having the surface carbonitrided are preferably used respectively.

Hereunder is a description of experiments performed for verifying the effect of the present invention. In the experiments, all were performed on the wheel-support rolling bearing unit of the double row ball bearing type with the structure shown in FIG. 1, having back-to-back duplex bearing contact angles.

[First Experiment]

In the first experiment, the effect of the hardness of the root portion on the axial outside surface side of the flange 6 formed on the outer peripheral surface of the outer end portion of the hub ring 2 was studied. For the purpose, firstly the hub ring 2 of the wheel-support rolling bearing unit shown in FIG. 1, wherein the pitch diameter of the rolling elements 5 was 56 mm and the number of the rolling elements 5 was twelve, was made from the material shown in Table 2 below.

TABLE 2

| Material | C | Si | Mn | Cr | V |
|---|---|---|---|---|---|
| A | 0.45 | 0.25 | 0.81 | 0.10 | □ |
| B | 0.50 | 0.20 | 0.80 | 0.15 | □ |
| C | 0.53 | 0.21 | 0.75 | 0.17 | □ |
| D | 0.55 | 0.24 | 0.85 | 0.15 | □ |
| E | 0.58 | 0.15 | 0.82 | 0.13 | □ |
| F | 0.71 | 0.23 | 0.87 | 0.15 | □ |
| G | 0.80 | 0.45 | 0.95 | 0.45 | □ |
| H | 0.91 | 0.42 | 0.91 | 0.41 | □ |
| I | 0.50 | 0.20 | 0.83 | 0.17 | 0.3 |
| J | 0.58 | 0.23 | 0.87 | 0.13 | 0.03 |

The hub ring 2 was made from any one carbon steel selected from ten types of carbon steels from A to J shown in Table 2, by hot forging. In this case, the properties of the hub ring 2 were changed by changing the cooling process after forging, that is, whether radiational cooling or air cooling using a cooling fan was performed. Then, cutting and drilling were applied after hot forging and cooling so as to form the hub ring 2 in the predetermined shape. After this, a hardened layer was formed in the region from the root portion on the axial inside surface side of the flange 6 and the first inner raceway 7a to the step portion 8 shown by hatching in FIG. 1, by induction hardening. Then grinding for finishing was applied thereto. On the other hand, the outer ring 4 was made from S53C which is a carbon steel for machine structural use (medium carbon steel), and the inner ring 3 and the respective rolling elements 5 were made from SUJ2.

A rotation test was performed on the wheel-support rolling bearing unit (sample) made in this manner, by continuously rotating at 400 min$^{-1}$ rotational speed for 50 hours in a condition where 6000N of axial load and 5000 to 9600N of radial load (changed for each experiment) were applied. The rotation test was performed on a plurality of the same samples by changing the radial load. After performing this test, the minimum value of radial load applied to the sample in which a crack had occurred in the root portion of the outside surface of the flange 6, was determined as the endurance load of the sample. The results of the experiment performed in such conditions are shown in Table 3 below.

TABLE 3

| load | Material | Cooling | Hardness(Hv) | Endurance Other Conditions |
|---|---|---|---|---|
| Example | | | | |
| 1 | C | Air Cooling | 260 | 1.2 |
| 2 | D | Air Cooling | 268 | 1.3 |
| 3 | E | Air Cooling | 272 | 1.5 |
| 4 | F | Raditional Cooling | 308 | 1.5 |
| 5 | G | Raditional Cooling | 345 | 1.6< |
| 6 | I | Air Cooling | 265 | 1.3 |
| 7 | J | Air Cooling | 288 | 1.5 |
| 8 | B | Air Cooling | 285 | 1.5 | burnishing |
| 9 | C | Air Cooling | 327 | 1.6< | burnishing |
| Comparative Example | | | | |
| 1 | A | Air Cooling | 228 | 0.9 |
| 2 | B | Raditional Cooling | 235 | 0.9 |
| 3 | C | Raditional Cooling | 248 | 1 |
| 4 | H | Air Cooling | 372 | 1.6< | Decrease of |

In Table 3, regarding the total of thirteen types of samples consisting of nine types of samples (examples 1 to 9) which belong to the present invention and 4 types of samples (comparative examples 1 to 4) outside of the present invention, the material used for the hub ring 2, the cooling method after hot forging, the hardness of the outside root portion of the flange 6 (Hv) and the endurance load are shown. The endurance load in the table represents the proportion with respect to comparative example 3 assuming that the endurance load of comparative example 3 is 1.0. Moreover, the hardness of the root portion was obtained by cutting the hub ring 2 and making the cut section a mirror finished surface, and measuring a position of 0.1 mm from the surface by a Vickers hardness testing machine.

As is apparent from Table 3 showing the first experimental results performed in this manner, in examples 1 to 9, since the hardness of the root portion of the flange 6 was within the range stipulated by the present invention (Hv 260 to 345), the fatigue strength with respect to the rotating bending stress and the endurance load were high. Moreover, the cutting property was not decreased. In examples 1 to 3, the material strength was increased mainly by increasing the cooling rate after hot forging. In examples 4 and 5, the material strength was increased mainly by increasing the C content in the material. In examples 6 and 7, the material strength was increased mainly by adding V to the material and increasing the cooling rate. In examples 8 and 9, the material strength was increased by work-hardening by burnishing.

On the other hand, in comparative examples 1 to 3, since the hardness of the root portion of the flange 6 was less than the range stipulated by the present invention, the result was that the fatigue strength with respect to the rotating bending and the endurance load were low. Conversely, in comparative example 4, the hardness of the root portion of the flange 6 was more than the range stipulated by the present invention. Therefore though the endurance load was high, the cutting property was lowered.

[Second Experiment]

In the second experiment, the effect of the surface roughness of the root portion on the axial outside surface side of the flange 6 formed on the outer peripheral surface of the outside end portion of the hub ring 2 was studied. The construction and size of the wheel-support rolling bearing unit including the quenched portion used in the second experiment were the same as for the case of the first experiment described above. However, the hub ring 2 was made from S53C, being a carbon steel for machine structural use, in all cases. Moreover, when making the hub ring 2, the cooling after hot forging was performed by air cooling using a cooling fan. The materials of the outer ring 4, the inner ring 3, and the rolling elements 5 were also similar to the case of the first experiment. Regarding such a wheel-support rolling bearing unit, the surface roughness of the root portion on the axial outside surface side of the flange 6 was changed variously by changing the cutting speed of the normally performed cutting, and adding grinding, or adding burnishing.

A rotation test was performed on the wheel-support rolling bearing unit (sample) made in this manner, by continuously rotating at 400 min$^{-1}$ rotational speed for 50 hours in a condition where 6000N of axial load and 8000N of radial were applied. After performing this test, the sample was examined for whether or not a crack had occurred in the root portion of the outside surface of the flange 6. The results of the experiment performed in such conditions are shown in Table 4 below.

TABLE 4

| | Roughness μmRa | Hardness Hv | Crack Generation | Working |
|---|---|---|---|---|
| Example | | | | |
| 11 | 1.0 | 245 | ○ | Cutting |
| 12 | 0.3 | 245 | ○ | Grinding |
| 13 | 0.4 | 285 | ○ | Burnishing |
| 14 | 0.7 | 260 | ○ | Cutting |
| 15 | 0.2 | 260 | ○ | Grinding |
| Comparative Example | | | | |
| 11 | 1.4 | 245 | x | Cutting |
| 12 | 1.8 | 245 | x | Cutting |

In Table 4, regarding the total of seven types of samples consisting of five types of samples (examples 11 to 15) which belong to the present invention and two types of samples (comparative examples 11 and 12) outside of the present invention, the surface roughness of the outside root portion of the flange 6, the hardness of the outside root portion of the flange 6 (Hv) and the existence or nonexistence of cracks after the test are shown. Of the reference symbols in Table 4, "O" represents that cracks were not produced and "X" represents that cracks were produced. The hardness of the root portion was obtained similarly to the case of the first experiment described above.

As is apparent from Table 4 showing the second experimental results performed in this manner, in examples 11 to 15, since the surface roughness of the root portion on the axial outside surface of the flange 6 was within a range from 0.1 to 10.0 μm Ra by arithmetic average roughness which is the range stipulated by the present invention, the fatigue strength with respect to the rotating bending stress was high and cracks did not occur in the root portion after the test.

On the other hand, in comparative examples 11 and 12, since the surface roughness was out of the range stipulated by the present invention, cracks occurred after the test.

[Third Experiment]

In the third experiment, the effect of the surface roughness of the root portion on the axial outside surface side of the flange 6 formed on the outer peripheral surface of the outside end portion of the hub ring 2 was studied. The construction and size of the wheel-support rolling bearing unit including the quenched portion used in the third experiment were the same as for the case of the first experiment and the second experiment described above.

However, in the third experiment, the hub ring 2 was made from a steel containing alloy components shown in Table 5 below.

TABLE 5

| Steel Type | Alloy Content (weight %) | | | | | |
|---|---|---|---|---|---|---|
| | C | Mn | Si | Cr | S | O(ppm) | V |
| A | 0.45 | 0.9 | 0.7 | 0.2 | 0.035 | 15 | 0.08 |
| B | 0.53 | 0.7 | 0.2 | 0.2 | 0.015 | 12 | 0 |
| C | 0.53 | 0.8 | 0.6 | 0.2 | 0.025 | 15 | 0.05 |
| D | 0.65 | 0.5 | 0.2 | 0.1 | 0.013 | 12 | 0 |

Hot forging at 1000 to 1200° C. was applied to the steel material having the composition shown in Table 5 to obtain an intermediate material. Then cutting and drilling were applied to the intermediate material so as to obtain the hub ring 2 having the predetermined shape and surface roughness. Particularly, when cutting the root portion on the outside surface side of the flange 6, the peripheral speed, the feed speed, and the cut depth of the lathe were changed to make test pieces having different surface roughnesses Ry (maximum height). Then, by applying induction hardening and tempering to the portion from the periphery of the inner raceway 7a to the periphery of the step portion 8, a hardened layer having a hardness of Hv 660 to Hv 760 was formed on the surface. Next, finishing was applied to the inner raceway 7a portion by grinding. The root portion on the outside surface side of the flange 6, was left as cut, without applying grinding.

Figure 3:
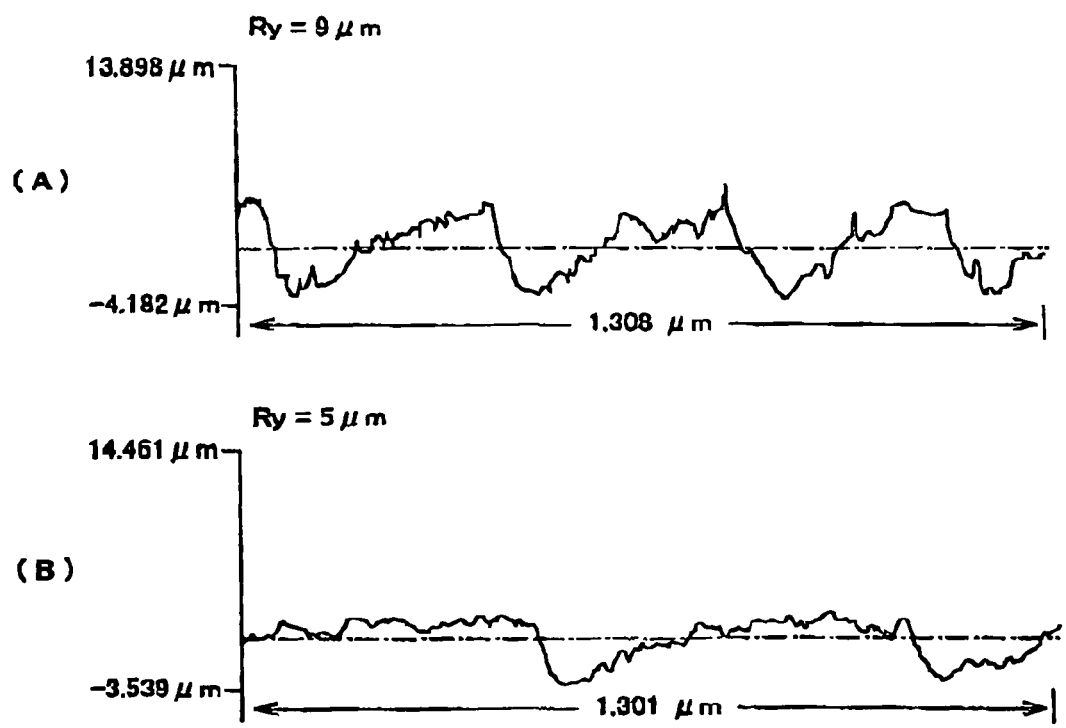
FIG. 3 is diagrams showing two examples of surface shape of a root portion on an axial outside surface side of a flange.

In Table 6 below, measured values of the surface hardness of the inner raceway 7a portion to which induction hardening was applied, the surface hardness of the non-thermal refined portion to which induction hardening was not applied, and the surface roughness Ry (maximum height) of the root portion on the outside surface side of the flange 6 are disclosed. Moreover, in FIG. 3, two examples of the shape when the surface roughness of the root portion on the outside surface side of the flange 6 was measured are disclosed. In FIG. 3, (A) shows the surface shape for a maximum height Ry of 9 μm and (B) shows the surface shape for a maximum height Ry of 5 μm.

TABLE 6

| | Steel Type | Refined portion Hardness Hv | Non-thermal Life surface hardness Hv | Raceway portion (Maximum height) Ry(μ□) | Roughness |
|---|---|---|---|---|---|
| Example | | | | | |
| 16 | A | 238 | 690 | 6 | 3.0< |
| 17 | A | 230 | 705 | 3 | 3.0< |
| 18 | A | 241 | 718 | 1 | 3.0< |
| 19 | B | 252 | 706 | 10 | 1.8 |
| 20 | B | 238 | 715 | 7 | 2.1 |
| 21 | B | 248 | 735 | 4 | 3.0< |
| 22 | C | 255 | 715 | 9 | 2.1 |
| 23 | C | 269 | 735 | 6 | 3.0< |
| 24 | D | 265 | 725 | 7 | 2.7 |
| 25 | D | 280 | 738 | 5 | 3.0< |
| Comparative Example | | | | | |
| 13 | B | 241 | 702 | 12 | 1.0 |
| 14 | B | 251 | 718 | 14 | 0.8 |
| 15 | B | 238 | 732 | 17 | 0.7 |

The outer ring 4 was made from S53C and induction hardening and tempering treatments were applied to the periphery of the pair of outer raceways 10a and 10b so that a hardened layer having a hardness of Hv 660 to Hv 760 was formed on the surfaces of the respective outer raceways 10a and 10b. Moreover, the inner ring 3 and the rolling elements 5 were made from SUJ2 and hardened from the surface to the core by a standard quenching treatment. From the inner ring 3, the rolling elements 5, and the hub ring 2 described above, the wheel-support rolling bearing unit having the construction shown in FIG. 1 was made. The number of the rolling elements 5 in the respective rows was twelve, and the pitch diameter of the respective rolling elements 5 was 49 mm.

On such a wheel-support rolling bearing unit, a rotation test was performed under the following conditions.

Radial load: 8800N
Axial load: 5900N
Rotational speed: 300 min$^{-1}$

The time point when flaking occurred on any of the first inner raceways 7a and 7b, and the outer raceways 10a and 10b resulting in abnormal vibration accompanied by the rotation of the wheel-support rolling bearing unit, or the time point when cracks were recognized on the periphery of the flange 6, was regarded as the life of the wheel-support rolling bearing unit. In both of the comparative examples 13 and 14, the life was terminated due to cracking. The results of the rotation test performed under such conditions are shown in Table 6. The life shown in Table 6 represents the proportion with respect to comparative example 13, assuming that the life of comparative example 13 is 1.0.

As is apparent from the description of Table 6, in all examples 16 to 25, since the surface roughness (maximum height) Ry of the root portion on the outside surface side of the flange 6 was 10 μm or lower, the fatigue strength with respect to the rotating bending was high and superior durability was obtained. Particularly, in examples 16 to 18, 21, 23, and 25, since the Ry value was low, the durability was considerably superior.

On the other hand, in all comparative examples 13 to 15, since the surface roughness (maximum height) Ry of the root portion on the outside surface side of the flange 6 was high, exceeding 10 μm, the fatigue strength with respect to rotating bending was inferior.

Figure 4:
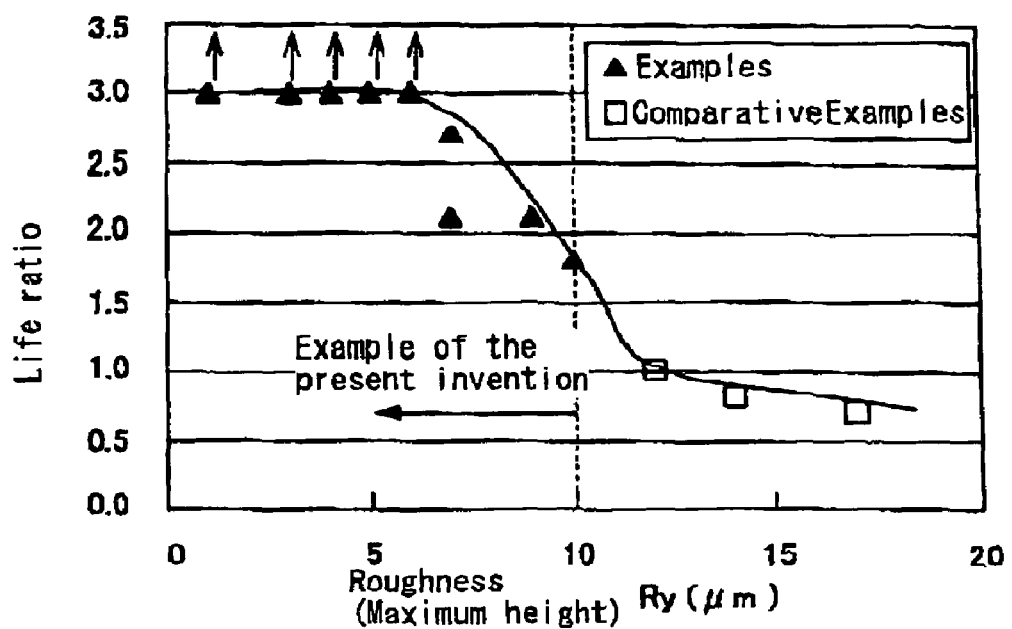
FIG. 4 is a graph showing a relation between surface roughness of the root portion on the axial outside surface side of the flange and endurance life, which was obtained from experiments in examples of the present invention.

FIG. 4 shows the relation between the surface roughness (maximum height) Ry of the root portion on the outside surface side of the flange 6 described in Table 6 and the life of the rotation test. As is apparent from FIG. 4, if the surface roughness Ry value of the root portion is controlled to 10 μm or less, the fatigue life was increased compared to the case where the value exceeds 10 μm. Particularly, with the maximum height Ry value of the surface roughness within the range of 6 μm or less, the effect of increasing the fatigue life was remarkable.

In the case where the experiment is performed with the construction as shown in FIG. 2 described above, where the flange 6 is provided on the outer peripheral surface of the outer ring (hub ring) 2, a similar operation and effect can of course obtained.

As is apparent from the first to third experimental results, by making the hardness of the root portion on the axial outside surface side of the flange 6 formed on the outer peripheral surface of the hub ring 2 for securing the wheel, between Hv 260 and Hv 345, or making the surface roughness of the root portion thereof 1.0 μm or less by arithmetic average roughness Ra or 10 μm or less by maximum height Ry, the fatigue strength of the root portion is increased. Accordingly, it becomes possible to thin (lighten) the wall of the wheel-support rolling bearing unit. If the hardness of the root portion is between Hv 260 and Hv 345 and, at the same time, the surface roughness of the root portion is 1.0 μm or less by arithmetic average roughness Ra or 10 μm or less by maximum height Ry, it is of course possible to further increase the fatigue strength and further thin (lighten) the wall of the wheel-support rolling bearing unit.

As described above, by adjusting the properties of the root portion on the outside surface side of the flange formed on the outer peripheral surface of the rotating ring for attaching the wheel, it becomes possible to increase the strength of the root portion which is the weakest portion regarding fatigue due to the rotating bending moment, without changing the shape and the size, nor increasing the manufacturing cost. As a result, it becomes possible to thin the wall of the flange, and lightening of the wheel-support rolling bearing unit can be realized.

Next is a description of another aspect of the present invention. The flanged bearing unit of this aspect has the same basic construction as that described in FIG. 1, and hence FIG. 1 is used for the description.

First Embodiment

In the flanged bearing unit 1, since a radial load is produced from the road surface to the bearing while the hub ring 2 is rotating, the rotating bending stress is generated in the root portion of the wheel attaching flange 6. Particularly, at the outside root portion 14 of the wheel attaching flange 6, heat treatment such as quenching and hardening is not applied, but the rotating bending stress is concentrated. Therefore there is concern of damage occurring, depending on the use conditions and design conditions.

On the other hand, as described above, since it is required to lighten the hub ring 2, it is desirable to thin the wall of the wheel attaching flange 6. However, in order to proceed to thin the wall of the wheel attaching flange 6, it is required to increase the fatigue strength of the outside root portion 14 of the wheel attaching flange 6.

In the outside root portion (untempered steel) 14 of the wheel attaching flange 6 which is a medium carbon steel not subjected to heat treatment such as quenching and hardening after hot forging, generally with an increase in hardness the fatigue strength is increased (refer to "Metal Fatigue: Effect of Small Defects and Inclusions" by Yukitaka MURAKAMI, Yokendo, 1993, p8). However, since lathe turning and drilling are applied to the wheel attaching flange 6 of the hub ring 2 after hot forging, workability is considerably decreased if the hardness is increased more than required.

Here, the present inventors have earnestly studied methods for increasing the fatigue strength without increasing the hardness more than required, nor decreasing the workability. Consequently, the following findings were obtained.

(1) The fatigue strength is not only increased by hardness.

The fatigue strength tends to be increased according to the increase in the hardness, however variations in fatigue strength were found in materials although the hardness was the same. As a result of comparisons of two materials, a difference was found in the structure of the material. In untempered medium carbon steel, cracks occurred in the pro-eutectoid ferrite structure which is the weakest structure, with respect to the rotating bending stress. The cracks developed mainly in the pro-eutectoid ferrite grain and the boundary between the pro-eutectoid ferrite and pearlite.

That is, it was found that the variations in fatigue strength were caused by the recipitated amount and the form of the pro-eutectoid ferrite structure.

(2) The lathe turning property is not only decreased by hardness.

The lathe turning property tends to be decreased according to the increase in the hardness, however variations in the lathe turning property were found in materials although the hardness was the same. As a result of comparisons of two materials, a difference was found in the inclusions in the structure of the material, particularly, the amount and the shape of MnS (manganese sulphide).

The hardness of the untempered medium carbon steel is determined by the precipitated amount of the pro-eutectoid ferrite structure. Since the pro-eutectoid ferrite structure is low in hardness and easily plastic deformed, if the precipitated amount in the pro-eutectoid ferrite structure is large, hardness is decreased and workability is increased. Similarly, although there was only a small amount, MnS is also easily plastic deformed. Therefore the lathe turning property was increased but hardness was little affected. That is, it was found that the variations in the lathe turning property were caused by the amount and the shape of inclusions such as MnS.

Based on the above findings, the present inventors have found a method of increasing the fatigue strength of untempered medium carbon steel without increasing the hardness more than required, nor decreasing workability.

As the method of increasing the fatigue strength, it is effective to optimize the precipitated amount and the form of the pro-eutectoid ferrite structure. Moreover, to increase workability, the greater the precipitated amount of the pro-eutectoid ferrite structure and the dispersed amount of MnS the better.

The pro-eutectoid ferrite structure is precipitated and grown with the grain boundary or fine precipitate such as carbides as the nucleus. Furthermore, in some cases it is precipitated and grown with a starting point of MnS which is the non-metallic inclusions in the steel. As described above, since the pro-eutectoid ferrite structure is easily plastic deformed being a weak structure, stress is easily concentrated in the largely grown pro-eutectoid ferrite structure, so it is easily damaged. Moreover, since the pro-eutectoid ferrite structure is precipitated and grown along the grain boundaries, then if it grows largely, and a condition results where the pro-eutectoid ferrite structure grows in a net shape (hereunder, simply called 'net') on the grain boundary and surrounds the grain, then structurally it becomes an extremely weak condition with respect to rotating bending stress.

Therefore, in the present invention, by finely dispersing and precipitating the pro-eutectoid ferrite structure, the pro-eutectoid ferrite structure can be kept from growing and precipitating in a net shape. Moreover, by dispersing the pro-eutectoid ferrite structure, the stress concentration is also dispersed. Therefore it becomes a strong structure with respect to rotating bending stress. The dispersed and precipitated pro-eutectoid ferrite structure increases the fatigue strength and is effective for workability. Consequently, by finely dispersing the pro-eutectoid ferrite structure, it becomes possible to increase both the fatigue strength and the workability at the same time.

Specific manufacturing methods to finely disperse the pro-eutectoid ferrite structure include: (1) to add an alloy element to the material, (2) to refine the grain structure by optimizing the hot forging condition, and (3) to disperse a suitable amount of MnS. Hereunder is a description in the order of (1), (2), and (3).

Figure 5:
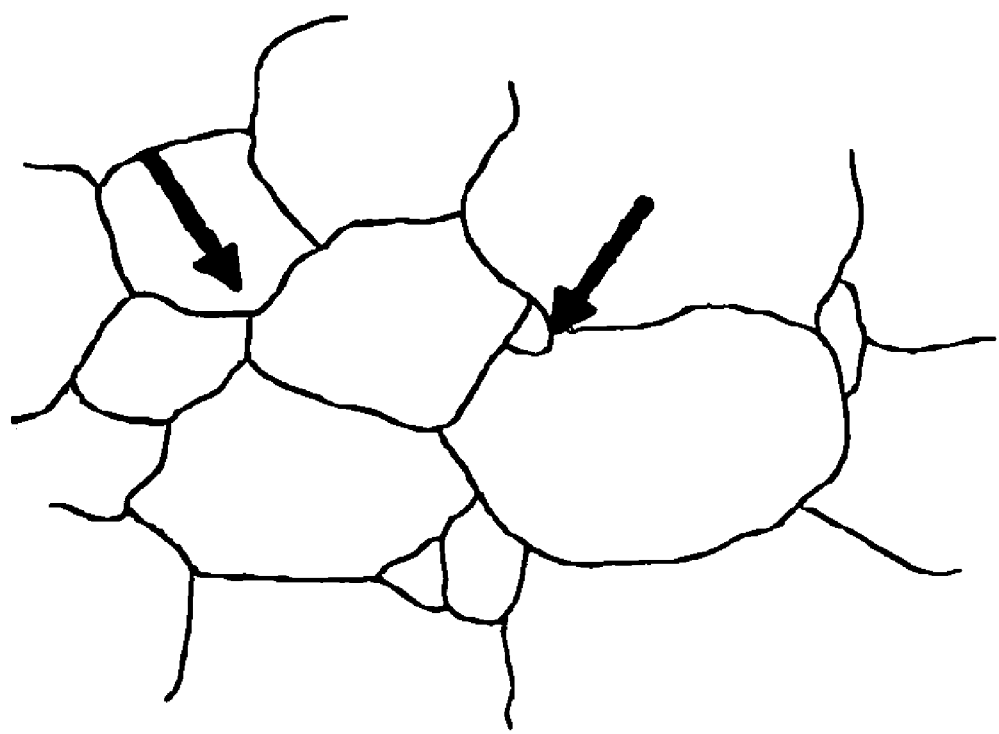
FIG. 5 is an explanatory diagram of an intersection of a grain boundary.

(1) When a precipitate such as carbide is finely dispersed in steel, the grain can be kept from growing and the grain structure can be refined. As described above, the pro-eutectoid ferrite structure is precipitated and grown with the grain boundary or fine precipitate such as carbides as the nucleus. Particularly, as shown in FIG. 5, the pro-eutectoid ferrite structure is easily precipitated in the intersection (triple point) of the grain boundary. Therefore, if the grain structure is refined, the number of intersections of the grain boundary is increased, and consequently the pro-eutectoid ferrite structure can be finely dispersed. In order to finely disperse the precipitate such as carbide into the steel, it is necessary to add a suitable amount of C (weight %). It is also effective to add Cr or a small amount of V, which are carbide forming elements.

(2) As described above, if the crystal structure is refined, then consequently the pro-eutectoid ferrite structure can be finely dispersed. The heating of hot forging activates atomic diffusion of the metal structure and grows the grain. Therefore, the temperature of hot forging is preferably low in order to refine the grain. Moreover, the grain becomes finer the greater the degree of forging. However, if the temperature of hot forging is too low, deformation resistance of the material becomes large so that the processing load is increased. When forging of a complex shape is performed at low temperatures, defective shape or cracks may occur in some cases.

On the other hand, regarding cooling after forging, the pro-eutectoid ferrite structure can be kept from growing if the cooling rate is increased. However, if the cooling rate is increased more than required, quenching and hardening (martensite transformation) occur so that the lathe turning property after forging is considerably adversely affected, or cracks may occur according to circumstances. By optimizing the forging condition including heating and cooling, the grain is refined, and consequently the pro-eutectoid ferrite structure can be finely dispersed.

(3) MhS easily becomes a nucleus for precipitation of the pro-eutectoid ferrite structure, tends to promote fine dispersion of the pro-eutectoid ferrite structure, and has an effect of increasing the lathe turning property. However, for example in the manufacturing process of the hub ring, there is the cold worked portion as shown by reference symbol 9 in FIG. 1. Therefore, in the case where MnS is dispersed more than required, there is concern of this becoming the starting point for cracking at the time of cold working. By dispersing a suitable amount of MnS, the fine dispersion of the pro-eutectoid ferrite structure can be promoted.

In the present invention, by limiting the carbon amount being the carbide, limiting the precipitated amount of the pro-eutectoid ferrite structure by area ratio, limiting the S addition which controls the precipitating condition of MnS, and limiting the sum of the dispersed amount of MnS and the precipitated amount of the pro-eutectoid ferrite structure which influences the lathe turning property, it becomes possible to increase the fatigue strength of untempered medium carbon steel without increasing the hardness more than required, nor decreasing workability.

Moreover, according to the reference ("Effect of Thermomechanical Treatment on the Fatigue Strength of Untempered Steel for Machine Structural Use" Heat Treatment Vol. 39 No. 6: Ichie Nomura, published by The Japan Society for Heat Treatment), it is described that "With respect to the rotating bending stress of untempered steel of ferrite+pearlite type medium carbon, fatigue cracks occur due to stress concentration produced in the pro-eutectoid ferrite on the surface, and these develop mainly in the pro-eutectoid ferrite grain and the pro-eutectoid ferrite-pearlite boundary. In order to improve the fatigue strength, it is effective to refine the ferrite grain of the crack occurrence unit."

In the root portion of the wheel attaching flange of the conventional flanged bearing unit 1, long and large pro-eutectoid ferrite is precipitated along the grain boundary. This is because the frequency of ferrite nuclei formation at the time of transformation is minimal, or groups having the same grain orientation are combined due to the growth of the ferrite.

By having such a ferrite structure precipitated in film shape in the austenite grain boundary, fatigue cracks are readily generated due to the rotating bending stress. In order to refine the ferrite grain, it is effective to refine the austenite grain, which determines the number of the ferrite nuclei generated, or to finely disperse the carbide and nitride.

However, by only reducing the average austenite grain size, the distribution of the pro-eutectoid ferrite can not be completely controlled so that cracking of the root portion of the wheel attaching flange 6 is not completely suppressed.

Here, with the object of further increasing the fatigue strength of the root portion of the wheel attaching flange 6 of the flanged bearing unit 1, the present inventors have made an earnest study, and as a result the following findings were obtained.

Firstly, the distribution of the pro-eutectoid ferrite of the outside root portion 14 of the wheel attaching flange 6 was investigated using an image analysis method described later, and the relation with the fatigue strength of the outside root portion 14 was examined. As a result, it was found that the length and the area ratio of the pro-eutectoid ferrite controls the fatigue strength.

Specifically, the area ratio of the pro-eutectoid ferrite per unit area (10 mm$^2$) of the surface of the outside root portion 14 of the wheel attaching flange 6 was between 3 and 15%, the maximum length of the pro-eutectoid ferrite was 200 μm or less, and the number of pro-eutectoid ferrites having a length of 180 μm or more was 5 or less. Moreover, the maximum length of the pro-eutectoid ferrite was preferably 150 μm or less, and more preferably was 100 μm or 50 μm or less.

Next is a description of the reason for limiting the numerical values in the present invention.

[The area ratio of the pro-eutectoid ferrite structure was between 3% and 15%]

As described in the above document, the pro-eutectoid ferrite is preferably kept to a minimum since it becomes a starting point for crack generation, or from the viewpoint of induction hardening properties. However, according to a drill test described later, since it also has an effect of enhancing workability, the area ratio of pro-eutectoid ferrite is required to be 3% or more. If however the area ratio of the pro-eutectoid ferrite becomes 15% or more, fatigue strength is decreased due to the increase of soft ferrite. Therefore, the area ratio of the pro-eutectoid ferrite is made between 3 and 15%.

In order to obtain the distribution of pro-eutectoid ferrite as described above, it is required to generate many nuclei at the time of austenite/ferrite transformation in the heat treatment process of the hub ring 2. As the means thereof, for example it is effective to refine the austenite grain by decreasing the forging temperature to a degree which does not interfere with the workability at the time of forging, or to refine the austenite grain by an alloy carbide such as V (vanadium), or to generate the ferrite nuclei on alloy carbide.

Furthermore, the distribution of pro-eutectoid ferrite can be controlled by controlling the cooling after forging. For example, if the cooling rate after forging is increased, the ferrite can be kept from growing, so that the ferrite can be kept from connecting in a net shape.

As described above, if the distribution of large ferrite grains is controlled in the direction causing the stress concentration in the outside root portion 14 of the wheel attaching flange 6 of the hub ring 2, then consequently the minimum unit of crack occurrence becomes smaller. Hence fatigue failure in the outside root portion 14 can be effectively suppressed.

[C: between 0.45 and 0.65 weight %]

Moreover, if the C in the steel being the material of the hub ring 2 is 0.45 weight % or less, the induction hardening hardness of the rolling portion is low, so that a strength above HRC 58 which is required for contributing to the rolling fatigue life is not possible. Furthermore, the hardness of the root portion of the wheel attaching flange 6 can not be sufficiently obtained, and particularly the fatigue strength of the outside root portion 14 with respect to the rotating bending stress is decreased. On the other hand, if the C exceeds 0.65 weight %, not only is the lathe turning property decreased due to the decrease in the area ratio of the pro-eutectoid ferrite structure and the increase in the hardness, but also the rolling fatigue life and the fatigue strength can not be greatly improved. Therefore, the C in the steel being the material of the hub ring 2 is made between 0.45 weight % and 0.65 weight %

[S: between 0.003 and 0.020 weight %]

S is the causative element to produce non-metallic sulfide inclusions such as MnS, and the non-metallic inclusions tend to be increased in proportion to the addition. As described above, since the non-metallic sulfide inclusions such as MnS are easily plastic deformed, the lathe turning property is increased. Moreover, it tends to promote the fine dispersion of the pro-eutectoid ferrite structure. However, if it is added more than required, the MnS becomes too much, causing concern of this becoming a starting point for cracking at the time of cold working.

Furthermore, in order to improve workability and to give the effect of fine dispersion of the pro-eutectoid ferrite structure, the addition is required to be 0.003 weight % or more. On the other hand, if it is added to give more than 0.020 weight %, the MnS becomes too much, causing concern of this becoming a starting point for cracking at the time of cold working. Therefore, it is made 0.020 weight % or less.

[10≦(S content (weight %)×1000+area ratio of pro-eutectoid ferrite structure (%))≦30]

The lathe turning property is determined by the MnS amount and the precipitated amount of the pro-eutectoid ferrite structure. However the precipitated amount of the pro-eutectoid ferrite structure changes according to the hot forging condition and the precipitate even if the carbon amount is the same. Furthermore, MnS becomes the starting point for precipitation of the pro-eutectoid ferrite structure, and also has a function to promote the dispersing precipitation. Therefore, simply determining the carbon amount and the S addition does not give an indication of the lathe turning property.

Here, the present inventors measured the precipitated amount of the pro-eutectoid ferrite structure by the area ratio, and derived a lathe turning property coefficient which was the S addition multiplied by a constant considering the effect of MnS, and then added with the area ratio of the pro-eutectoid ferrite structure. If the lathe turning property coefficient becomes less than 10, the MnS amount and the precipitated amount of the pro-eutectoid ferrite structure becomes insufficient, so that sufficient workability can not be obtained. Moreover, if the lathe turning property coefficient exceeds 30, the precipitated amount of the pro-eutectoid ferrite structure becomes too much so that the fatigue limit is decreased.

Therefore, the lathe turning property coefficient is between 10 and 30.

[V: between 0.05 and 0.3 weight %]

Furthermore, if the austenite grain is refined by the alloy carbide of V (vanadium), the V addition is preferably between 0.05 and 0.3 weight %. Moreover, the oxygen contents of the material of the hub ring 2 is preferably 12 ppm or less considering the rolling fatigue life of the rolling portion.

As described above, in this embodiment, by refining the microstructure of at least the wheel attaching flange 6 of the hub ring 2, it becomes possible to increase the strength of the outside root portion 14 of the wheel attaching flange 6 which is the weakest portion for the rotating bending fatigue, without changing the shape and the size of wheel attaching flange 6, nor increasing the cost due to the increase in the induction hardened portion. As a result, it becomes possible to thin the wall of the wheel attaching flange 6, and lightening of the flanged bearing unit can be realized.

As described above, by limiting the carbon amount being the carbide, limiting the precipitated amount of the pro-eutectoid ferrite structure by area ratio, limiting the S addition which controls the MnS amount, and limiting the sum of the MnS amount and the precipitated amount of the pro-eutectoid ferrite structure which controls the lathe turning property, it becomes possible to increase the fatigue strength of untempered medium carbon steel without increasing the hardness more than required, nor decreasing the workability.

Here, the present inventors found that the fatigue strength of the outside root portion 14 of the wheel attaching flange 6 correlates with the proportion between the MnS amount and the precipitated amount of the pro-eutectoid ferrite structure. The sum of the MnS amount and the precipitated amount of the pro-eutectoid ferrite structure indicates the lathe turning property. If the balance between the MnS amount and the precipitated amount of the pro-eutectoid ferrite structure collapses, in some cases, the fatigue strength of the outside root portion 14 of the wheel attaching flange 6 may be decreased although the lathe turning property is maintained.

If the precipitated amount of the pro-eutectoid ferrite structure is too much with respect to the MnS amount, the precipitated amount is increased even though the starting points for the precipitation of the pro-eutectoid ferrite structure are reduced. That is, it is understood that the pro-eutectoid ferrite structure grows large so as to increase the area ratio. If the precipitated amount of the pro-eutectoid ferrite structure is too much with respect to the MnS amount, the fine dispersion of the pro-eutectoid ferrite structure becomes insufficient, so that the fatigue strength of the outside root portion 14 of the wheel attaching flange 6 tends to be reduced.

On the other hand, if the precipitated amount of the pro-eutectoid ferrite structure is too little with respect to the MnS amount, the amount of the pro-eutectoid ferrite structure precipitated from the precipitates, or from the intersections of the grain boundary except for the pro-eutectoid ferrite structure precipitated from the starting point of the MnS, is shown to be abnormally little. There is little space for the pro-eutectoid ferrite structure to precipitate. That is, the fine dispersion of the pro-eutectoid ferrite structure is insufficient and the structure lacks precipitates. Hence the fatigue strength tends to be decreased.

Therefore, in order to obtain sufficient fatigue strength of the outside root portion 14 of the wheel attaching flange 6 in addition to the lathe turning property, the balance between the MnS amount and the precipitated amount of the pro-eutectoid ferrite structure (flange fatigue limit coefficient) becomes important. Since the MnS amount is in proportion to the S addition, the flange fatigue limit coefficient is the proportion between the S addition and the area ratio of the pro-eutectoid ferrite structure which is represented by the following equation.

Flange fatigue limit coefficient=($S$ content(weight %)×1000)/area ratio of pro-eutectoid ferrite structure (%)

Here, if the flange fatigue limit coefficient exceeds 2, the precipitated amount of the pro-eutectoid ferrite structure becomes too much with respect to the MnS amount so that the fatigue strength shows a tendency to decrease. If it is less than 1, the precipitated amount of the pro-eutectoid ferrite structure becomes too little with respect to the MnS amount so that the fatigue strength shows a tendency to decrease.

Therefore, in order to obtain sufficient fatigue limit strength of the outside root portion 14 of the wheel attaching flange 6 in addition to the lathe turning property, the flange fatigue limit coefficient=(S content (weight %)×1000) area ratio of pro-eutectoid ferrite structure (%), is preferably between 1 and 2.

EXAMPLE A

First Example

In order to verify the effect of the present invention, the materials shown in Table 7 were used and worked in various hot forging conditions. Then the microstructures were identified, and the amount of the pro-eutectoid ferrite structure was measured by image analysis.

TABLE 7

| Steel Type | C (Weight %) | Si (Weight %) | Mn (Weight %) | Cr (Weight %) | V (Weight %) | S (Weight %) |
|---|---|---|---|---|---|---|
| S53C | 0.53 | 0.21 | 0.75 | 0.17 | 0 | 0.017 |
| A1 | 0.54 | 0.24 | 0.79 | 0.15 | 0 | 0.013 |
| A2 | 0.53 | 0.22 | 0.81 | 0.16 | 0 | 0.005 |
| A3 | 0.45 | 0.22 | 0.81 | 0.16 | 0 | 0.013 |
| A4 | 0.65 | 0.22 | 0.81 | 0.16 | 0 | 0.013 |
| A5 | 0.56 | 0.24 | 0.79 | 0.15 | 0.08 | 0.013 |
| B1 | 0.54 | 0.23 | 0.87 | 0.15 | 0 | 0.022 |
| B2 | 0.43 | 0.23 | 0.87 | 0.15 | 0 | 0.013 |
| B3 | 0.68 | 0.23 | 0.87 | 0.15 | 0 | 0.013 |

Regarding the hot forging, a steel bar was cut then high frequency induction heating was applied at various temperature between 950 and 1200° C. to change the fine level of the structure. Then hot forging, mainly comprising upsetting was applied and the forging was cooled at various cooling rates so as to make various precipitating conditions of the pro-eutectoid ferrite structure.

The microstructure was etched by picral etching reagent and the structure was photographed by an electron microscope. Then only the pro-eutectoid ferrite structure was taken out from the substrate surface of the image of the electron microscope by an image analyzer to calculate the area ratio.

Electron microscope: JSM-T 220A made by JEOL LTD,
Image analyzer: IBAS2000 made by CARL ZEISS, Inc.

After hot forging and cooling, the oxide film was removed by shot blasting, and various test pieces were made by lathe turning. Then, a life test of the cutting tool, a rotating bending fatigue test, a cold working test, and a life test under lubrication mixed with foreign material were performed for various evaluations. The respective test conditions were as follows.

<Life test of cutting tool>
Cutting machine: high-speed lathe
Tool: P10 (JIS B 4053)
Cutting speed: 180 to 220 m/sec
Feed rate: 0.2 to 0.3 mm/rev
Cutting depth: 0.6 to 11.0 mm According to the JIS B 4011 cutting tool cutting test method, respective samples were ground under the above conditions. The time until the flank wear loss of the cutting tool reached 0.2 mm was regarded as the tool life.

<Rotating bending fatigue test>
Testing machine: Ono type rotating bending fatigue testing machine
Test piece: No. JIS1-8 test piece (JIS Z 2274)
Rotational speed: 3700 $min^{-1}$ The stop revolutions was $10^7$ and the condition where the test load was changed and damage stopped was regarded as the fatigue limit strength.

<Cold Working Test>
Cylindrical test pieces of ϕ20×30 mm were made by lathe turning. Cold compressing (forging) was performed on the cylindrical test pieces from the top and the bottom with an upsetting rate of 80% to confirm whether the cracks were generated on the circumference or not. In the test, 10 pieces were respectively worked to investigate the probability of crack generation.

<Life Test Under Lubrication Mixed with Foreign Material>

A thrust type bearing steel life testing machine described in "Special Steel Handbook" first edition (edited by Electric Furnace Steel Steel Forum published by Rikogakusha Publishing Co., Ltd, published on May 25, 1969) page 10 to 21 was used. SUJ2 balls were used for the rolling elements and 20 samples were respectively tested. The cumulative number of stress cycles (life) until the time point where flaking occurred was investigated to make a Weibull plot so that the respective $L_{10}$ lifes were obtained from the respective results of the Weibull distribution. Moreover, if the number of stress cycles exceeded $10^7$, the test was paused. If the total number exceeded $10^7$, the $L_{10}$ life was $10^7$.

Test surface pressure: maximum 4900 Mpa
Rotational speed: 1000 $min^1$
Lubricating oil: #68 turbine oil Quenching and tempering by induction heating were applied to the raceway portion of the life test piece.

Figure 6:
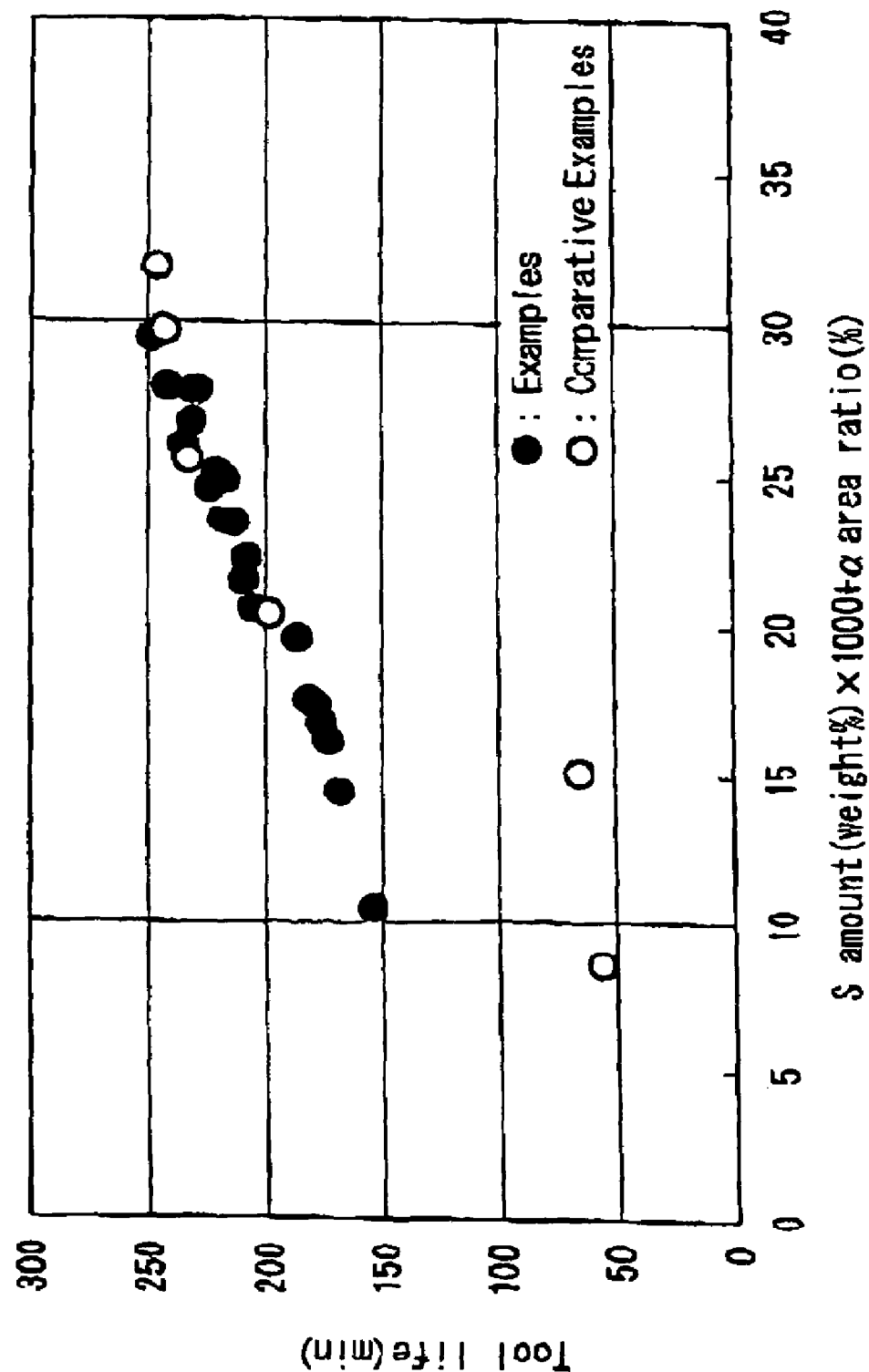
FIG. 6 is a graph showing a relation between an S amount (weight %)×1000+α area ratio (%) and tool life.
Figure 7:
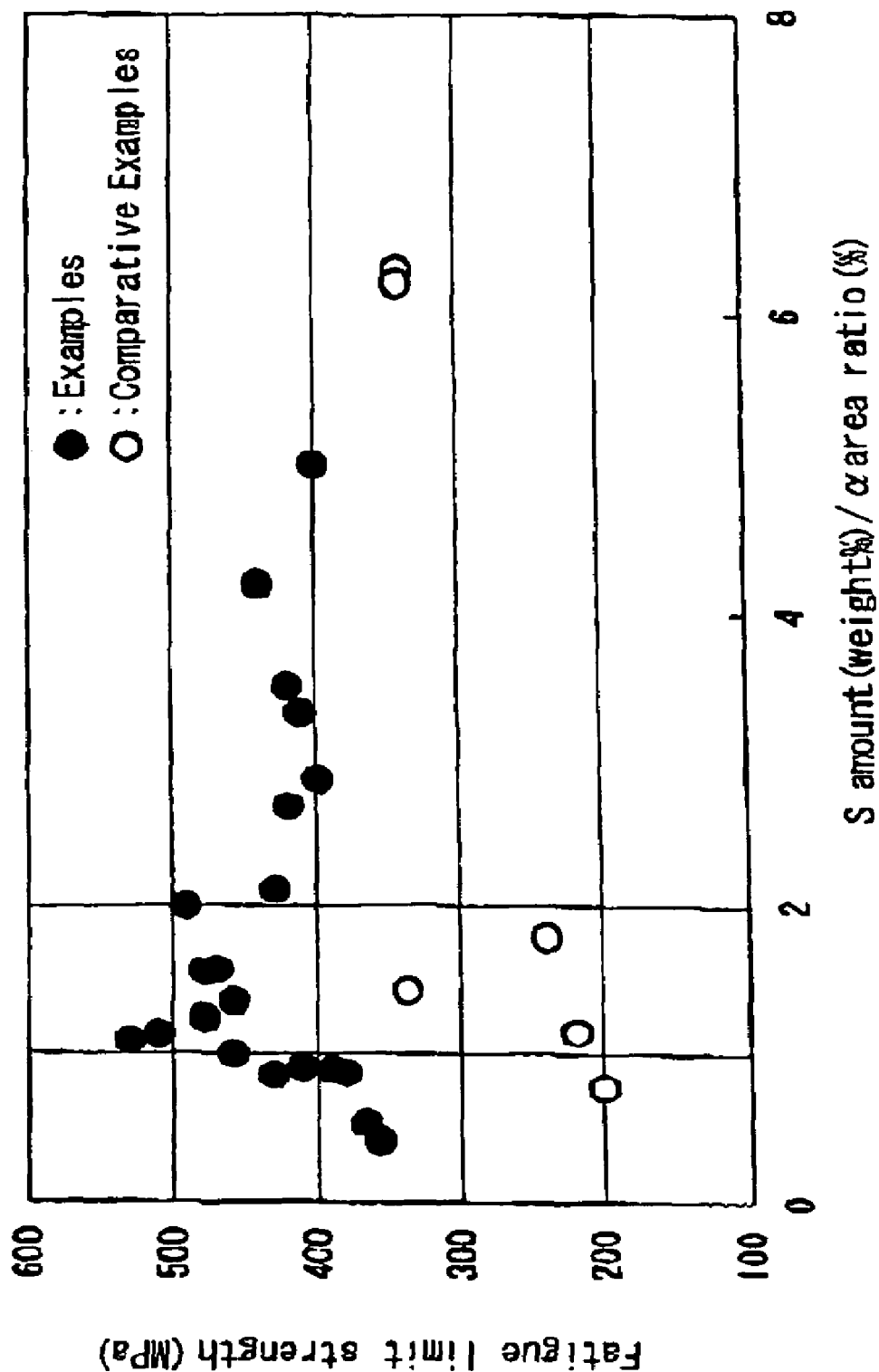
FIG. 7 is a graph showing a relation between the S amount (weight %)×1000+α area ratio (%) and fatigue limit strength.

Respective test results were summarized and shown in Table 8. Moreover, the relation between the S amount (weight %)×1000+α area ratio (%) and the tool life is shown in FIG. 6, and the relation between the S amount (weight %)/α area ratio (%) and the fatigue limit strength is shown in FIG. 7. In Table 8, FIG. 6, and FIG. 7, the area ratio of the pro-eutectoid ferrite structure is denoted by a area ratio for convenience sake.

TABLE 8-1

| | Steel type | S addition (weight %) | Pro-eutectoid ferrite area rate (%) | S amount (weight %) × 1000 + α area ratio (%) | S amount (weight %) × 1000/ α area ratio (%) |
|---|---|---|---|---|---|
| Example | | | | | |
| 1 | S53C | 0.017 | 3.4 | 20.4 | 5.0 |
| 2 | S53C | 0.017 | 5.1 | 22.1 | 3.3 |
| 3 | S53C | 0.017 | 6.3 | 23.3 | 2.7 |
| 4 | S53C | 0.017 | 8.0 | 25.0 | 2.1 |
| 5 | S53C | 0.017 | 10.8 | 27.8 | 1.6 |
| 6 | S53C | 0.017 | 12.5 | 29.5 | 1.4 |
| 7 | A1 | 0.013 | 3.7 | 16.7 | 3.5 |
| 8 | A1 | 0.013 | 10.4 | 23.4 | 1.3 |
| 9 | A1 | 0.013 | 13.0 | 26.0 | 1.0 |
| 10 | A2 | 0.005 | 5.6 | 10.6 | 0.9 |
| 11 | A2 | 0.005 | 9.4 | 14.4 | 0.5 |
| 12 | A2 | 0.005 | 12.3 | 17.3 | 0.4 |
| 13 | A3 | 0.013 | 4.5 | 17.5 | 2.9 |
| 14 | A3 | 0.013 | 13.8 | 26.8 | 0.9 |
| 15 | A3 | 0.013 | 14.9 | 27.9 | 0.9 |
| 16 | A4 | 0.013 | 3.1 | 16.1 | 4.2 |
| 17 | A4 | 0.013 | 8.3 | 21.3 | 1.6 |
| 18 | A4 | 0.013 | 11.5 | 24.5 | 1.1 |
| 19 | A5 | 0.013 | 6.5 | 19.5 | 2.0 |
| 20 | A5 | 0.013 | 11.8 | 24.8 | 1.1 |
| 21 | A5 | 0.013 | 14.8 | 27.8 | 0.9 |
| Comparative Example | | | | | |
| 1 | B1 | 0.022 | 3.5 | 25.5 | 6.3 |
| 2 | B2 | 0.013 | 7.2 | 20.2 | 1.8 |
| 3 | B3 | 0.013 | 2.1 | 15.1 | 6.2 |
| 4 | S53-CG | 0.017 | 14.8 | 31.8 | 1.1 |
| 5 | A2 | 0.005 | 3.5 | 8.5 | 1.4 |
| 6 | A3 | 0.013 | 16.8 | 29.8 | 0.8 |

TABLE 8-2

| | Tool life (min) | Fatigue limit strength | Cold crack incidence (%) | $L_{10}$ life under clean lubrication (×10$^7$) |
|---|---|---|---|---|
| Example | | | | |
| 1 | 205 | 400 | 10 | 10.0 |
| 2 | 208 | 410 | 10 | 10.0 |
| 3 | 213 | 420 | 0 | 10.0 |
| 4 | 221 | 430 | 0 | 10.0 |
| 5 | 228 | 470 | 0 | 10.0 |
| 6 | 249 | 460 | 0 | 10.0 |
| 7 | 176 | 420 | 0 | 10.0 |
| 8 | 218 | 480 | 0 | 10.0 |
| 9 | 235 | 460 | 0 | 10.0 |
| 10 | 153 | 390 | 0 | 10.0 |
| 11 | 168 | 370 | 0 | 10.0 |
| 12 | 178 | 360 | 10 | 10.0 |
| 13 | 182 | 400 | 10 | 10.0 |
| 14 | 231 | 410 | 0 | 10.0 |
| 15 | 242 | 380 | 10 | 8.5 |
| 16 | 173 | 440 | 10 | 10.0 |
| 17 | 209 | 480 | 0 | 10.0 |
| 18 | 224 | 510 | 0 | 10.0 |
| 19 | 186 | 490 | 0 | 10.0 |
| 20 | 217 | 530 | 0 | 10.0 |
| 21 | 231 | 430 | 10 | 9.3 |
| Comparative Example | | | | |
| 1 | 233 | 340 | 60 | 8.5 |
| 2 | 198 | 240 | 0 | 0.9 |
| 3 | 65 | 340 | 0 | 10.0 |
| 4 | 246 | 220 | 30 | 10.0 |
| 5 | 55 | 340 | 0 | 10.0 |
| 6 | 243 | 200 | 0 | 8.8 |

As is apparent from Table 8, FIG. 6 and FIG. 7, in examples 1 to 21, since the S addition, the area ratio of the pro-eutectoid ferrite structure, and the lathe turning property coefficient (S content (weight %)×1000+area ratio (%) of pro-eutectoid ferrite structure) were within the range of the present invention, it becomes possible to obtain an excellent material for a flanged bearing unit which is superior in all of; the lathe turning property (tool life), the fatigue limit strength, the incidence rate of cold cracking, and the rolling life after quenching and hardening. Particularly, it was found that in the examples 5, 6, 8, 9, and 17 to 19 where the flange fatigue limit coefficient=(S content (weight %)×1000)/area ratio (%) of pro-eutectoid ferrite structure, was between 1 and 2, the fatigue limit strength was superior.

On the other hand, in comparative example 1 where the S addition was too high in the material components, many cracks were generated having MnS as the starting point during the cold compressingg. In comparative example 2 where the S addition was too low in the material components, since the hardness by induction hardening was decreased, the rolling life was considerably decreased. In comparative example 3 where the C addition was too high in the material components, since the area ratio of the pro-eutectoid ferrite structure was too low, and in comparative example 5 where the lathe turning property coefficient (S content (weight %)×1000+area ratio (%) of pro-eutectoid ferrite structure) was too low, the lathe turning property considerably decreased. Conversely, in comparative example 4 where the lathe turning property coefficient (S content (weight %)×1000+area ratio (%) of pro-eutectoid ferrite structure) was too high due to the high area ratio of the pro-eutectoid ferrite structure, and in comparative example 6 where the area ratio of the pro-eutectoid ferrite structure itself was too high, the fine dispersion of the pro-eutectoid ferrite structure was insufficient so that the fatigue limit strength was decreased.

Second Example

In order to verify the effect of the present invention, the following experiment was performed.

Firstly, bar-shaped materials having the A to D components in Table 9 were used. The respective bar-shaped materials were cut then high frequency induction heating was respectively applied to give temperatures between 950 and 1200° C. They were then finished into predetermined shapes by hot forging. After that, forced air cooling or radiational cooling was performed and the oxide film was removed by shot blasting. Lathe turning, induction hardening and polishing of the raceway surface were then performed so as to produce the hub ring 2 shown in FIG. 9.

The hub rings 2 of examples 22 to 30 and comparative examples 7 to 11 in Table 10 were prepared. Moreover, the hub rings 2 of examples 22 to 30 used those for which the abovementioned distribution control of the pro-eutectoid ferrite had been performed.

TABLE 9

| Component | C (weight %) | Si (weight %) | Mn (weight %) | Cr (weight %) | V (weight %) | O ppm |
|---|---|---|---|---|---|---|
| A | 0.53 | 0.21 | 0.75 | 0.17 | □ | 8 |
| B | 0.56 | 0.24 | 0.78 | 0.16 | 0.11 | 9 |
| C | 0.58 | 0.25 | 0.81 | 0.19 | □ | 7 |
| D | 0.72 | 0.21 | 0.84 | 0.15 | □ | 9 |

Next, the outside root portion 14 of the wheel attaching flange 6 of the respective hub rings 2 was polished and then the surface was etched by picral to observe the microstructure.

Figure 8:
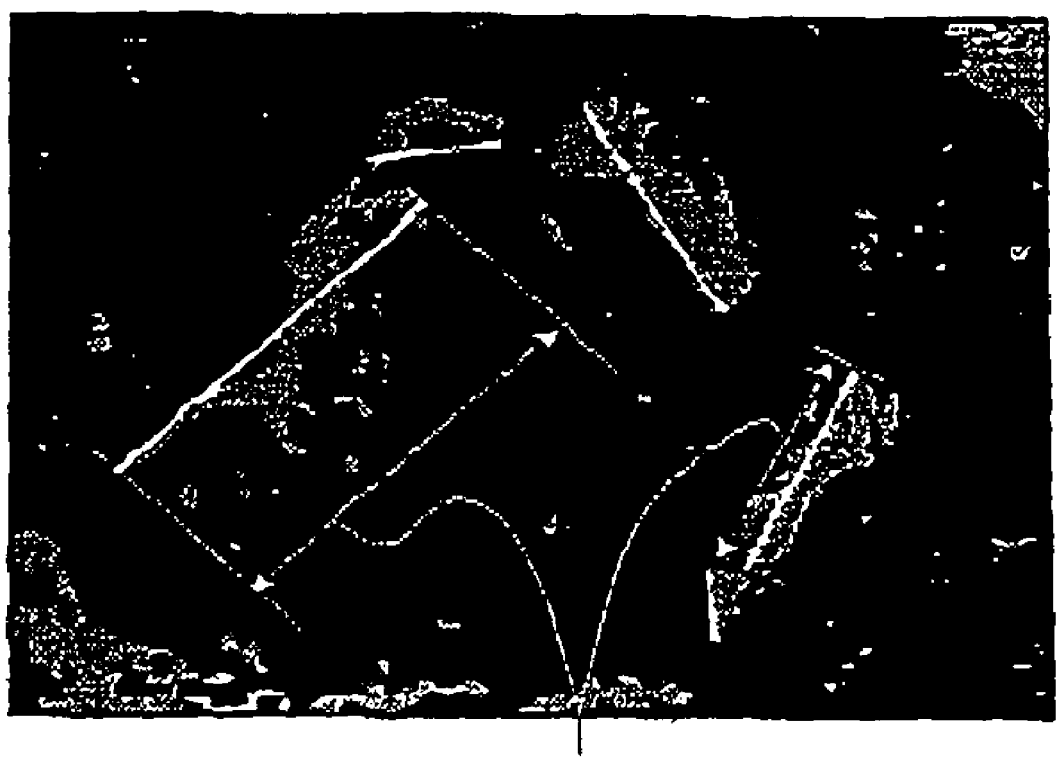
FIG. 8 is a microphotograph wherein the microstructure within the visual field was binarized to extract only the pro-eutectoid ferrite grain.

In the observation, firstly the microstructure within the visual field was binarized under a microscopic magnification of 200 to 500 to extract only the pro-eutectoid ferrite grain. The distribution of the absolute maximum length of continuous ferrite grains as shown in FIG. 8 (which is given by the maximum value of the distance between an arbitrary two points on the contour, and regarded as the ferrite length), and the ferrite area ratio were obtained by image analysis.

Figure 9:
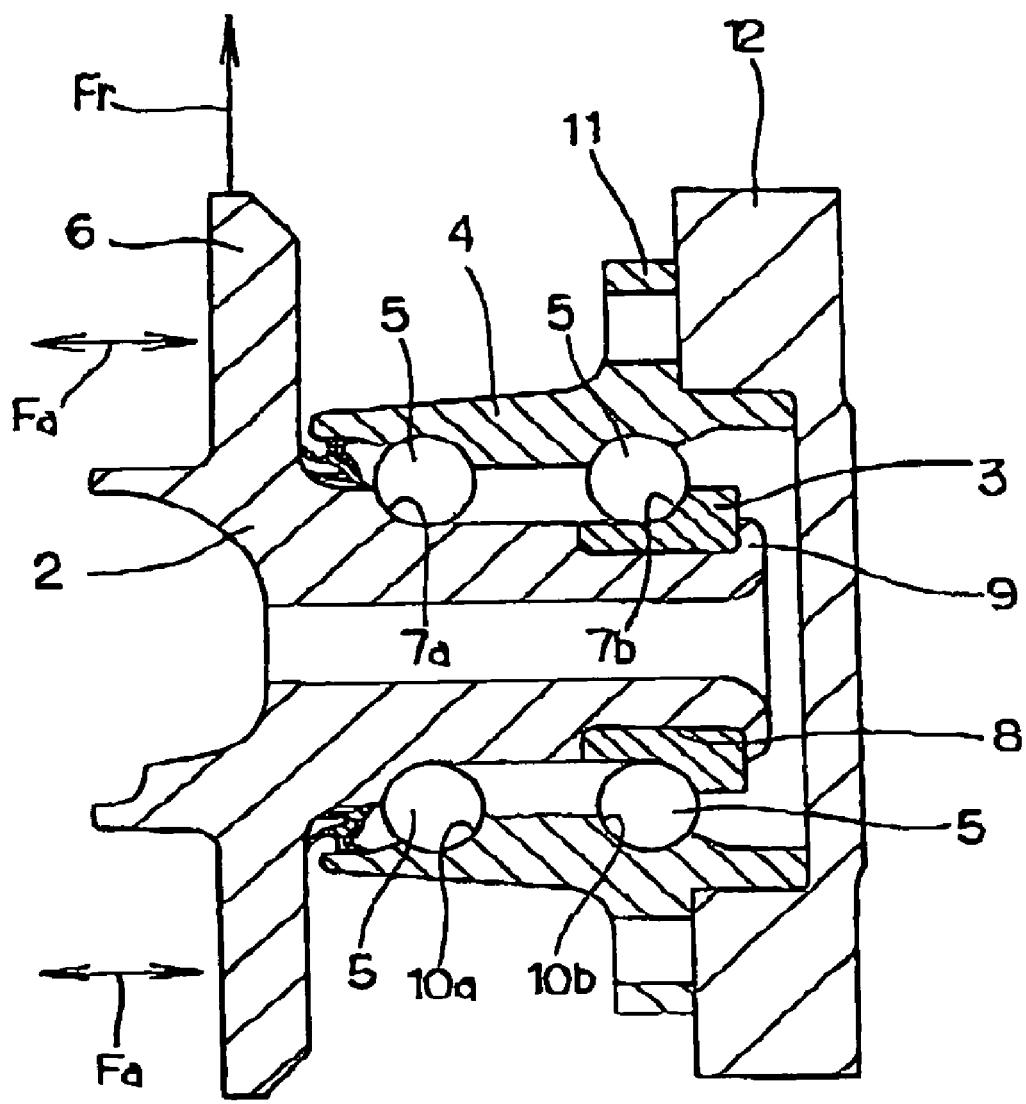
FIG. 9 is a cross-sectional view showing a wheel-support rolling bearing unit as a testing machine used in the example.

Next, using the respective hub rings 2, a test flanged bearing unit (drive wheel-support) shown in FIG. 9 was made. This bearing unit has the same basic structure as that described in FIG. 1, and hence the same reference symbols as those in FIG. 1 are used and description is omitted. Moreover, the axial pitch of the rolling elements 5 in the double rows was 59 mm and the number of balls was twelve. S53C was used for the material of the outer ring 4. SUJ2 was used for the material of the inner ring 3 and the rolling elements 5. In FIG. 9, reference symbol 12 denotes a receiver which is fitted onto the end portion on the suspension device attaching flange 11 side of the outer ring 4, so as to receive the axial load.

Then, using the flanged bearing unit of FIG. 9 which was assembled with the respective hub rings 2 in examples 22 to 30 and comparative examples 7 to 11, endurance load tests of the outside root portion 14 of the wheel attaching flange 6 were respectively performed.

A 50 hour rotation test was performed on the flanged bearing unit in the condition with axial load Fa=5000N, radial load Fr=6000 to 9600N, and rotational speed of 100 min$^{-1}$. After the test, the radial load Fr when a crack occurred in the outside root portion 14 of the wheel attaching flange 6 of the hub ring 2, was determined as the endurance load. The test results were represented as a proportion with respect to comparative example 7.

Next, the workability of the wheel attaching flange 6 of the hub ring 2 was evaluated by a drill test.

The test conditions were as follows.

Test part: wheel attaching flange 6
Drilling tool: ϕ8 mm,SKH51
Drilling method: dry
Drill depth: 10 mm
Cutting speed: 21 m/min (840 min$^{-1}$)
Thrust: 686N (70 kgf)

In the test result, "O" denotes products with a tool life equivalent to or more than for comparative example 7 where the tool life is at the level of a conventional product, and "X" denotes products with a tool life less than this.

The above respective test results are summarized and shown in Table 10.

As is apparent from the description of Table 10, in examples 22 to 30 where the carbon content of the carbon steel being the material of the hub ring 2 was between 0.45 weight % and 0.65 weight %, the area ratio of the pro-eutectoid ferrite per unit area (10 mm$^2$) of the outside root portion 14 of the wheel attaching flange was between 3 to 15%, the maximum length of the pro-eutectoid ferrite was 200 μm or less, and the number of pro-eutectoid ferrites having a length of 180 μm or more was 5 or less, excellent results were obtained for the endurance load of the outside root portion 14 of the wheel attaching flange 6 and the workability of the wheel attaching flange 6 compared to comparative examples 7 to 11. Moreover, in examples 22 and 24 where V was added to the material of the hub ring 2, it is seen that the endurance load performance of the outside root portion 14 of the wheel attaching flange 6 is increased compared to the other examples 23 and 25 to 30.

On the other hand, in comparative example 10 where the maximum length of the pro-eutectoid ferrite exceeded 200 μm, in comparative example 7 where the number of ferrite grains having a length of 180 μm or more was five or more, in comparative example 8 where the ferrite area ratio exceeded the upper limit of the present invention, and in comparative example 11 where the C content in the carbon steel being the material of hub ring 2 was high and the maximum length of the pro-eutectoid ferrite was within the range of the present invention, but the forging radiational cooling made the workability poor so that annealing had to be performed, the endurance load of the outside root portion 14 of the wheel attaching flange 6 was greatly decreased. Furthermore, in comparative example 9, the endurance load of the outside root portion 14 of the wheel attaching flange 6 was increased. However there was a problem of a decrease in the workability of the wheel attaching flange 6.

TABLE 10-1

| Pro-eutectoid | Component | Component maximum length(μm) | Pro-eutectoid ferrite ferrite having a length of 180 μm or more | Number of pro-eutectoid ferrite area rate (%) |
|---|---|---|---|---|
| Example | | | | |
| 22 | B | 30 | 0 | 6.7 |
| 23 | A | 40 | 0 | 3.0 |
| 24 | B | 20 | 0 | 9.5 |
| 25 | A | 45 | 0 | 7.6 |
| 26 | C | 200 | 5 | 3.2 |
| 27 | A | 60 | 0 | 15.0 |
| 28 | C | 95 | 0 | 6.0 |
| 29 | A | 175 | 0 | 5.0 |
| 30 | A | 145 | 0 | 6.4 |
| Comparative Example | | | | |
| 7 | A | 190 | 6 | 5.4 |
| 8 | A | 50 | 0 | 16.0 |
| 9 | C | 90 | 3 | 2.5 |
| 10 | A | 220 | 3 | 5.0 |
| 11 | D | 71 | 0 | 0.6 |

TABLE 10-2

| | Endurance load ratio | Drilling property |
|---|---|---|
| Example | | |
| 22 | 2.8 | o |
| 23 | 2.5 | o |
| 24 | 2.8 | o |
| 25 | 2.5 | o |
| 26 | 1.3 | o |
| 27 | 2.2 | o |
| 28 | 2.2 | o |
| 29 | 1.4 | o |
| 30 | 1.9 | o |
| Comparative Example | | |
| 7 | 1.0 | o |
| 8 | 1.0 | o |
| 9 | 1.2 | x |
| 10 | 0.9 | o |
| 11 | 0.7 | o(with annealing for softening) |

Second Embodiment

Moreover, with reference to FIG. 1, the metal structure after hot forging of the outer member (outer ring 4) or the inner member (hub ring 2) having the flange made from a medium carbon steel containing 0.45 to 0.65 weight % of C, becomes a ferrite-pearlite structure where the pro-eutectoid ferrite is precipitated in a net shape along the prior austenite grain boundary. Since the ferrite structure is less strong compared to the pearlite structure, the metal structure having the pro-eutectoid ferrite coarsely precipitated may possibly have a lower fatigue strength. The present inventors have obtained the findings showing that it is effective to finely and dispersingly precipitate the pro-eutectoid ferrite which is precipitated in net form, in order to increase the fatigue strength of the portion being the ferrite-pearlite structure of the inner member (hub ring 2) or the outer member (outer ring 4).

If the prior austenite grain is refined, there is an effect of suppressing the stress concentration on the grain boundary, or an effect of increasing the nucleation sites at the time of austenite/ferrite transformation, so as to finely precipitate the pro-eutectoid ferrite grain. If the pro-eutectoid ferrite is finely fragmented, the minimum unit of crack generation becomes smaller, and hence fatigue failure can be effectively suppressed. In order to perform fine dispersing precipitation of the pro-eutectoid ferrite which is precipitated in net form, the hot forging condition has a significant influence.

If the material is heated for hot forging, the metal structure becomes the austenite structure. In this case, regarding the austenite grain, as the heating temperature for hot forging is increased, the atomic diffusion becomes active thus facilitating grain growth. Moreover, as the plastic working amount at the time of hot forging is increased, the nucleation energy and the number of nucleation sites at the time of recrystallization are increased so that the austenite grain is decreased.

According to the present invention, in the outer member or the inner member having the flange, the plastic deformation in the flange at the time of hot forging is large. Therefore the growth of austenite grains can be effectively suppressed to increase the fatigue strength, by decreasing the heating temperature at the time of hot forging to lower than the conventional temperature. If the heating temperature at the time of forging becomes 1050° C. or more, the austenite grain becomes coarse causing a small effect of increasing the fatigue strength. Moreover, if it becomes less than 900° C., the deformation resistance becomes large, decreasing the life of the press forming machine and the mold. Therefore, the heating temperature for hot forging in the present invention is between 900 and 1050° C.

However, if the hot forging temperature is decreased to lower than the conventional temperature, forging cracks are easily generated. This is because, when the temperature is decreased, the metal structure is partly transformed from the austenite state into a ferrite-pearlite structure, and when forged under such a state, the metal structure is unevenly plastic deformed so that forging cracks are generated. In the present invention, in order to prevent forging cracks, the temperature at the time of finishing the forge stamping is stipulated so as to make the metal structure into an even austenite state when finishing the forge stamping. If the temperature at the time of finishing the forge stamping becomes less than 800° C., the plastic deformation of the metal structure becomes uneven so that forging cracks are easily generated. Therefore, the temperature at the time of finishing the forge stamping of the present invention is 800° C. or more.

Hereunder is a description of the reason for stipulating the steel alloy components used in the present invention.

[C: between 0.45 and 0.65 weight %]

If the C in the steel being the material of the hub ring 2 is 0.45 weight % or less, the induction hardening hardness of the rolling portion is low, so that a strength above HRC 58 which is required for giving the rolling fatigue life is not possible. Furthermore, the hardness of the root portion of the wheel attaching flange 6 can not be sufficiently obtained, and particularly the fatigue strength of the outside root portion 14 with respect to the rotating bending stress is decreased. On the other hand, if the C exceeds 0.65 weight %, not only is the lathe turning property decreased due to the decrease in the area ratio of the pro-eutectoid ferrite structure and the increase in the hardness, but also the rolling fatigue life and the fatigue strength can not be greatly improved. Therefore, the C in the steel being the material of the hub ring 2 is made between 0.45 weight % and 0.65 weight %.

[Mn: between 0.3 and 1.5 weight %]

Mn is an element to increase the quenching property of steel. If it is less than 0.3 weight %, the hardened layer at the time of induction hardening becomes thin so that the rolling fatigue of the raceway portion is decreased. However, if it exceeds 1.5 weight %, workability is decreased. Therefore, the Mn amount of the present invention is between 0.3 weight % and 1.5 weight %. It is preferably between 0.5 and 1.0 weight %, considering the productivity at the time of quenching, the cutting property, and the drilling property.

[Si: between 0.1 and 1.0 weight %]

Si is an element to increase the quenching property, strengthen the martensite, and increase the rolling fatigue life. Moreover, it is dissolved in the solid-solution of ferrite of the non-thermal refined portion to increase the strength of the ferrite structure so that the fatigue strength of the non-thermal refined portion is increased. If it is less than 0.1 weight %, the aforementioned effect is insufficient. However, if it exceeds 1.0 weight %, the hot forging property is decreased. Furthermore, since decarbonization becomes large after forging, the fatigue strength is decreased in the surface portion on which cutting is not performed after hot forging, but which is used in the as forged condition. Therefore, the Si amount of the present invention is between 0.1 weight % and 1.0 weight %.

[Cr: between 0.01 and 0.5 weight %]

Cr has an effect of increasing the quenching property. Furthermore it strengthens the martensite structure after quenching and improves the rolling fatigue life. If it is less than 0.01 weight %, the hardened layer at the time of induction hardening becomes thin and the strength of the martensite structure is decreased so that the rolling fatigue life is decreased. However, if it exceeds 0.5 weight %, the hot forging property and the cutting property are decreased. Therefore, the Cr amount of the present invention is between 0.01 weight % and 0.5 weight %.

[S≦0.025 weight %]

S may form non-metallic inclusion such as MnS in steel, which may become the starting point for forging cracks. Moreover, in flanged bearing units of a type where the inner ring 3 is fixed to the hub ring 2 by swaging (refer to reference symbol 9 in FIG. 1), MnS in the non-thermal refined portion may become the starting point for cracks in the crimped portion 9.

From the two reasons above, the S amount is preferably as small as possible. If the S amount exceeds 0.025 weight %, forging cracks or cracks in the crimped portion 9 may be increased. Therefore the S amount of the present invention is 0.025 weight % or less. The S amount is preferably 0.015 weight % or less considering the stable prevention of forging cracks and the prevention of cracks in the crimped portion 9.

[O≦15 ppm]

O is an element which greatly affects the rolling fatigue of induction hardened raceway porion. O forms non-metallic inclusions such as $Al_2O_3$ in steel, and becomes the starting point for flaking due to rolling fatigue, decreasing the rolling fatigue life. Therefore, the O amount is preferably as small as possible in order to increase the rolling fatigue life. If the O amount exceeds 15 ppm, the rolling fatigue life may be decreased. Therefore the O amount of the present invention is 15 ppm or less.

Furthermore, in order to increase the fatigue strength of the non-thermal refined portion and the rolling fatigue of the induction hardened raceway portion, it is effective to stipulate the cooling rate after hot forging to be within a predetermined range.

The metal structure is in the austenite state when the hot forge stamping is finished. However, if it is cooled, transformation occurs to generate pro-eutectoid ferrite and pearlite structures. This transformation is almost completed at about 600° C. and the structure after cooling becomes a ferrite-pearlite structure. At this time, if the cooling rate is low, the growth of pro-eutectoid ferrite is promoted to generate coarse pro-eutectoid ferrite lumps. In this case, the strength of the ferrite is low compared to that of pearlite so that the coarse pro-eutectoid ferrite lumps easily become the starting point or extension of fatigue cracks, decreasing the fatigue strength of the non-thermal refined portion. Moreover, if coarse pro-eutectoid ferrite lumps exist when induction hardening is applied to the vicinity of the raceway portion, the quenching property may be decreased or the hardness may become uneven.

Therefore the average cooling rate is stipulated by the following equation.

Average cooling rate(° C./sec)=(temperature at the time of finishing forge stamping(° C.)−600(° C.))/(cooling time from time of finishing forge stamping until reaching 600° C.(sec))

If the average cooling rate from the temperature at the time of finishing the forge stamping until reaching 600° C. is less than 0.5° C./sec, the fatigue strength may be decreased, the induction hardening property may be decreased, or the hardness after induction hardening may become uneven in some cases.

On the other hand, if the cooling rate is too high, the pro-eutectoid ferrite amount becomes small so that the hardness becomes high and the cutting property is decreased. Moreover, if an incomplete quenched structure is partially generated, the workability is considerably decreased. If the aforementioned average cooling rate exceeds 5° C./sec, the workability is decreased. Therefore, the average cooling rate of the present invention is preferably between 0.5° C./sec and 5° C./sec. The average cooling rate is further preferably between 1° C./sec and 3° C./sec considering a stable increase in the fatigue strength, and the productivity at the time of cutting.

Moreover, if carbide or nitride is finely dispersed in the steel, then due to the pinning effect thereof, the growth of grains can be effectively suppressed, thus obtaining a similar effect to the decrease in the forging temperature. The alloy element added is preferably V, Ti, or Nb as described later.

V, Nb, or Ti used in the present invention have an effect of generating fine carbide or nitride in the steel, and suppressing coarsening of the austenite grains which occurs when the steel material is heated at the time of hot forging. Moreover, fine carbide or carbonitride of V, Nb, or Ti have an effect of being the precipitation site for the pro-eutectoid ferrite at the time of cooling after hot forging, thus promoting finely dispersed precipitation of ferrite. Therefore, by adding V, Nb, or Ti, a metal structure having ferrite finely dispersed can be obtained, thus improving the fatigue strength of the non-thermal refined portion on the periphery of the flange.

Moreover, rolling fatigue life is required for the raceway portion having a hardened layer formed by induction hardening. The induction hardened metal structure mainly becomes a martensite structure. However since V, Nb, or Ti is added to the steel used in the present invention, fine carbide or carbonitride is also dispersed in the martensite. If this carbide or carbonitride is finely dispersed, the wear resistance and the hardness are increased so that the rolling fatigue life is improved.

Hereunder is a description of the reason for limiting the alloy components.

V forms carbide or nitride in steel and suppresses growth of the austenite grains at the time of hot forging, so that the prior austenite grains become small. Moreover, since V carbide or nitride itself also becomes the precipitation site of pro-eutectoid ferrite, pro-eutectoid ferrite is precipitated from the finely dispersed carbide and nitride, thus promoting finely dispersed precipitation of ferrite. Particularly, regarding V carbide or nitride in the prior austenite grain boundary, pro-eutectoid ferrite is precipitated from the respective carbide particles or nitride particles so that there is a large effect of fragmenting the ferrite precipitated in a net shape in the prior austenite grain boundary, thus preventing extension of fatigue cracks in the ferrite structure, and increasing the fatigue strength of non-thermal refined portions having the ferrite-pearlite structure.

Moreover, since V carbide or carbonitride has extremely high hardness, if it is finely dispersed in the martensite structure of the induction hardened raceway portion, there is the effect of increasing the wear resistance and improving the rolling fatigue life. If the V is less than 0.01 weight %, the above effect will not be demonstrated. If the V exceeds 0.2 weight %, the hot forging property, the cutting property, and the grindability are decreased. Therefore, the V amount in the present invention is preferably between 0.01 weight % and 0.2 weight %. It is further preferably between 0.02 weight % and 0.10 weight % considering a stable increase in fatigue strength, and productivity.

Similarly to V, Nb also has the effect of forming carbide or nitride in steel and suppressing the growth of prior austenite grains, and the effect of becoming the precipitation site of pro-eutectoid ferrite. Therefore, there is the effect of finely dispersing the pro-eutectoid ferrite of the non-thermal refined portion having the ferrite-pearlite structure, to thereby improve fatigue strength. Particularly, Nb has a great effect of suppressing the growth of prior austenite grains. If Nb is less than 0.01 weight %, the above effect will not be demonstrated. If Nb exceeds 0.15 weight %, the hot forging property, the cutting property, and the grindability are decreased. Therefore, the Nb amount of the present invention is preferably between 0.01 weight % and 0.15 weight %.

Similarly to V, Ti also has the effect of forming carbide or nitride in steel and suppressing the growth of prior austenite grains, and the effect of becoming the precipitation site of pro-eutectoid ferrite. Therefore there is the effect of finely dispersing the pro-eutectoid ferrite of the non-thermal refined portion having the ferrite-pearlite structure, to thereby improve fatigue strength. Particularly, Ti has a great effect of suppressing the growth of prior austenite grains. If Ti is less than 0.01 weight %, the above effect will not be demonstrated. If Ti exceeds 0.15 weight %, the hot forging property, the cutting property, and the grindability are decreased. Therefore, the Ti amount of the present invention is preferably between 0.01 weight % and 0.15 weight %.

As described above, keeping the size of the prior austenite grain small contributes to the effect of increasing the fatigue strength of the non-thermal refined portion. If the grain size is less than 4, the effect of improving fatigue strength is small.

Therefore, in the present invention, the prior austenite grain size for the flange root portion where the stress concentration of the flanged bearing unit is high, is preferably 4 or more.

The rolling elements used for the flanged bearing unit of the present invention are preferably made from a high-carbon chrome bearing steel such as SUJ2 or the aforementioned high-carbon chrome bearing steel which is carbonitrided. Moreover, regarding the shape of the rolling elements used in the present invention, a ball or roller can be used according to the usage.

Furthermore, in a flanged bearing unit of a type where the inner ring 3 is fixed to the hub ring 2 by swaging (refer to reference symbol 9 in FIG. 1), a high-carbon chrome bearing steel such as SUJ2 is preferably used for the inner ring 3.

Example B

The abovementioned flanged bearing unit as shown in FIG. 9 was made.

The hub ring 2 was made from a steel having the alloy components shown in A to H in Table 11, to which hot forging was applied under the respective conditions shown in Table 12 and Table 13, and forced air cooling or radiational cooling was performed. Then, it was worked into a predetermined shape by cutting. Induction hardening was performed from the periphery of the inner raceway surface 7a to the periphery of the small diameter step portion 8 to form a hardened layer on the surface. Then, grinding was performed to make the finished shape. In Table 12, the surface hardness of the raceway portion to which induction hardening was applied, and the hardness of the non-thermal refined portion to which induction hardening was not applied are shown together. The grain size was measured according to JIS G 0551.

TABLE 11

| Steel Type | C | Mn | Si | Cr | S | O(ppm) | V | Nb | Ti |
|---|---|---|---|---|---|---|---|---|---|
| A | 0.53 | 0.8 | 0.3 | 0.2 | 0.015 | 12 | | | |
| B | 0.58 | 0.7 | 0.6 | 0.2 | 0.025 | 10 | | | |
| C | 0.65 | 0.5 | 0.1 | 0.1 | 0.013 | 11 | | | |
| D | 0.45 | 1.0 | 0.3 | 0.5 | 0.008 | 15 | 0.1 | | |
| E | 0.53 | 0.8 | 0.7 | 0.2 | 0.017 | 12 | 0.02 | | |
| F | 0.53 | 0.8 | 1.0 | 0.2 | 0.015 | 12 | | 0.08 | |
| G | 0.53 | 0.8 | 0.3 | 0.2 | 0.017 | 14 | | | .04 |
| H | 0.53 | 0.8 | 0.3 | 0.2 | 0.036 | 12 | | | |

TABLE 12-1

| | Steel type | Heat retention temp. ° C. | Finishing forge stamping temp. | Cooling rate ° C./sec | Grain size number |
|---|---|---|---|---|---|
| Example | | | | | |
| 1-1 | A | 1050 | 920 | 0.95 | 4 |
| 1-2 | A | 1000 | 890 | 1.0 | 5 |
| 1-3 | A | 950 | 840 | 0.75 | 6 |
| 1-4 | A | 900 | 800 | 0.64 | 7 |
| 1-5 | A | 1000 | 910 | 0.50 | 5 |
| 1-6 | A | 1000 | 900 | 1.4 | 5 |
| 1-7 | A | 1000 | 910 | 3.0 | 5 |
| 1-8 | A | 1000 | 880 | 5.0 | 5 |
| Comparative Example | | | | | |
| 1-9 | A | 1100 | 990 | 1.1 | 3 |
| 1-10 | A | 1200 | 1080 | 1.2 | 3 |
| 1-11 | A | 850 | 770 | 0.58 | □ |
| 1-12 | A | 1000 | 910 | 0.28 | 5 |
| 1-13 | A | 1000 | 920 | 6.8 | 5 |

TABLE 12-2

| | Non-thermal refined portion hardness Hv | Raceway portion surface hardness Hv | Endurance load |
|---|---|---|---|
| Example | | | |
| 1-1 | 248 | 741 | 1.3 |
| 1-2 | 243 | 723 | 1.4 |
| 1-3 | 238 | 730 | 1.5 |
| 1-4 | 234 | 739 | 1.4 |
| 1-5 | 230 | 718 | 1.3 |
| 1-6 | 251 | 728 | 1.4 |
| 1-7 | 259 | 735 | 1.5 |
| 1-8 | 265 | 732 | 1.5 |
| Comparative Example | | | |
| 1-9 | 251 | 732 | 1.0 |
| 1-10 | 255 | 742 | 0.9 |
| 1-11 | 248 | 712 | □ |
| 1-12 | 227 | 723 | 1.0 |
| 1-13 | 311 | □ | □ |

Moreover, conventional material S53C was used for the outer ring 4 and hot forging was performed at 1100 to 1150° C. Then, cutting was performed and induction hardening was performed on the periphery of the outer raceway surface 10a and the periphery of the outer raceway surface 10b. After that grinding was performed to make the finished shape. Moreover, the inner ring 3 and the rolling elements 5 were made from SUJ2 and wholly hardened from the surface to the core by a standard quenching treatment.

Furthermore, the bearing type of the manufactured flanged bearing unit was the double row ball bearing wherein the pitch diameter of the rolling elements was 49 mm and the number of balls in the respective rows was twelve. Using this bearing unit, the flange 11 on the outer ring 4 side was attached to the fixed side and the flange 6 on the hub ring 2 side was attached to the rotation side. Then a rotation test was performed under the following conditions. Hence, in the case where the rotation test was performed under these conditions, a bending stress was repeatedly loaded to the root portion of the flange 6 of the hub ring 2.

Radial load Fr: 5000 to 15000N

Axial load Fa: 5000N

Rotational speed: 400 min$^1$

A 45 hour rotation test was performed under a predetermined radial load within the above range, and the existence or nonexistence of an increase in bearing vibration, or the existence or nonexistence of fatigue cracks on the periphery of the flange was confirmed. If there was no increase in bearing vibration or no fatigue cracks on the periphery of the flange, the radial load was gradually increased and a 40 hour rotation test was performed. The radial load at the time when bearing vibration increased or the fatigue cracks were generated on the periphery of the flange was regarded as the endurance load. The rotation test results are shown together in Table 12. The endurance loads shown in Table 12 are represented as a proportion with respect to the rotation test results of comparative example 1-9, assuming that they are 1.0.

In the examples 1-1 to 1-8, since the alloy components and the hot forging conditions were within the range stipulated by the present invention, an excellent metal structure was obtained, which was superior in rotating bending fatigue strength for the non-thermal refined portion, and in rolling fatigue life of the induction hardened raceway, being excellent rotation test results.

On the other hand, in comparative examples 1-9 and 1-10, since the material heating temperature (retention temperature under heating) at the time of hot forging was higher than the range stipulated by the present invention, the fatigue strength of the non-thermal refined portion was inferior and the results showed low endurance load in the rotation test. Moreover, in comparative example 1-11, since the material heating temperature at the time of hot forging was lower than the range stipulated by the present invention, the deformation resistance was large and the load on the press forming machine and the mold was large, and hence the work was discontinued. In comparative example 1-12, since the average cooling rate after forging was lower than the range stipulated by the present invention, coarse pro-eutectoid ferrite was produced. Therefore the results showed low endurance load in the rotation test. In comparative example 1-13, since the average cooling rate after forging was higher than the range stipulated by the present invention, the hardness of the non-thermal refined portion was higher and the cutting property was considerably decreased, and hence the work was discontinued.

Figure 10:
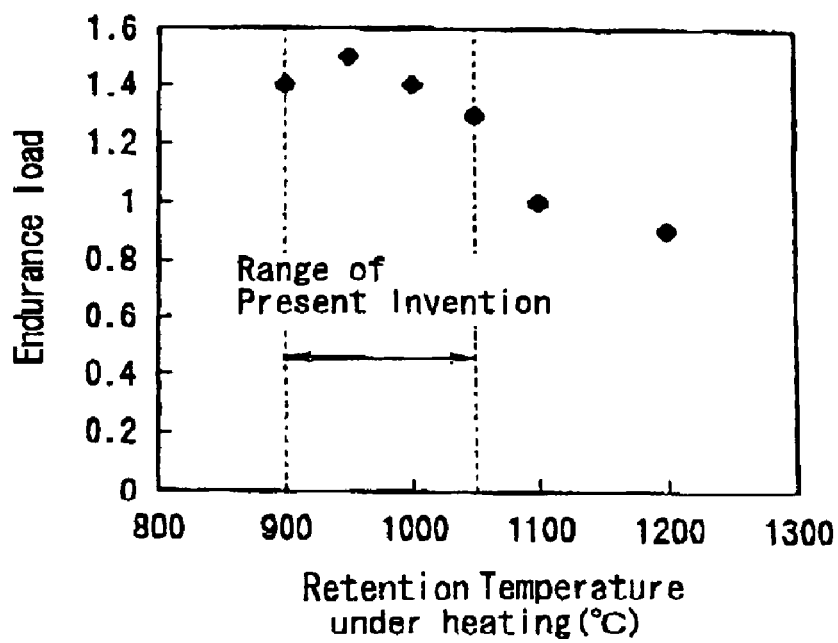
FIG. 10 is a graph showing a relation between material heating temperature (retention temperature under heating) at the time of forging and endurance load in a rotation test.

FIG. 10 shows the relation between the material heating temperature (retention temperature under heating) at the time of forging and the endurance load in the rotation test. In FIG. 10, the comparison is made at comparable average cooling rates.

Figure 11:
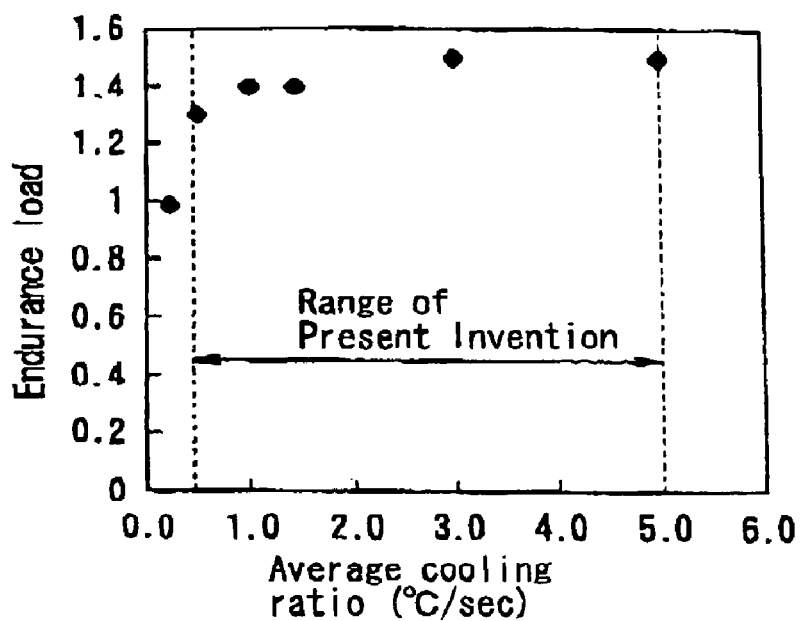
FIG. 11 is a graph showing a relation between average cooling rate from the time of finishing forge stamping until reaching 600° C. and endurance load in a rotation test.

FIG. 11 shows the relation between the average cooling rate from the time of finishing forge stamping until reaching 600° C., and the endurance load in the rotation test. In FIG. 11, the comparison was made at a constant material heating temperature of 1000° C.

From the above, by optimizing the hot forging conditions, it is possible to obtain a flanged bearing unit which is superior in rotating bending fatigue strength of the non-thermal refined portion on the periphery of the flange, and rolling fatigue strength of the induction hardened raceway portion.

Next, a hub ring 2 was made in a similar way but with the type of steel changed, and assembled in the flanged bearing unit, and a rotation test was performed under the following conditions.

Radial load: 5000 to 15000N

Axial load: 7000N

Rotational speed: 400 min$^{-1}$

Table 13 shows the rotation test results together. The endurance loads shown in Table 13 are represented as a proportion with respect to the rotation test results of comparative examples 2-8, assuming that they are 1.0.

In examples 2-1 to 2-7 shown in Table 13, since the alloy components and the hot forging conditions were within the range stipulated by the present invention, an excellent material structure was obtained, which was superior in rotating bending fatigue strength for the non-thermal refined portion, and in rolling fatigue life of the induction hardened raceway portion, being excellent rotation test results. Particularly, in examples 2-4 to 2-7, since V, Nb, or Ti was added, the structure of the non-thermal refined portion was refined and the fatigue strength of the non-thermal refined portion was further increased. Moreover, due to the precipitation of carbide and nitride, the rolling fatigue life of the induction hardened raceway was also excellent.

On the other hand, in comparative example 2-8, although the alloy components were within the range stipulated by the present invention, the material heating temperature at the time of hot forging was higher than the range stipulated by the present invention, so that the fatigue strength of the non-thermal refined portion was inferior and the results showed low endurance load in the rotation test. Moreover, in comparative example 2-9, the S amount contained in the alloy elements was higher than the range stipulated by the present invention so that forging cracks were easily produced, and there were cases of cracks generated after forging. Therefore the work was discontinued.

From the above, by using steel of alloy components stipulated by the present invention and by forging under the hot forging conditions stipulated by the present invention, it is possible to obtain a flanged bearing unit which is superior in rotating bending fatigue strength of the non-thermal refined portion on the periphery of the flange, and in rolling fatigue strength of the induction hardened raceway portion. Moreover, by adding V, Nb, or Ti, the effect of increasing the fatigue strength was further enhanced.

TABLE 13-1

| | Steel type □ | Material heating temp. ° C. | Finishing forge stamping temp. | Cooling rate ° C.□/sec | Grain size number |
|---|---|---|---|---|---|
| Example | | | | | |
| 2-1 | A | 1000 | 890 | 0.86 | 5 |
| 2-2 | B | 1000 | 870 | 0.98 | 5 |
| 2-3 | C | 1000 | 890 | 0.81 | 5 |
| 2-4 | D | 1000 | 880 | 0.82 | 7 |
| 2-5 | E | 1000 | 880 | 0.97 | 6 |
| 2-6 | F | 1000 | 890 | 0.84 | 6 |
| 2-7 | G | 1000 | 890 | 0.97 | 6 |
| Comparative Example | | | | | |
| 2-8 | A | 1200 | 1080 | 1.2 | 3 |
| 2-9 | H | 1000 | 880 | 0.86 | 5 |

TABLE 13-2

| | Non-thermal refined portion hardness Hv | Raceway portion surface hardness Hv | Endurance load |
|---|---|---|---|
| Example | | | |
| 2-1 | 243 | 723 | 1.3 |
| 2-2 | 253 | 713 | 1.3 |
| 2-3 | 265 | 746 | 1.4 |
| 2-4 | 248 | 712 | 1.5 |
| 2-5 | 260 | 734 | 1.6 |
| 2-6 | 254 | 723 | 1.5 |
| 2-7 | 245 | 732 | 1.5 |
| Comparative Example | | | |
| 2-8 | 255 | 742 | 1.0 |
| 2-9 | □ | □ | □ |

Third Embodiment

An outer member or inner member having the flange was formed by hot forging, and then formed into a predetermined shape by cutting and drilling. Then, induction hardening was performed on the predetermined portion to form the hardened layer, and finishing was performed on the raceway portion and the like by grinding.

The metal structure after hot forging of the outer member or the inner member having the flange and made from a medium carbon steel, becomes a ferrite-pearlite structure where the pro-eutectoid ferrite is precipitated in the net shape along the prior austenite grain boundary. In order to increase the cutting property and the drilling property in this metal structure, it is effective to increase the area ratio of the pro-eutectoid ferrite and to precipitate the pro-eutectoid ferrite finely and dispersingly.

In the present invention, the area ratio of the pro-eutectoid ferrite is increased by decreasing the C amount in the steel to less than in conventional steel. Moreover, if V is added, since the austenite grain becomes fine due to the pinning effect of V carbide or nitride, the precipitation unit of the pro-eutectoid ferrite precipitated along the prior austenite grain becomes fine. Furthermore, V carbide or nitride itself becomes a precipitation nucleus for the pro-eutectoid ferrite so that there is the effect of fragmenting the pro-eutectoid ferrite precipitated along the prior austenite grain boundary, and more finely dispersing the pro-eutectoid ferrite.

By the above effect, excellent cutting properties and the drilling properties can be obtained due to the increase in the area ratio of the pro-eutectoid ferrite and the fine dispersion of the pro-eutectoid ferrite. The area ratio of the pro-eutectoid ferrite is preferably between 5% and 15%. The area ratio of the pro-eutectoid ferrite can be controlled by the C amount, the forging temperature at the time of hot forging, and the cooling rate after hot forging.

Moreover, regarding the non-thermal refined portion which is not induction hardened, the metal structure after hot forging is used as is. However, the abovementioned effect of finely dispersing the ferrite due to V addition, also contributes to an increase in the fatigue strength of the non-thermal refined portion. The reason is described hereunder.

If the prior austenite grain is refined, there is the effect of suppressing the stress concentration in the grain boundary. Moreover, since the strength of ferrite is low compared to that of pearlite, it is highly possible that the ferrite becomes the starting point or the extension of fatigue cracks. Therefore, by finely fragmenting the pro-eutectoid ferrite, the minimum unit of fatigue cracks becomes smaller. From the above, fatigue failure can be effectively suppressed.

Moreover, another effect is that V contributes to strengthen the ferrite precipitation hardening. Furthermore, Si added in the present invention contributes to strengthen the solid-solution of ferrite. Therefore, the pro-eutectoid ferrite phase which is the portion having the low strength in the ferrite-pearlite structure is strengthened so that the strength of the weakest portion is increased and the fatigue strength is increased.

From the above effects, the fatigue strength of the non-thermal refined portion is increased by refining the prior austenite grains, finely dispersing the pro-eutectoid ferrite, and strengthening the ferrite.

The metal structure of the raceway portion having the hardened layer formed by induction hardening, mainly becomes a martensite structure, and rolling fatigue life is required. Generally, if the C amount is decreased, the carbide is decreased and the strength of the martensite of the substrate surface is decreased so that the rolling fatigue life is decreased. However, since V is added in the steel used in the present invention, fine V carbide or nitride is dispersed in the martensite. This V carbide or nitride has extremely high hardness. If it is finely dispersed, the wear resistance and the hardness are increased so that the rolling fatigue life is increased.

Moreover, Si is dissolved in the solid-solution of martensite to strengthen the substrate surface of the martensite so that there is the effect of increasing the rolling fatigue life. Furthermore, since the tempering resistance is considerably increased, then even if tempering is performed after quenching the steel in which the C amount is decreased, the decrease in the hardness is small so that excellent hardness can be maintained and excellent rolling fatigue life can be kept.

From the above effects, even if the C amount is decreased, excellent rolling fatigue life can be kept by adding the predetermined amount of V and Si.

Hereunder is a description of the reason for limiting the alloy components and the hardness of the steel used in the present invention.

C is an element which greatly affects the hardness after hot forging, and the hardness after quenching and tempering. If it is less than 0.45 weight %, the hardness at the time of quenching is insufficient so that the rolling fatigue of the raceway portion is decreased. Furthermore, the hardness after hot forging is insufficient so that the bending fatigue strength of the non-thermal refined portion is also decreased. However, if C exceeds 0.5 weight %, the hardness after hot forging is increased and the cutting properties and the drilling properties are decreased, so that working time is required to increase the work accuracy. Therefore, in the case where Si is between 0.3 and 1.5 weight %, and V is between 0.03 and 0.3 weight %, the C amount of the present invention is between 0.45 weight % and 0.50 weight %.

As described above, Si is an element to increase the rolling fatigue life, since it strengthens the martensite and increases the tempering resistance. Moreover, it is dissolved in the solid-solution of ferrite of the non-thermal refined portion to increase the strength of the ferrite structure so that the fatigue strength of the non-thermal refined portion is increased. When C is between 0.45 weight % and 0.50 weight %, if Si is less than 0.3 weight %, this effect is insufficient. However, if Si exceeds 1.5 weight %, the hot forging property is decreased. Therefore, the Si amount of the present invention is between 0.3 weight % and 1.5 weight %. The Si amount is preferably between 0.65 weight % and 1.0 weight % considering the rolling fatigue life, the stable increase in the fatigue strength of the non-thermal refined portion, and the productivity at the time of hot forging.

As described above, V is the important element which increases the fatigue strength of the non-thermal refined portion and the rolling fatigue life of the induction hardened portion. Since V decreases the size of the prior austenite grain and contributes to the fine dispersion of the pro-eutectoid ferrite, the fatigue strength of the non-thermal refined portion is improved. Moreover, since V carbide or carbonitride has an extremely high hardness, if it is finely dispersed in the martensite structure of the induction hardened raceway portion, there is the effect of increasing the wear resistance and increasing the rolling fatigue life. If V is less than 0.03 weight %, the above effect will not be demonstrated. If V exceeds 0.3 weight %, the hot forging property, the cutting property, and the grindability are decreased. Therefore, the V amount of the present invention is between 0.03 weight % and 0.3 weight %. Considering the aforementioned effects and the cost, the V amount is preferably between 0.03 weight % and 0.1 weight %, and more preferably between 0.05 weight % and 0.1 weight %.

Mn is an element to increase the quenching property of steel. However, if it exceeds 1.5 weight %, the cutting property and the drilling property are decreased. Therefore, the Mn amount of the present invention is 1.5 weight % or less. It is preferably between 0.5 and 1.0 weight % considering the productivity at the time of quenching, the cutting property, and the drilling property.

Cr is an element to increase the quenching property of steel, further strengthen the martensite structure after quenching, and increase the rolling fatigue life. However, if it exceeds 1.0 weight %, the hot forging property and the cutting property are decreased. Therefore, the Cr amount of the present invention is 1.0 weight % or less. The Cr amount is preferably between 0.1 weight % and 0.5 weight % considering the productivity at the time of quenching, the increase in the rolling fatigue life, and the workability.

S forms non-metallic inclusion such as MnS in steel. MnS in induction hardened raceway portion becomes the starting point for flaking due to rolling fatigue to decrease the rolling fatigue life. Moreover, in a flanged bearing unit of a type where the inner ring 3 is fixed to the hub ring 2 by swaging (refer to reference symbol 9 in FIG. 1), MnS in the non-thermal refined portion may become the starting point for cracks in the crimped portion 9.

From the two reasons above, the S amount is preferably as small as possible. If the S amount exceeds 0.035 weight %, the rolling fatigue life may be decreased or cracks in the crimped portion 9 may be increased. Therefore the S amount of the present invention is 0.035 weight % or less. The S amount is preferably 0.020 weight % or less considering the stable ensuring of rolling fatigue life and the prevention of cracks in the crimped portion.

O is an element which greatly affects the rolling fatigue of induction hardened raceway portion. O forms non-metallic inclusion such as $Al_2O_3$ in steel, and becomes the starting point for flaking due to rolling fatigue, decreasing the rolling fatigue life. Therefore, the O amount is preferably as small as possible in order to increase the rolling fatigue life. If the O amount exceeds 15 ppm, the rolling fatigue life may be decreased. Therefore the O amount of the present invention is 15 ppm or less.

The value of C+0.2Si+0.5V represents the contribution of Si and V to the rolling fatigue life when C is decreased. The rolling fatigue life is decreased when C is decreased, however the decrease in the rolling fatigue life can be suppressed by adding Si and V. However, if the value of C+0.2Si+0.5V is less than 0.55, the rolling fatigue life is decreased. On the other hand, if it exceeds 0.75, the cutting property and the drilling property are decreased. Therefore, the value of C+0.2Si+0.5V in the present invention is between 0.55 and 0.75. The value of C+0.2Si+0.5V is preferably between 0.60 and 0.70 considering the stable increase in the rolling life and the productivity.

Moreover, since the raceway portion of the inner member or the outer member supports a high surface pressure from the rolling elements, high hardness which can support the high surface pressure is required in order to increase the rolling fatigue life. Therefore, the surface hardness of the raceway portion of the hardened layer formed by induction hardening is preferably between Hv 630 and Hv 750. If the surface hardness of the raceway portion is less than Hv 630, the hardness is insufficient so that the rolling fatigue life is decreased. On the other hand, if the surface hardness of the alloy component stipulated by the present invention exceeds Hv 750, the toughness is decreased so that the shock-proof is decreased. Therefore, the surface hardness of the raceway portion of the hardened layer formed by induction hardening of the present invention is between Hv 630 and Hv 750. It is more preferably Hv 700 or more in order to increase the rolling life.

The non-thermal refined portion on the periphery of the flange requires rotating bending fatigue strength. Regarding the member used for the flanged bearing unit of the present invention, the ferrite in the metal structure is finely and dispersingly precipitated so that the fatigue strength is increased. However, if the hardness is less than Hv 220, the fatigue strength of the non-thermal refined portion is decreased. On the other hand, if the hardness exceeds Hv 300, the cutting property and the drilling property are decreased. Therefore, the hardness of the non-thermal refined portion to which the hardening treatment by induction hardening is not applied, is between Hv 220 and Hv 300. It is further preferably between Hv 240 and Hv 280 considering the stable increase in the fatigue strength of the non-thermal refined portion, and the productivity at the time of cutting and at the time of drilling.

The rolling elements used in the present invention are preferably made from a high-carbon chrome bearing steel such as SUJ2 or the aforementioned high-carbon chrome bearing steel which is carbonitrided. Moreover, regarding the shape of the rolling elements used in the present invention, a ball or roller can be used according to the usage.

Furthermore, in a flanged bearing unit of a type where the inner ring 3 is fixed to the hub ring 2 by swaging (refer to reference symbol 9 in FIG. 1), a high-carbon chrome bearing steel such as SUJ2 is preferably used for the inner ring 3.

Example C

The abovementioned flanged bearing unit as shown in FIG. 9 was made.

The hub ring 2 was made from a steel having the alloy components shown in Table 14, to which hot forging was applied at 1000 to 1150° C. Then, cutting and drilling were performed to form a predetermined shape. Induction hardening and tempering were performed from the periphery of the inner raceway surface 7a to the periphery of the small diameter step portion 8 to form the hardened layer on the surface. Then, grinding was performed for finishing. In Table 14, the surface hardness of the raceway portion to which induction hardening was applied, and the hardness of the non-thermal refined portion to which induction hardening was not applied are shown together.

TABLE 14-1

|  | Alloy components (weight %) | | | | | | | | Ferrite |
|---|---|---|---|---|---|---|---|---|---|
|  | C | Mn | Si | Cr | S | O(ppm) | V | C + 0.2Si + 0.5V | area ratio % |
| Example | | | | | | | | | |
| 3-1 | 0.45 | 1.00 | 0.40 | 0.50 | 0.035 | 15 | 0.03 | 0.55 | 15 |
| 3-2 | 0.45 | 0.80 | 0.65 | 0.20 | 0.015 | 12 | 0.03 | 0.60 | 10 |
| 3-3 | 0.45 | 0.80 | 1.00 | 0.20 | 0.025 | 15 | 0.03 | 0.67 | 7 |
| 3-4 | 0.45 | 0.90 | 0.50 | 0.30 | 0.013 | 12 | 0.08 | 0.59 | 11 |
| 3-5 | 0.48 | 0.80 | 0.35 | 0.30 | 0.017 | 12 | 0.03 | 0.57 | 7 |
| 3-6 | 0.48 | 0.80 | 1.20 | 0.10 | 0.017 | 13 | 0.05 | 0.75 | 5 |
| 3-7 | 0.48 | 0.50 | 0.40 | 0.50 | 0.026 | 13 | 0.3 | 0.71 | 5 |
| 3-8 | 0.50 | 0.60 | 0.65 | 0.20 | 0.015 | 11 | 0.03 | 0.65 | 7 |
| 3-9 | 0.50 | 1.00 | 0.30 | 0.20 | 0.015 | 11 | 0.1 | 0.61 | 10 |
| 3-10 | 0.50 | 0.50 | 0.75 | 0.10 | 0.028 | 9 | 0.1 | 0.70 | 7 |
| Comparative Example | | | | | | | | | |
| 3-1 | 0.53 | 0.80 | _0.20_ | 0.20 | 0.028 | 11 | _0_ | 0.57 | _3_ |
| 3-2 | _0.42_ | 0.80 | 0.45 | 0.20 | 0.013 | 15 | 0.04 | _0.53_ | _17_ |
| 3-3 | 0.45 | 0.80 | _0.20_ | 0.30 | 0.023 | 15 | 0.05 | _0.52_ | 6 |
| 3-4 | 0.48 | 0.50 | 0.50 | 0.20 | 0.031 | 12 | _0_ | 0.58 | _3_ |
| 3-5 | 0.48 | 0.80 | 1.50 | 0.30 | 0.025 | 13 | 0.1 | _0.83_ | 5 |
| 3-6 | 0.48 | 0.50 | 0.50 | 0.20 | 0.019 | 12 | 0.5 | _0.83_ | 6 |

TABLE 14-2

|  | Non-thermal refined portion hardness Hv | Raceway portion surface hardness Hv | Test life | Tool wear amount |
|---|---|---|---|---|
| Example | | | | |
| 3-1 | 220 | 651 | 1.1 | 0.3 |
| 3-2 | 240 | 700 | 1.5 | 0.4 |
| 3-3 | 253 | 718 | 1.8 | 0.5 |
| 3-4 | 236 | 694 | 1.3 | 0.5 |
| 3-5 | 238 | 679 | 1.1 | 0.4 |
| 3-6 | 285 | 723 | 1.8 | 0.7 |
| 3-7 | 300 | 746 | 2 | 0.8 |
| 3-8 | 265 | 731 | 1.7 | 0.5 |
| 3-9 | 245 | 723 | 1.6 | 0.4 |
| 3-10 | 280 | 750 | 1.7 | 0.5 |
| Comparative Example | | | | |
| 3-1 | 245 | 723 | 1.0 | 1 |
| 3-2 | _213_ | _628_ | 0.4 | 0.7 |
| 3-3 | 223 | 645 | 0.5 | 0.8 |
| 3-4 | 246 | 686 | 0.8 | 1.2 |
| 3-5 | _312_ | 736 | 2.2 | 2.0 |
| 3-6 | _322_ | _756_ | 2.1 | 1.7 |

Moreover, the outer ring 4 was made from S53C and induction hardening was performed on the periphery of the outer raceway surface 10a and the periphery of the outer raceway surface 10b, so as to form the surface hardened layer. Moreover, the inner ring 3 and the rolling elements 5 were made from SUJ2 and wholly hardened from the surface to the core by a standard quenching treatment.

[Rotation Test]

Furthermore, the bearing type of the manufactured flanged bearing unit was the double row ball bearing wherein the pitch diameter of the rolling elements was 49 mm and the number of balls in the respective rows was twelve. Using this flanged bearing unit as the test bearing unit, a rotation test was performed under the following conditions.

Radial load Fr: 9800N
Axial load Fa: 4900N
Rotational speed: 300 min$^{-1}$

Figure 12:
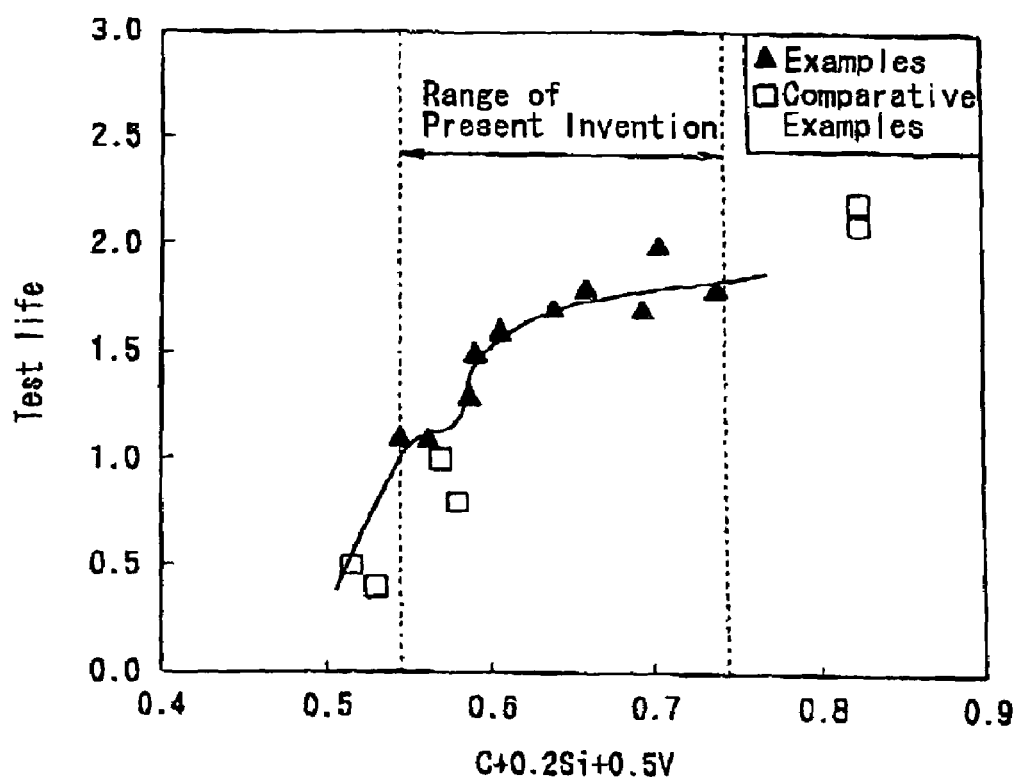
FIG. 12 is a graph showing a relation between C+0.2Si+0.5 V and test life.

The time point when flaking occurred on the raceway portion or the time point when cracks were recognized on the periphery of the flange, was regarded as the life. The life test results obtained from the rotation test are shown together in Table 14. The test life shown in Table 14 represents the proportion with respect to the test life of a conventional product shown in comparative example 3-1, assuming that this is 1.0. FIG. 12 shows the relation between C+0.2Si+0.5 V and the test life.

[Working Test]

A drill test was performed using the hub ring 2 of the manufactured flanged bearing unit. A hole of φ 8 mm and a depth of 13 mm was drilled in the flange 6 under the following conditions.

Drill material: SKH51
Cutting speed: 18 mm/min
Feed speed: 0.15 mm/rev

After the test, the flank wear loss of the edge of the drill was measured. The results are shown together in Table 14. The wear loss in Table 14 represents the proportion with respect to the life of a conventional product shown in comparative example 3-1, assuming that this is 1.0.

The ferrite area ratio (%) shown together in Table 14 was measured by mirror polishing and etching the section of the non-thermal refined portion of the outside root portion 14 of the flange 6 in the hub ring 2 so that the microstructure of the metal appeared, and then analyzing the image of the observed photograph (0.1 to 0.3 mm$^1$) of the metallurgical microscope.

Similarly, the hardness of the non-thermal refined portion (Hv) shown together in Table 14 was obtained by measuring the section of the non-thermal refined portion of the outside root portion 14 of the flange 6 in the hub ring 2 with a Vickers hardness measuring instrument. The raceway hardness (Hv) shown together in Table 14 was obtained by cutting out a section of the raceway in the hub ring 2, and then measuring a portion at a depth of 0.2 mm from the surface of the raceway groove with the Vickers hardness measuring instrument.

In examples 3-1 to 3-10 shown in Table 14, since the alloy components were within the range stipulated by the present invention, the rotation test results were equivalent to those of the conventional product or more, and the workability in the drill test was increased. Particularly, in examples 3-2,3-3, 3-8,3-9 and 3-10, the rotation test results were superior to those of the conventional product and the workability was especially increased.

On the other hand, in comparative examples 3-2 and 3-3, the C or Si amount contained in the steel was less than the range stipulated by the present invention, and the C+0.2Si+0.5V was also less than the range stipulated by the present invention, so that the rotation test results were considerably inferior.

In comparative example 3-4, V addition was small so that the rotation test result was inferior to that of the conventional product. Furthermore, the precipitated amount of ferrite was small so that the workability was inferior.

In comparative examples 3-5 and 3-6, the Si or V addition contained in the steel was more than the range stipulated by the present invention so that the rotation test results were excellent but the workability was considerably decreased.

From the above, by setting the alloy components within the range stipulated by the present invention, and by stipulating the ferrite area ratio, the hardness of the non-thermal refined portion, and the hardness of the induction hardened raceway portion to be within the predetermined range, it becomes possible to obtain a flanged bearing unit which is superior in workability, while maintaining excellent fatigue strength of the non-thermal refined portion, and rolling life of the induction hardened raceway.

The present invention is not limited by the respective embodiments and can be suitably modified without departing from the spirit or scope of the present invention.

For example, in the above respective embodiments, the example was given where the inner member was used as the hub ring 2. However the present invention may also be applied to a flange of a hub ring where the outer member is the hub ring.

Moreover, in the above respective embodiments, the example was given where the present invention was applied only to the hub ring 2. However it is not limited to this and the present invention may be applied to the inner ring 3 or the outer ring 4 in addition to the hub ring 2.

As described above, according to the present invention, by refining the microstructure of at least the flange, it becomes possible to increase the strength of the flange which is the weakest portion for rotating bending fatigue, without changing the shape and the size of flange 6, nor increasing the cost due to the increase in the induction hardened portion. As a result it becomes possible to thin the wall of the flange, and the flanged bearing unit can be lightened.

Moreover, by optimizing the steel components and the hot forging conditions, it is possible to obtain a flanged bearing unit which is superior in rotating bending fatigue strength of the non-thermal refined portion on the periphery of the flange, and rolling fatigue strength of the induction hardened raceway portion. Therefore it becomes possible to lighten the flanged bearing unit.

Furthermore, by stipulating the alloy components to be within the predetermined range and by stipulating the ferrite area ratio, the hardness of the non-thermal refined portion, and the hardness of induction hardened raceway to be within the predetermined range, it becomes possible to obtain a flanged bearing unit which is superior in workability, while maintaining excellent fatigue strength of the non-thermal refined portion, and rolling life of the induction hardened raceway portion.

In another aspect of the wheel-support rolling bearing unit of the present invention, both of the hub ring 2 and the outer ring 4 are made from steel respectively containing; 0.45 to 0.60 weight % of C, 0.3 to 1.5 weight % of Mn, 0.1 to 1.0 weight % of Si, 0.01 to 0.5 weight % of Cr, 0.01 to 0.2 weight % of V, 0.01 to 0.15 weight % of Nb, and 0.01 to 0.15 weight % of Ti, wherein the S content is kept to 0.035 weight % or less, and the 0 content is kept to 15 ppm or less. Moreover, in addition to the portion shown by the hatching, also on the portion where the respective first and second outer raceways 10a and 10b are formed on the inner peripheral surface of the outer ring 4, the hardened layer is formed by induction hardening. Furthermore, regarding the hardened layer formed at least on the first inner raceway 7a portion and the respective first and second outer raceways 10a and 10b portion, the hardness of the portion at a depth of 0.1 mm from the surface of this hardened layer is Hv 670 or more. Furthermore, the prior austenite grain size of the metal structure of this hardened layer is 8 or more for the grain size number according to JIS G 0551.

The inner ring 3 is made from SUJ2 and quenched and hardened overall (to the core). Regarding the second inner raceway 7b formed on the outer peripheral surface of this inner ring 3, the tensile stress based on the moment applied on the rotation side flange 6 will not be applied at the time of operation. In other words, the stress applied to the second inner raceway 7b becomes only the shearing stress caused by the compressive stress applied from the respective rolling elements 5. Therefore, regarding the second inner raceway 7b, it is not particularly necessary to satisfy the abovementioned specifications for the hardness and size of grain. However, the hardness is sensibly Hv 670 or more considering the rolling fatigue life of the second inner raceway 7b.

Hereunder is a description of experiments performed for verifying the effect of the present invention. In the experiments, a wheel-support rolling bearing unit as shown in FIG. 1 was made. The pitch diameter of this wheel-support rolling bearing unit was 49 mm and the number of the rolling elements in the respective rows was 12, that is 24 in total. By changing the specification of the hub ring 2 in this wheel-support rolling bearing unit, it was observed how this specification change affected to the durability (rolling fatigue life) of the first inner raceway 7a.

Firstly, the hub ring 2 was made from four types of steel materials shown as A to D in Table 15 below.

hardening to a portion from the first inner raceway 7a to the step portion 8 on the outer peripheral surface of the hub ring 2 (hatched portion in FIG. 1), the hardened layer was formed on the surface of this portion. Grinding was applied to the surface of this hardened layer to make the surface smooth. By variously changing the type of the steel material, the temperature at the time of hot forging, and the condition of induction hardening (retention temperature and retention time), eight types of samples (examples 1 to 8) within the range of the present invention shown in the following Table 16, and four types of samples (comparative examples 1 to 4) outside of the range of the present invention, that is twelve types of samples in total, were prepared.

TABLE 16

| | Steel Type | Temperature (° C.) | Prior austenite Rolling fatigue grain size | Raceway Porter Surface hardness number | Forging life Hv |
|---|---|---|---|---|---|
| Example | | | | | |
| 1 | A | 1000 | 11 | 698 | 3.1 |
| 2 | A | 1050 | 10 | 712 | 3.1 |
| 3 | A | 1100 | 9 | 723 | 3 |
| 4 | A | 1200 | 8 | 731 | 2.9 |
| 5 | A | 1200 | 8 | 670 | 2.5 |
| 6 | B | 1050 | 11 | 743 | 3.6 |
| 7 | B | 1200 | 9 | 728 | 3.4 |
| 8 | C | 1200 | 9 | 751 | 2.7 |
| Comparative Example | | | | | |
| 1 | A | 1250 | 7 | 721 | 1.4 |
| 2 | A | 1200 | 6 | 703 | 1.5 |
| 3 | A | 1200 | 7 | 738 | 1.9 |
| 4 | D | 1100 | 9 | 648 | 1.0 |

The raceway portion surface hardness in this Table 16 is the hardness of the portion at a depth of 0.1 mm from the surface of the hardened layer formed on this raceway portion. Moreover, the prior austenite grain size represents the prior austenite grain size of the metal structure of the hardened layer in the grain size number according to JIS G 0551. Furthermore, the rolling fatigue life represents the proportion with respect to comparative example 4, assuming that the rolling fatigue life of comparative example 4 is 1.0. The outer ring 4 was made from a steel material A in Table 15 in a similar process to that for the hub ring 2, and a

TABLE 15

| Steel Type | C (weight %) | Mn (weight %) | Si (weight %) | Cr (weight %) | S (weight %) | O (ppm) | V (weight %) |
|---|---|---|---|---|---|---|---|
| A | 0.53 | 0.8 | 0.3 | 0.2 | 0.015 | 12 | |
| B | 0.54 | 0.7 | 0.6 | 0.2 | 0.025 | 10 | 0.03 |
| C | 0.53 | 0.5 | 0.1 | 0.2 | 0.013 | 11 | 0.08 |
| D | 0.40 | 1.0 | 0.3 | 0.2 | 0.021 | 15 | |

Hot forging was applied to the four types of steel materials shown in Table 15 to produce an intermediate material having an approximate shape. Then, cutting was applied to this intermediate material so as to obtain the hub ring 2 having the predetermined shape. By applying induction hardening hardened layer was formed on the first and second outer raceways 10a and 10b and on the periphery thereof by induction hardening. Regarding the hardened layer on this outer ring 4, the heating temperature at the time of hot forging, and the retention temperature and the retention time at the time of induction hardening were adjusted, so that the prior austenite grain size number of the hardened layer was 10. Furthermore, the inner ring 3 and the rolling elements 5 were made from SUJ2, and hardened from the surface to the core by a standard quenching treatment (so called, through hardening).

The endurance test was performed under the following conditions respectively on the twelve types of samples (wheel-support rolling bearing units) obtained in this way. In this case, the fixed side flange 11 provided on the outer peripheral surface of the outer ring 4 was fixed, and the rotation side flange 6 provided on the outer peripheral surface of the hub ring 2 was driven to rotate while applying the following loads.

Radial load 7000N
Axial load: 5000N
Rotational speed: 300 min$^{-1}$

During the test, vibration generated in the respective samples was measured and the time point when the measured value reached to three times the value of the initial vibration was regarded as the life of the sample.

Figure 13:
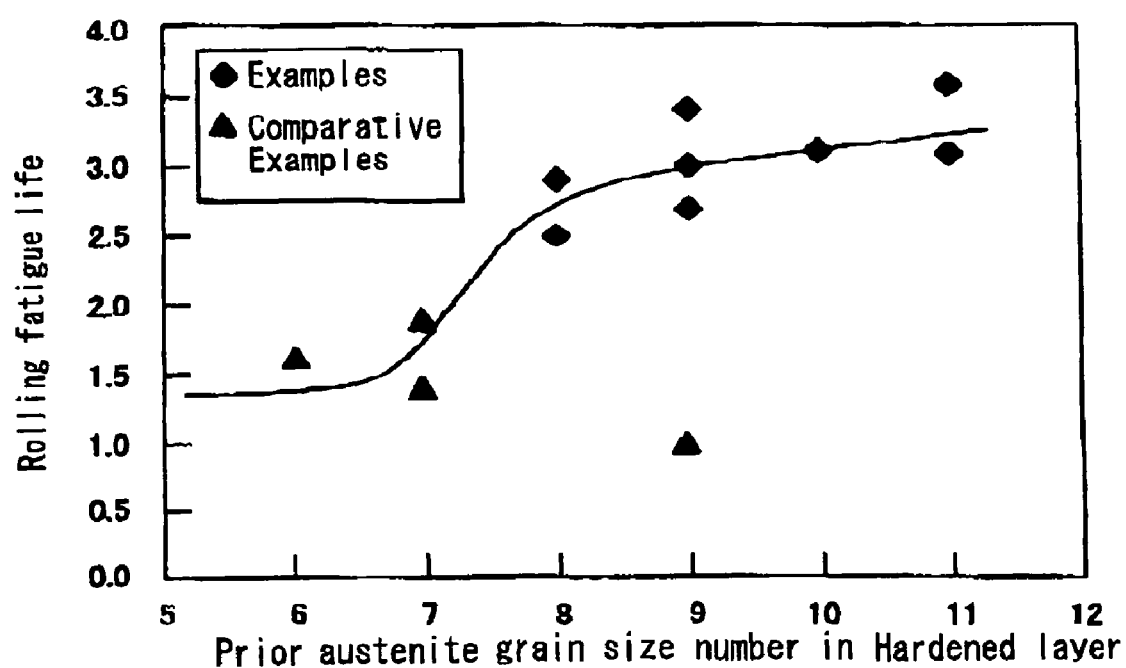
FIG. 13 is a graph showing a relation between prior austenite grain size number and rolling fatigue life in a raceway portion.

As is apparent from the description for Table 16 and FIG. 13 showing the results of the rotation test performed under such conditions, in examples 1 to 8, the rolling fatigue life of the induction hardened raceway portion was superior.

On the other hand, in comparative examples 1 to 3 of comparative examples 1 to 4, the size of the prior austenite grains was large (prior austenite grain size value was small) so that the rolling fatigue life was short. This is due to the fact that the rolling life of the first inner raceway 7a was decreased based on the tensile stress which acts on the interior of the material, caused by the bending stress applied from the rotation side flange 6 to the hub ring 2.

On the other hand, in comparative example 4, the size of prior austenite grain was small. However the C content in the material was low and the hardness of the hardened layer on the surface of the first inner raceway 7a after induction hardening was low. Accordingly, the rolling fatigue life of the first inner raceway 7a was decreased by the shearing stress which acts on the interior of the material based on the compressive stress from the rolling elements.

Since the present invention is constructed and operates as described above, then while ensuring the rolling fatigue life of the raceway portion of the member provided with the flange, it becomes possible to thin the wall of the flange, and lightening of the wheel-support rolling bearing unit can thus be realized.

In another aspect of the present invention, the point is that the fatigue strength of the root portion on the outside surface side of the flange which is formed on the outer peripheral surface of the hub is increased without quenching the root portion. Since the structures shown in the drawings are similar to the conventional structures shown in FIGS. 1 and 2 described above for example, overlapping description is omitted.

In the case of the wheel-support rolling bearing unit 1 shown in FIG. 1, the fatigue strength of the root portion on the inside surface side of the flange 6 which is formed on the outer peripheral surface of the hub ring 2 is ensured based on quenching as described above.

On the other hand, in the case of the wheel-support rolling bearing unit 1 shown in FIG. 2, the fatigue strength of the root portion on the inside surface side of the flange 6 which is formed on the outer peripheral surface of the hub ring 2 is ensured by a predetermined pro-eutectoid ferrite or by separate quenching, similarly to the root portion on the outside surface side. The distance from the root portion on the inside surface side of the flange 6 to the inner peripheral surface of the hub ring 2 is longer than the distance from the root portion on the outside surface side thereof to the inner peripheral surface. Therefore the decrease in the toughness accompanied with the quenching effect is unlikely to become a problem.

Hereunder is a description of experiments performed for verifying the effect of the present invention.

Firstly, in the first experiment, three types of materials A to C containing the elements shown in the following Table 17 and the rest being Fe and inevitable impurities, were cut to obtain bar-shaped materials in which the oxygen contents was 12 ppm or less. Then, the bar-shaped materials were heated to a temperature between 950 and 1200° C. by high frequency induction heating to change the austenite grain size, and hub rings for a drive wheel were obtained by hot forging.

TABLE 17

| Component | C | Si | Mn | Cr | Nb |
| --- | --- | --- | --- | --- | --- |
| A | 0.53 | 0.21 | 0.75 | 0.17 | ☐ |
| B | 0.56 | 0.24 | 0.79 | 0.15 | 0.11 |
| C | 0.71 | 0.23 | 0.87 | 0.15 | ☐ |

Next, after cooling, the oxide film on the surface was removed by shot blasting. In this cooling process, the area ratio of the pro-eutectoid ferrite after cooling was adjusted by employing either one of forced air cooling or radiational cooling. Furthermore, after removing the oxide film, lathe turning for trimming the size and the shape of the surface, drilling for opening holes for fixing the studs in the flange which supports the wheel, induction hardening for increasing the hardness of; the raceway surface, the root portion on the inside surface side of the flange, and the step portion for fitting with the inner ring, and polishing were performed for smoothening the raceway surface and the root portion on the outside surface side which was required for observing the microstructure. Then a total of twenty types of samples consisting of twelve types of samples (examples 1 to 12) which belonged to the present invention having the respectively different prior austenite grain size (y grain size) and the area ratio of the pro-eutectoid ferrite of the root portion on the outside surface side of the flange as shown in Table 18 described later, and eight types of samples (comparative examples 1 to 8) outside of the present invention, were made. These samples were wheel-support rolling bearing units of the double row ball bearing type for a drive wheel wherein the axial pitch of the rolling elements was 59 mm and the number of balls was 12. Moreover, the surface hardness of the respective outer ring and inner ring raceways was made HRC 58 or more by induction hardening. Accordingly, together with suppressing the oxygen contents, the rolling fatigue life of the respective raceways was ensured.

The root portion on the outside surface side was polished and then the surface was etched by picral, which is an etching reagent (picrate alcohol solution), to observe the microstructure, that is, the prior austenite grain size and the area ratio of the pro-eutectoid ferrite. Moreover, for the prior austenite grain size, the area surrounded by the pro-eutectoid ferrite which was precipitated in a net shape along the grain boundary was obtained by a method stipulated in JIS G 0551. Furthermore, for the area ratio of the pro-eutectoid ferrite, the area within 10 mm from the root portion on the outside surface of the flange was image analyzed and the average value was obtained.

Each of these samples (wheel-support rolling bearing units) were assembled into a testing apparatus such as shown in FIG. 9. That is, in a condition with the outer ring 4 held and fixed to a jig 12, the hub ring 2 which was rotatably supported on the inner diameter side of the outer ring 4 was rotated, and a radial load Fr and an axial load Fa were applied to the hub ring 2 under the following test conditions. Then, the existence or nonexistence of damage to the root portion on the outside surface side of the flange 6 which was formed on the outer peripheral surface of the hub ring 2b was observed.

Test conditions
Rotational speed of hub ring 2b: 300 min$^{-1}$
Radial load Fr: 4000N
Axial load Fa: 3500N
Testing time: 100 hrs The results of the test performed under such conditions are shown in the following Table 18 and FIG. 14.

TABLE 18

| | Component | Pro-eutectoid Ferrite area rates | number (%) | γ grain size damage |
|---|---|---|---|---|
| Example | | | | |
| 1 | B | 3.4 | 8.0 | ○ |
| 2 | A | 6.3 | 6.0 | ○ |
| 3 | B | 8.0 | 8.0 | ○ |
| 4 | B | 8.1 | 7.0 | ○ |
| 5 | A | 7.1 | 5.5 | ○ |
| 6 | A | 8.0 | 6.0 | ○ |
| 7 | A | 6.0 | 4.0 | □ |
| 8 | A | 10.0 | 5.0 | □ |
| 9 | B | 10.5 | 7.5 | □ |
| 10 | A | 11.1 | 4.0 | □ |
| 11 | B | 12.5 | 8.0 | □ |
| 12 | A | 14.8 | 6.0 | □ |
| Comparative Example | | | | |
| 1 | A | 3.1 | 1.5 | x |
| 2 | A | 3.1 | 3.5 | x |
| 3 | A | 7.0 | 3.0 | x |
| 4 | A | 11.3 | 3.5 | x |
| 5 | A | 15.2 | 8.0 | x |
| 6 | A | 15.2 | 5.0 | x |
| 7 | A | 15.4 | 3.5 | x |
| 8 | C | 0.2 | 3.5 | x |

Figure 14:
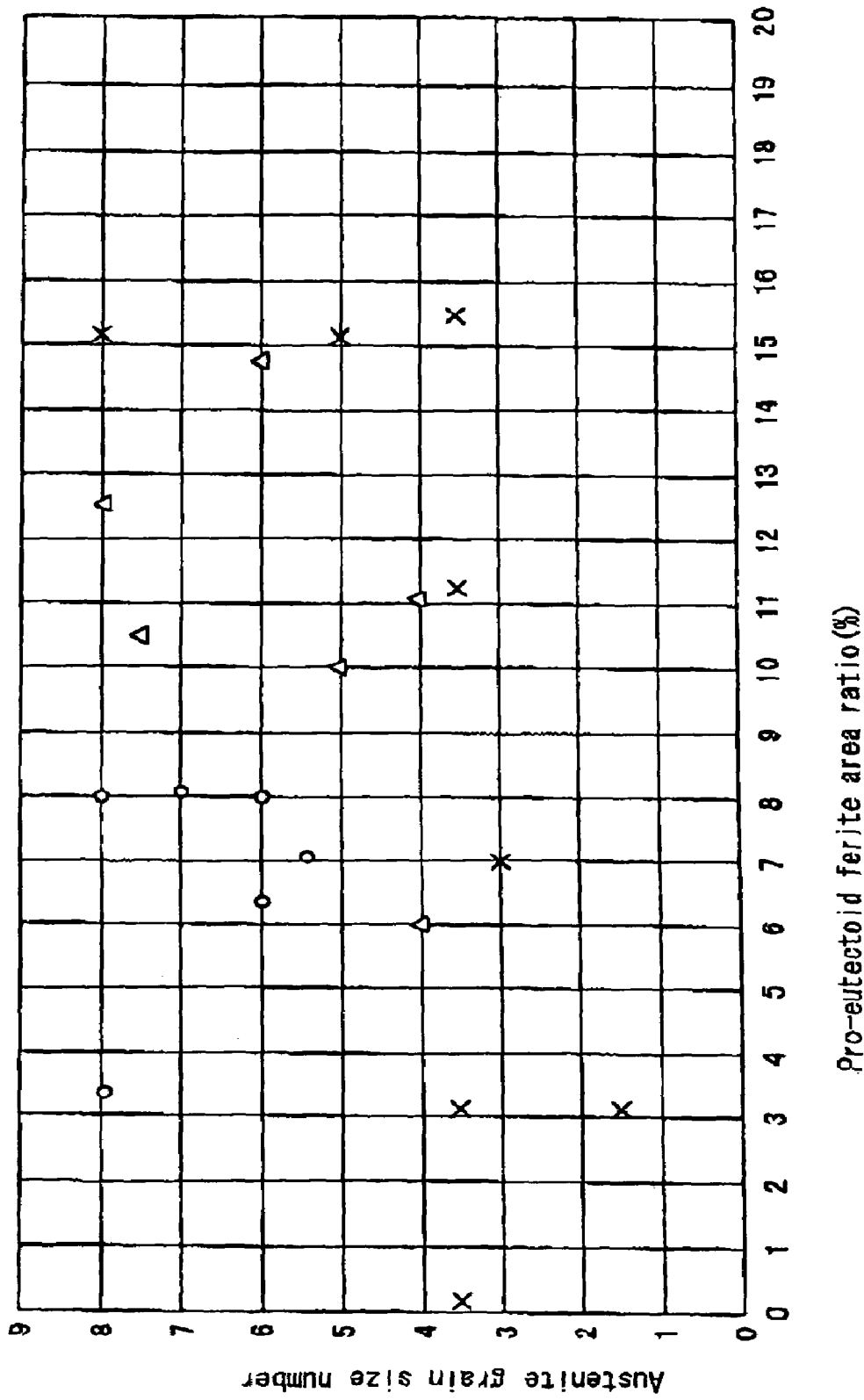
FIG. 14 is a graph showing the results of an endurance test in the example.

Of the reference symbols representing the test result shown in Table 18 and FIG. 14, "X" represents sample damaged from the root portion on the outside surface side of the flange 6, "Δ" represents sample damaged from another part except for the root portion, and "O" represents sample not damaged in any parts. Moreover, in FIG. 14, the area ratio of the pro-eutectoid ferrite is shown on the horizontal axis and the austenite grain size number is shown on the vertical axis. As is apparent from the respective experimental results shown in Table 18 and FIG. 14, in the examples 1 to 12 where the austenite crystal grain size for the root portion on the outside surface side of the flange 6 was 4 or more, and the area ratio of the pro-eutectoid ferrite was within a range between 3 and 15%, the microstructure could be controlled so as to prevent cracking in the root portion on the outside surface side of the flange 6. Furthermore, if the austenite grain size was 5 or more, and the area ratio of the pro-eutectoid ferrite was between 3 and 9%, cracking could be kept from occurring in the whole hub ring 2. In this manner, from Table 18 and FIG. 14, it is understood that there is a superior durability in the wheel-support rolling bearing unit wherein the austenite grain size number was 4 or more and the area ratio of the pro-eutectoid ferrite was between 3 and 15% in the microstructure of the root portion on the axial outside surface side of the flange 6 formed on the outer peripheral surface of the rotating ring which was made from carbon steel containing 0.50 to 0.65 weight % of C.

On the other hand, in comparative example 1, since the austenite grain size number was small (the size of the grain was large), it was not only impossible to prevent cracking in the root portion on the outside surface side of the flange 6, but also workability was very poor. Moreover, in comparative example 2 (conventional product), comparative example 3, and comparative example 4, the austenite grain size number was small (the size of the grain was large), and the fatigue strength of the root portion was worsened in all samples. Moreover, in comparative examples 5 to 7, since the area ratio of the pro-eutectoid ferrite exceeded 15%, sufficient fatigue strength of the root portion could not be obtained in all samples. Furthermore, in comparative example 8, since the carbon content in the material was considerable, and the hardness was decreased by performing annealing treatment in order to improve the cutting property, the fatigue strength of the root portion could not be ensured.

Next, in the second experiment, five types of materials a to e containing the elements shown in the following Table 19 and the rest being Fe and inevitable impurities were cut to obtain the bar-shaped materials. Then, the bar-shaped materials were heated to a temperature of 1200° C. by high frequency induction heating to make an intermediate material having a predetermined shape, by three-stage hot forging.

TABLE 19

| Component | C(weight %) | Si(weight %) | Mn(weight %) | Cr(weight %) |
|---|---|---|---|---|
| a | 0.45 | 0.21 | 0.75 | 0.17 |
| b | 0.55 | 0.24 | 0.79 | 0.15 |
| c | 0.65 | 0.23 | 0.85 | 0.15 |
| d | 0.43 | 0.22 | 0.75 | 0.15 |
| e | 0.71 | 0.24 | 0.87 | 0.20 |

Next, after cooling, heat treatment (normalization treatment) was applied to the intermediate material under the conditions shown in Table 20 described later. That is, the respective intermediate materials were heated to the temperatures shown in Table 20 and retained for 30 minutes, then cooled at a speed less than the critical cooling rate, and then the oxide film on the surface was removed by shot blasting Furthermore, after removing the oxide film, lathe turning for trimming the size and the shape of the surface, drilling for opening holes for fixing the studs in the flange which supports the wheel, induction hardening for increasing the hardness of; the raceway surface, the root portion on the inside surface side of the flange, and the step portion for fitting with the inner ring, and polishing for smoothening the raceway surface and the root portion on the outside surface side, were sequentially performed. Then, a total of fourteen types of samples consisting of ten types of samples (examples 13 to 22) which belonged to the present invention having the respectively different prior austenite grain size (γ grain size) and the area ratio of the pro-eutectoid ferrite of the root portion on the outside surface side of the flange as shown in Table 20 described later, and four types of samples (comparative examples 9 to 12) outside of the present invention, were made. These samples were wheel-support rolling bearing units of the double row ball bearing type for a drive wheel wherein the axial pitch of the rolling elements was 59 mm and the number of balls was 12.

The root portion on the outside surface side was polished and then the surface was etched by picral, which is an etching reagent (picrate alcohol solution), to observe the microstructure, that is, the austenite grain size and the area ratio of the pro-eutectoid ferrite. Moreover, for the austenite grain size, the area surrounded by the pro-eutectoid ferrite which was precipitated in a net shape along the grain boundary was obtained by the method stipulated in JIS G 0551. Furthermore, for the area ratio of the pro-eutectoid ferrite, the area within 10 mm$^2$ from the root portion on the outside surface of the flange was image analyzed and the average value was obtained. As described later, a tool life test, an impact test, and a fatigue strength test were performed on the respective samples (wheel-support rolling bearing units).

Firstly in the tool life test, the life of a tool used when drilling the holes for the studs in the flange portion of the respective samples described above, was examined. In the test, the number of holes which could be drilled until wear or chipping was generated in the edge of the tool, was counted.

Test Conditions

Tool: TiN coated twist drill; SKH56 (steel material for high speed tool) equivalent, diameter 6.0 mm, Cutting speed: 20 m/min Feed speed: 0.1 mm/rev Lubricating oil: water-immiscible cutting oil The test results performed under such conditions are shown in the following Table 20.

The test results represent the proportion with respect to example 22, assuming the number of drilled holes of example 22 is 1.0.

TABLE 20

| | Component | Pro-eutectoid ferrite area rate (%) | Normalizing condition (30 min. retention) | γ grain size number | Tool life test | Impact test | Fatigue strength |
|---|---|---|---|---|---|---|---|
| Example | | | | | | | |
| 13 | a | 15 | 750□ | 8 | 3.0 | 2.1 | 1.4 |
| 14 | a | 9 | 800□ | 7 | 2.4 | 2.1 | 2.1 |
| 15 | a | 6 | 1000□ | 5 | 2.5 | 1.2 | 1.9 |
| 16 | b | 13 | 850□ | 7 | 3.0 | 2.1 | 1.7 |
| 17 | b | 8 | 900□ | 6 | 2.5 | 2.0 | 1.7 |
| 18 | b | 7 | 950□ | 6 | 2.2 | 1.2 | 1.1 |
| 19 | c | 11 | 750□ | 8 | 2.6 | 2.1 | 2.0 |
| 20 | c | 8 | 800□ | 8 | 2.2 | 2.1 | 1.9 |
| 21 | c | 5 | 900□ | 6 | 2.1 | 2.2 | 2.0 |
| 22 | c | 3 | 1000□ | 5 | 1.0 | 1.0 | 1.0 |
| Comparative Example | | | | | | | |
| 9 | c | 2 | 1200□ | 1.5 | 0.1 | 0.5 | 0.4 |
| 10 | c | 2 | 1050□ | 3.5 | 0.1 | 0.5 | 0.5 |
| 11 | d | 16 | 800□ | 7 | 3.3 | 3.0 | 0.4 |
| 12 | e | 1 | 800□ | 7 | 0.1 | 0.2 | 0.2 |

Next, in the impact test using a Charpy impact test piece (JIS Z 2202 4) sampled from the flange portion of the hub ring of the respective samples, the impact value of the respective test pieces was obtained by a Charpy impact testing machine CAI-3000□ made by JT TOHSI Inc. The test results are shown in the above Table 20. The test results represent the proportion with respect to example 22, assuming the value in example 22 is 1.0.

Furthermore, in the fatigue strength test, the aforementioned respective samples were assembled into the testing apparatus shown in FIG. 9. That is, in a condition with the outer ring 4 held and fixed to the jig 12, the hub ring 2 which was rotatably supported on the inner diameter side of the outer ring 4 was rotated, and a radial load Fr and an axial load Fa were applied to the hub ring 2 under the following test conditions. Then, the existence or nonexistence of damage to the root portion on the outside surface side of the flange 6 which was formed on the outer peripheral surface of the hub ring 2b was observed.

Test Conditions

Rotational speed of hub ring 2b: 300 min$^{-1}$

Radial load Fr: 4000N

Axial load Fa: 3500N

Under such condition, the fatigue strength of the flange was evaluated by the testing time (endurance time) until it was damaged. The test results are shown in the above Table 20. The test results also represent the proportion with respect to example 22, assuming the endurance time of example 22 is 1.0.

As is apparent from the respective experimental results shown in Table 20, in examples 1 to 13 where the austenite grain size number for the root portion on the outside surface side of the flange 6 was 4 or more, and the area ratio of the pro-eutectoid ferrite was within a range between 3 and 15%, since the appropriate heat treatment (normalization treatment) was applied to the appropriate material made of metal, the microstructure was even and fine, and all of the tool life (cutting property), the impact value and the fatigue strength were excellent. As is apparent from Table 20 showing such experimental results, there is high strength and superior cutting properties in the wheel-support rolling bearing unit wherein the austenite grain size number was 4 or more and the area ratio of the pro-eutectoid ferrite was between 3 and 15%, obtained by applying heat treatment (normalization treatment) at 750 to 1000° C. (preferably 750 to 900° C.) to the intermediate material which was obtained by applying hot forging to the material made of carbon steel containing 0.45 to 0.65 weight % of C.

On the other hand, in comparative example 9, the temperature of heat treatment (normalization treatment) was too high so that the austenite grains were grown. As a result, since the austenite grain size number was small (the size of the grain was large), it was not only impossible to prevent cracking in the root portion on the outside surface side of the flange 6, but also the area ratio of the pro-eutectoid ferrite was as small as less than 3, the cutting property was poor, and the tool life was very short. Moreover, in comparative example 10, the temperature of heat treatment (normalization treatment) was too high so that the austenite grains were grown and the area ratio of the pro-eutectoid ferrite was small. Accordingly, all of the tool life, the impact value, and the fatigue strength were low. Moreover, in comparative example 11, since the C content was low and the area ratio of the pro-eutectoid ferrite was large, excellent results were obtained in the tool life and the impact value, however the fatigue strength was low. Furthermore, in comparative example 12, the C content was too high so that the area ratio of the pro-eutectoid ferrite did not exceed 3% even though the heat treatment (normalization treatment) condition was within the range of the present invention. Accordingly, the hardness was high, and all of the tool life, the impact value, and the fatigue strength were low.

The abovementioned respective experiments were performed on the wheel-support rolling bearing unit for a drive wheel. However the present invention is also applicable to the wheel-support rolling bearing unit for a driven wheel as shown in FIGS. 1 and 2 described above.

As described above, by refining the microstructure in the root portion on the outside surface side of the flange which was formed on the outer peripheral surface of the rotating ring for attaching the wheel, it becomes possible to increase the strength of the root portion which is the weakest portion for fatigue due to rotating bending moment, without changing the shape and the size of this flange, nor increasing the cost. As a result it becomes possible to thin the wall of the flange, and lightening of the wheel-support rolling bearing unit can be realized. Furthermore, by applying the appropriate heat treatment, the cutting property can be made excellent, and the tool life can be ensured.

Figure 15:
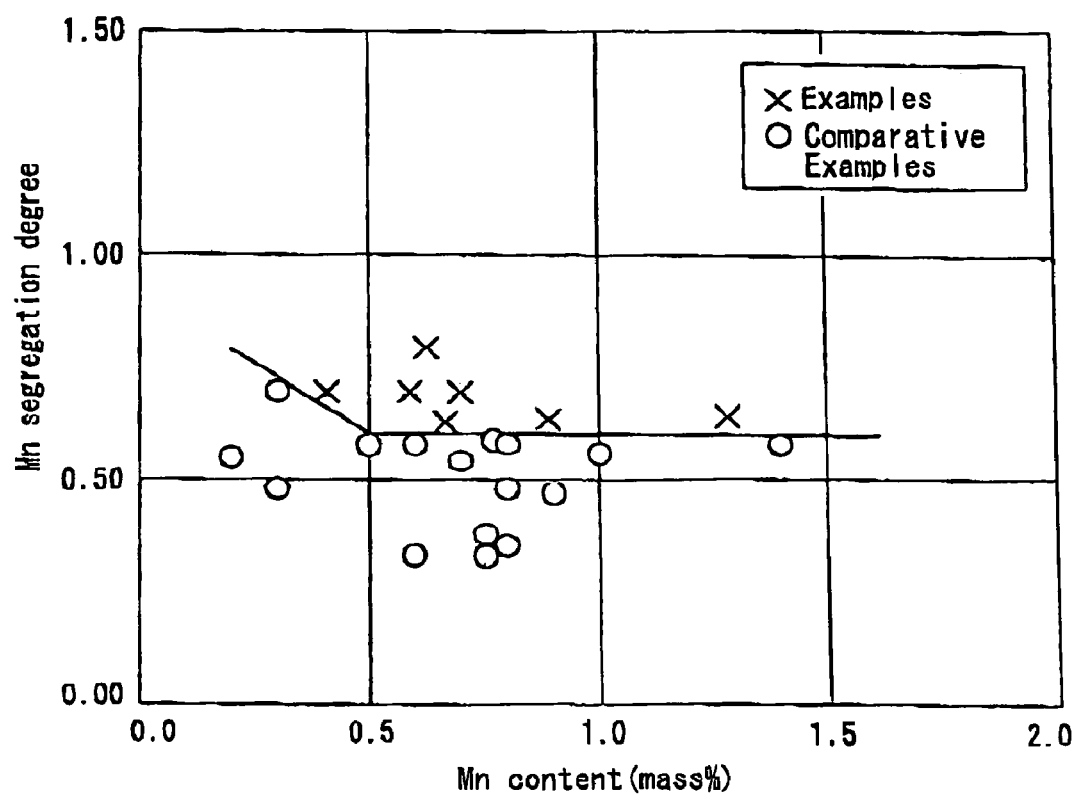
FIG. 15 is a graph showing a relation between Mn content and Mn segregation degree in steel.

Moreover, the hub ring 2 of the wheel-support rolling bearing unit 1 according to another aspect of the present invention is made from a steel containing the alloy components shown in Table 21, by hot forging. In order to change the Mn segregation degree, a steel having a cooling rate or forging ratio which changes at the time of coagulation, or a steel which had been subjected to diffusion treatment at 1200° C. before forging was partially used. Moreover, the hub ring 2 was worked into a predetermined shape by cutting, and induction hardening was applied to a region from the periphery of the inner raceway surface 7a to the periphery of the small diameter step portion 8, so that the hardened layer 13 (portion with hatching in FIG. 1) was formed on the surface. Then, grinding was performed to make the finished shape. Mn segregation degree of the steel and the hardness of the crimped portion (Vickers hardness) are shown together in Table 21. Moreover, the relation between the Mn content and the Mn segregation degree of the steel is shown in the graph in FIG. 15. The fracture surface face of the cylindrical portion 9 was measured at five points under a 98N load, and the hardness represents the average value thereof. Moreover, the Mn segregation degree was calculated by the above equation from the Mn concentration distribution and the maximum manganese concentration [Mn] (manganese concentration in a portion containing solid-solved Mn) for the fracture surface face of the cylindrical portion 9, which was measured by an electron probe microanalyzer (EPMA).

The inner ring 3 was made from S53C. Moreover, the outer ring 4 was made from S53C by hot forging at 1100° C. Then, after the hot forging, cutting was applied, and induction hardening was applied to the periphery of the outer raceway surface 10a and the periphery of the outer raceway surface 10b. Then, grinding was applied to make the finished shape. Furthermore, the rolling elements 5 were made from SUJ2.

The wheel-support rolling bearing unit 1 was subjected to swaging under the following conditions and assembled. That is, while rotating the hub ring 2 at a rotational speed of 200 min$^{-1}$, a load oriented radially and outwardly (200,000N) was applied to the end portion of the cylindrical portion 9 to flare this so that the inner ring 3 was attached to the hub ring 2 by swaging. At this time, the axial clearance was set to −15 μm.

The criteria for the swaging properties were: samples for which there were no cracks confirmed on the surface were non-defective, and samples confirmed to have cracks on the surface or which did not have appropriate axial clearance were defective. The defective fraction (%) per 1000 times of swaging was calculated and shown in Table 21.

As the result, in the wheel-support rolling bearing unit of examples 1 to 17, since the Mn segregation degree of the steel was suitable, the defective fraction was suppressed to non-metallic inclusion MnS is decreased, homogeneity of the ferrite-pearlite structure is achieved, and the elongation and reduction value of the steel is improved. Therefore, even if swaging is performed so as to integrally fix the inner ring to the hub ring, cracks are unlikely to occur.

TABLE 21

| | Alloy content of steel (mass %) | | | | | Mn segregation degree | Defective fraction (%) | Crimped portion hardness |
|---|---|---|---|---|---|---|---|---|
| | C | Cr | Si | Mn | S | | | |
| Example | | | | | | | | |
| 1 | 0.45 | 0.4 | 1.0 | 1.4 | 0.016 | 0.58 | 2 | 261 |
| 2 | 0.48 | 0.2 | 0.2 | 0.8 | 0.016 | 0.59 | 1 | 220 |
| 3 | 0.50 | 0.2 | 0.2 | 1.0 | 0.016 | 0.56 | 2 | 236 |
| 4 | 0.50 | 0.3 | 0.7 | 0.8 | 0.013 | 0.58 | 1 | 238 |
| 5 | 0.52 | 0.2 | 0.2 | 0.9 | 0.017 | 0.47 | 1 | 237 |
| 6 | 0.53 | 0.2 | 0.2 | 0.2 | 0.016 | 0.55 | 1 | 207 |
| 7 | 0.53 | 0.2 | 0.2 | 0.5 | 0.016 | 0.58 | 3 | 221 |
| 8 | 0.53 | 0.6 | 0.5 | 0.6 | 0.016 | 0.58 | 3 | 252 |
| 9 | 0.53 | 0.2 | 0.3 | 0.7 | 0.016 | 0.54 | 4 | 231 |
| 10 | 0.53 | 0.4 | 0.2 | 0.8 | 0.016 | 0.58 | 5 | 246 |
| 11 | 0.53 | 0.2 | 0.5 | 0.8 | 0.016 | 0.38 | 0 | 236 |
| 12 | 0.55 | 0.6 | 0.2 | 0.8 | 0.016 | 0.48 | 7 | 263 |
| 13 | 0.57 | 0.4 | 0.4 | 0.8 | 0.016 | 0.33 | 1 | 258 |
| 14 | 0.58 | 0.3 | 0.2 | 0.8 | 0.016 | 0.36 | 1 | 255 |
| 15 | 0.61 | 0.2 | 0.3 | 0.3 | 0.016 | 0.70 | 5 | 235 |
| 16 | 0.61 | 0.2 | 0.1 | 0.6 | 0.017 | 0.33 | 1 | 247 |
| 17 | 0.65 | 0.2 | 0.2 | 0.3 | 0.017 | 0.48 | 2 | 245 |
| Comparative Example | | | | | | | | |
| 1 | *0.44* | 0.2 | 0.2 | 0.7 | 0.017 | *0.70* | 22 | 205 |
| 2 | *0.66* | 0.2 | 0.3 | 0.7 | 0.016 | *0.63* | 70 | 266 |
| 3 | 0.50 | 0.2 | 0.2 | 0.6 | 0.017 | *0.70* | 40 | 217 |
| 4 | 0.58 | 0.3 | 0.2 | 0.6 | 0.017 | *0.80* | 50 | 246 |
| 5 | 0.53 | 0.2 | 0.2 | 0.4 | 0.016 | *0.70* | 50 | 217 |
| 6 | 0.53 | 0.2 | 0.2 | 1.3 | 0.016 | *0.64* | 50 | 258 |
| 7 | 0.53 | 0.2 | 0.2 | 0.9 | 0.016 | *0.64* | 44 | 239 | low in all samples. On the other hand, in the wheel-support rolling bearing units of comparative examples 2 to 17 where the Mn segregation degree of the steel exceeded the suitable range, the defective fraction was considerably high compared to the aforementioned respective examples. Moreover, in the wheel-support rolling bearing unit of comparative example 1 where the C content was low, the defective fraction was low, however this was caused by the fact that the elongation and reduction value was increased due to the low C content. In comparative example 1, since the C content was low, the steel strength was insufficient, causing a problem. Furthermore, in comparative example 2 where the C content was high, there was a problem in that cold workability was particularly worsened.

The present embodiment illustrates only an example of the present invention, and the present invention is not limited by the present embodiment. For example, in the present embodiment, the type of the wheel-support rolling bearing unit was a double row ball bearing. However it may be an other bearing type such as a single row ball bearing. Moreover, it is not limited to a ball bearing and may be a roller bearing.

As described above, in the wheel-support rolling bearing unit of the present invention, the Mn segregation degree of the steel constituting the hub ring is controlled to a predetermined value. Therefore the precipitated amount of the

What is claimed is:

1. A wheel-support rolling bearing unit comprising; an inner member having an inner raceway on an outer peripheral surface, an outer member having an outer raceway on an inner peripheral surface, a plurality of rolling elements rotatably provided between said inner raceway and said outer raceway, and a flange provided on the peripheral surface of at least one member of said inner member and said outer member, for fastening to a part of a suspension device or a wheel, wherein in a portion being a part of at least one member of said inner member and said outer member and including said inner raceway or said outer raceway, a hardened layer is formed by induction hardening, and at least one member of said inner member and said outer member is made from an alloy steel containing 0.5 to 0.65 weight % of C, 0.3 to 1.5 weight % of Mn, 0.1 to 1.0 weight % of Si, and 0.01 to 0.5 weight % of Cr, and the S content is kept to 0.035 weight % or less, and further including any one type or more selected from 0.01 to 0.2 weight % of V, 0.01 to 0.15 weight % of Nb, and 0.01 to 0.15 weight % of Ti, with the rest being Fe and inevitable impurities, and the oxygen contents of the alloy steel is 15 ppm or less, and for at least one member of said inner member and said outer member, the surface hardness of the inner raceway or the outer raceway formed with the hardened layer, is between Hv 650 and 780, and for at least one member of the inner member and the outer member, the surface hardness of a portion not formed with the hardened layer is between Hv 230 and 300.

2. A wheel-support rolling bearing unit according to claim 1, wherein in the case where in the alloy steel constituting the at least one member of said inner member and said outer member, the C content is $x_1$ weight %, the V content is $x_2$ weight %, the Nb content is $x_3$ weight %, and the Ti content is $x_4$ weight %, the expression $0.30 \leq \{x_{1-1.5}(x_2+x_3+x_4)\} \leq 0.55$ is satisfied.

3. A wheel-support rolling bearing unit comprising: a stationary ring which is supported on a suspension device during use and does not rotate; a rotating ring disposed concentric with said stationary ring, and which is fastened to a wheel during use and which rotates together with said wheel; an outer raceway provided on an inner peripheral surface of an outer diameter side bearing ring of one of said rotating ring and said stationary ring which exists radially outwards; an inner raceway provided on an outer peripheral surface of an inner diameter side bearing ring of the other of said rotating ring and said stationary ring which exists radially inwards; a plurality of rolling elements rotatably provided between said inner raceway and said outer raceway; and a flange provided on the outer peripheral surface of said rotating ring, for fastening a wheel,
wherein at least a portion of said rotating ring that is provided with said flange is made from a carbon steel containing 0.5 to 0.8 weight % of C, and in this rotating ring, at least the hardness of the surface of a root portion on an axial outside surface side of said flange is between 24 and 35 by Rockwell hardness C scale, that is between 260 and 345 by Vickers hardness.

4. A wheel-support rolling bearing unit according to claim 3, wherein said carbon steel contains 0.03 to 0.3 weight % of Vanadium.

5. A wheel-support rolling bearing unit comprising: a stationary ring which is supported on a suspension device during use and does not rotate; a rotating ring disposed concentric with said stationary ring, and which is fastened a wheel during use and which rotates together with said wheel; an outer raceway provided on an inner peripheral surface of an outer diameter side bearing ring of one of said rotating ring and said stationary ring which exists radially outwards; an inner raceway provided on an outer peripheral surface of an inner diameter side bearing ring of the other of said rotating ring and said stationary ring which exists radially inwards; a plurality of rolling elements rotatably provided between said inner raceway and said outer raceway; and a flange provided on the outer peripheral surface of said rotating ring, for fastening a wheel,
wherein in said rotating ring, at least the surface roughness of a root portion on an axial outside surface side of said flange is between 0.1 and 1.0 μm by arithmetic average roughness Ra.

6. A wheel-support rolling bearing unit comprising: a stationary ring which is supported on a suspension device during use and does not rotate; a rotating ring disposed concentric with said stationary ring, and which is fastened a wheel during use and which rotates together with said wheel; an outer raceway provided on an inner peripheral surface of an outer diameter side bearing ring of one of said rotating ring and said stationary ring which exists radially outwards; an inner raceway provided on an outer peripheral surface of an inner diameter side bearing ring of the other of said rotating ring and said stationary ring which exists radially inwards; a plurality of rolling elements rotatably provided between said inner raceway and said outer race- way; and a flange provided on the outer peripheral surface of said rotating ring, for fastening a wheel,
wherein in said rotating ring, at least the surface roughness of a root portion on an axial outside surface side of said flange is 10 μm or less by maximum height Ry.

7. A flanged bearing unit comprising: an inner member having a raceway surface on an outside surface; an outer member having a raceway surface facing the raceway surface of said inner member on an inner surface and arranged on the outside of said inner member; rolling elements rotatably arranged between said raceway surfaces; and a flange provided at least on one of said inner member and said outer member, wherein at least the member provided with said flange is made from a carbon steel having a carbon content between 0.45 weight % and 0.65 weight %, and an area ratio of pro-eutectoid ferrite of at least said flange is between 3 and 15%.

8. A flanged bearing unit according to claim 7, wherein an S content of said carbon steel is between 0.003 weight % and 0.020 weight %, and a relation between said S content and the area ratio of said pro-eutectoid ferrite structure is $10 \leq (S$ content (weight %)×1000+area ratio of pro-eutectoid ferrite structure (%)) $\leq 30$.

9. A flanged bearing unit according to claim 7, wherein an area ratio of said pro-eutectoid ferrite structure with respect to said S content satisfies the relation of $1 \leq (S$ content (weight %)×1000)/area ratio of pro-eutectoid ferrite structure (%) $\leq 2$.

10. A flanged bearing unit according to claim 7, wherein an area ratio of said pro-eutectoid ferrite per unit area (10 mm$^2$) of the root portion on the outside in the thickness direction of said flange is between 3 and 15%, and a maximum length of said pro-eutectoid ferrite is 200 μm or less, and the number of pro-eutectoid ferrites having a length of 180 μm or more is five or less.

11. A flanged bearing unit according to claim 7, wherein the member provided with said flange has a V (Vanadium) content of 0.05 to 0.3 weight %.

12. A method of manufacturing a flanged bearing unit wherein a plurality of rolling elements are arranged between an inner member and an outer member having a flange for attaching at least one member of said inner member and said outer member on a fixed side or a rotation side, and having a hardened layer made by induction hardening at least in the vicinity of a raceway portion, and at least the member provided with said flange is formed by hot forging using an alloy steel containing C, 0.45 to 0.65 weight %, Mn: 0.3 to 1.5 weight %, Si: 0.1 to 1.0 weight %, Cr: 0.01 to 0.5 weight %, S $\leq$ 0.025 weight %, O $\leq$ 15 ppm, and the rest being Fe and inevitable impurities, and the material heating temperature at the time of said hot forging is between 900 and 1050° C., and the temperature at the time of finishing forge stamping is 800° C. or more.

13. A flanged bearing unit according to claim 12, wherein an average cooling rate from a temperature at the time of the finishing forge stamping until reaching 600° C. is between 0.5 and 5° C./sec.

14. A flanged bearing unit according to claim 12, wherein an alloy steel containing at least one type of V: 0.01 to 0.2 weight %, Nb: 0.01 to 0.15 weight % and Ti: 0.01 to 0.15 weight % is used.

15. A flanged bearing unit made by the manufacturing method according to claim 12, having a plurality of rolling elements arranged between an inner member and an outer member, and a flange for attaching at least one member of said inner member and said outer member on a fixed side or a rotation side, and having a hardened layer made by induction hardening at least in the vicinity of the raceway portion, wherein the metal structure of the root portion of said flange contains a ferrite-pearlite structure, and a prior austenite grain size number of said ferrite-pearlite structure is 4 or more in JIS G0551.

16. A method of manufacturing a flanged bearing unit wherein a plurality of rolling elements are arranged between an inner member and an outer member having a flange for attaching at least one member of said inner member and said outer member on a fixed side or a rotation side, and having a hardened layer made by induction hardening at least in the vicinity of a raceway portion, and at least the member provided with said flange is formed by hot forging using an alloy steel containing C, 0.45 to 0.65 weight %, Mn: 0.3 to 1.5 weight %, Si: 0.1 to 1.0 weight %, Cr: 0.01 to 0.5 weight %, S≦0.025 weight %, O≦15 ppm, and the rest being Fe and inevitable impurities, and the material heating temperature at the time of said hot forging is between 900 and 1050° C., and the average cooling rate from the temperature at the time of finishing forge stamping until reaching 600° C. is between 0.5 and 5° C./sec.

17. A wheel-support flanged bearing unit having a plurality of rolling elements arranged between an inner member and an outer member, and a flange for attaching at least one member of said inner member and said outer member on a vehicle body side or a wheel side, and having a hardened layer made by induction hardening at least in the vicinity of a raceway portion, wherein at least the member provided with said flange is formed from an alloy steel containing C, 0.45 to 0.50 weight %, Si: 0.3 to 1.5 weight %, V: 0.03 to 0.3 weight %, Mn≦1.5 weight %, Cr≦1.0 weight %, S≦0.035 weight %, O≦15 ppm, and the rest being Fe and inevitable impurities, and the C+0.2Si+0.5V value satisfies between 0.55 and 0.75, and the raceway portion surface hardness of the hardened layer made by said induction hardening is between Hv 630 and Hv 750, and the hardness of the portion which is not subjected to hardening treatment by said induction hardening is between Hv 220 and Hv 300.

18. A wheel-support flanged bearing unit according to claim 17, wherein a pro-eutectoid ferrite area ratio in a non-thermal refined portion of the root portion of at least the flange attached to the wheel side is between 5% and 15%.

19. A flanged bearing unit according to claim 7, wherein said inner member is used as a hub ring, and a wheel attaching flange serving as said flange is arranged on one end portion of said hub ring, and an inner ring is fitted onto a small diameter step portion formed on an other end portion of said hub ring so that raceway surfaces are respectively formed on the outer peripheral surface of said inner ring and on the outer peripheral surface of an axial middle portion of said hub ring to make a double row inner raceway surface, and said outer member is used as an outer ring, and a double row outer raceway surface corresponding to said double row inner raceway surface is formed on an inner peripheral surface of said outer ring, and a suspension device attaching flange is formed on an end portion of said outer ring on a side away from said wheel attaching flange, and a plurality of said rolling elements are rotatably arranged between said double row inner raceway surface and said double row outer raceway surface.

20. A wheel-support rolling bearing unit comprising: an inner member having an inner raceway on an outer peripheral surface; an outer member having an outer raceway on an inner peripheral surface; and a plurality of rolling elements rotatably provided between said inner raceway and said outer raceway, wherein a member being at least one member of said inner member and said outer member and comprising a flange on the outer peripheral surface, is made from a steel containing 0.45 to 0.60 weight % of C, and has a hardened layer formed by induction hardening, on the raceway portion provided on the peripheral surface, and the hardness of a portion at a depth of 0.1 mm from the surface of this hardened layer is Hv 670 or more, and a prior austenite grain size of the metal structure of this hardened layer is 8 or more in grain size number according to JIS G 0551.

21. A wheel-support rolling bearing unit according to claim 20, wherein the steel constituting the member provided with the flange contains 0.3 to 1.5 weight % of Mn, 0.1 to 1.0 weight % of Si, and 0.01 to 0.5 weight % of Cr, and the S content is kept to 0.035 weight % or less, and the O content is kept to 15 ppm or less.

22. A wheel-support rolling bearing unit according to claim 20, wherein the steel constituting the member provided with the flange contains one type or more selected from 0.01 to 0.2 weight % of V, 0.01 to 0.15 weight % of Nb, and 0.01 to 0.15 weight % of Ti.

23. A wheel-support rolling bearing unit comprising: a stationary ring which is supported on a suspension device during use and does not rotate; a rotating ring disposed concentric with said stationary ring, and which is fastened a wheel during use and which rotates together with said wheel; an outer raceway provided on an inner peripheral surface of an outer diameter side bearing ring of one of said rotating ring and said stationary ring which exists radially outwards; an inner raceway provided on an outer peripheral surface of an inner diameter side bearing ring of the other of said rotating ring and said stationary ring which exists radially inwards; a plurality of rolling elements rotatably provided between said inner raceway and said outer raceway; and a flange provided on the outer peripheral surface of said rotating ring, for fastening a wheel, wherein said rotating ring is made from a carbon steel containing 0.45 to 0.60 weight % of C, and in this rotating ring, at least a root portion on the axial outside surface side of said flange is made from a pro-eutectoid ferrite wherein a prior austenite grain size number is 4 or more in JIS G0551, and the area ratio is between 3 and 15%.

24. A wheel-support rolling bearing unit according to claim 23, wherein the C content in the carbon steel constituting said rotating ring is 0.50 weight % or more.

25. A wheel-support rolling bearing unit according to claim 23, wherein the austenite grain size number is 5 or more in JIS G0551, and the area ratio of the pro-eutectoid ferrite is between 3 and 9%.

26. A wheel-support rolling bearing unit according to claim 23, wherein said stationary ring is an outer ring having a double row outer raceway on an inner peripheral surface, and said rotating ring comprises a hub ring formed with a flange for supporting a wheel on an outer peripheral surface of an axial outside end portion, and with a first inner raceway on an outer peripheral surface of an axial middle portion, and an inner ring provided with a second inner raceway on an outer peripheral surface, and said inner ring is fitted onto a step portion provided on an outer peripheral surface of an inside end portion of said hub ring for which the outer diameter dimension is made smaller than that of a portion formed with said first inner raceway.

27. A wheel-support rolling bearing unit according to claim 23, wherein said stationary ring is a pair of inner rings each having an inner raceway on an outer peripheral surface, and said rotating ring is a hub ring formed with a flange for supporting a wheel on an outer peripheral surface, and with a double row outer raceway on an inner peripheral surface.

28. A wheel-support rolling bearing unit according to claim 23, wherein the carbon steel constituting said rotating ring contains 0.02 to 0.30 weight % of Nb.

29. A wheel-support rolling bearing unit according to claim 23, wherein said rotating ring is one where an intermediate material formed into a predetermined shape by applying hot forging or cutting to a material made from carbon steel, is subjected to heat treatment involving heating to a temperature of 750 to 1000° C. at least once, and then cooling at a speed of the critical cooling rate or less, and is then subjected to finishing.

30. A wheel-support rolling bearing unit comprising; an inner ring, an outer ring, a plurality of rolling elements rotatably provided between said inner ring and said outer ring, and a hub ring made from steel having said inner ring integrally fixed by swaging, wherein said steel contains manganese and 0.45 to 0.65 mass % of carbon, and manganese segregation degree determined by the following equation is 0.6 or less if the manganese content [Mn0] is 0.5 mass % or more, and is (2.8−2×[Mn0]/3 or less if the manganese content [Mn0] is less than 0.5 mass %;

manganese segregation degree=([Mn]−[Mn0])/[Mn0]

where [Mn] is the maximum manganese concentration of the steel; the unit is mass %.

* * * * *